(12) United States Patent
Luby et al.

(10) Patent No.: US 9,294,226 B2
(45) Date of Patent: Mar. 22, 2016

(54) UNIVERSAL OBJECT DELIVERY AND TEMPLATE-BASED FILE DELIVERY

(71) Applicant: QUALCOMM Incorporated, San Diego, CA (US)

(72) Inventors: Michael George Luby, Berkeley, CA (US); Kevin Roland Fall, Bethel Park, PA (US); Thomas Stockhammer, Bergen (DE)

(73) Assignee: QUALCOMM Incorporated, San Diego, CA (US)

( * ) Notice: Subject to any disclaimer, the term of this patent is extended or adjusted under 35 U.S.C. 154(b) by 486 days.

(21) Appl. No.: 13/753,442

(22) Filed: Jan. 29, 2013

(65) Prior Publication Data

US 2013/0254634 A1   Sep. 26, 2013

Related U.S. Application Data

(60) Provisional application No. 61/615,796, filed on Mar. 26, 2012.

(51) Int. Cl.
*H03M 13/05*   (2006.01)
*H04L 1/00*   (2006.01)
(Continued)

(52) U.S. Cl.
CPC ............ *H04L 1/0057* (2013.01); *H04L 1/0041* (2013.01); *H04L 65/00* (2013.01); *H04L 65/4084* (2013.01); *H04L 65/605* (2013.01); *H04L 65/607* (2013.01); *H04L 67/06* (2013.01)

(58) Field of Classification Search
CPC ... H04L 1/0041; H04L 65/00; H04L 65/4084; H04L 65/605; H04L 65/607; H04L 67/06; H04L 1/0057
See application file for complete search history.

(56) References Cited

U.S. PATENT DOCUMENTS

| 3,909,721 A | 9/1975 | Bussgang et al. |
| 4,365,338 A | 12/1982 | McRae et al. |

(Continued)

FOREIGN PATENT DOCUMENTS

| CN | 1338839 A | 3/2002 |
| CN | 1425228 A | 6/2003 |

(Continued)

OTHER PUBLICATIONS

Qualcomm Incorporated: "RatorQ Forward Error Correction Scheme for Object Delivery draft-ietf-rmt-bb-fec-raptorq-04", Internet Engineering Task Force, IETF, pp. 1-68, Aug. 24, 2010.

(Continued)

*Primary Examiner* — April Y Blair
*Assistant Examiner* — Dipakkumar Gandhi

(57) ABSTRACT

Data objects can be delivered over a network using a file delivery system and universal object delivery and template-based file delivery. This might be done by forming source data into a sequence of data objects represented by symbols in packets, sending those to receivers on request, wherein a transmitter obtains a template file delivery table with delivery metadata for the data objects, and constructing a first transmission object identifier for a data object based on a transmission object identifier construction rule described in the template file delivery table. A receiver might receive packets, extract a second transmission object identifier, associate encoded symbols comprising the received data packet with the data object if the first transmission object identifier and the second transmission object identifier identify the same data object, and recover, at least approximately, the source data for the data object based on the encoded symbols associated with the data object.

32 Claims, 14 Drawing Sheets

(51) Int. Cl.
  *H04L 29/06* (2006.01)
  *H04L 29/08* (2006.01)
  *H03M 13/53* (2006.01)

(56) References Cited

U.S. PATENT DOCUMENTS

| | | | |
|---|---|---|---|
| 4,589,112 A | 5/1986 | Karim |
| 4,901,319 A | 2/1990 | Ross |
| 5,136,592 A | 8/1992 | Weng |
| 5,153,591 A | 10/1992 | Clark |
| 5,331,320 A | 7/1994 | Cideciyan et al. |
| 5,371,532 A | 12/1994 | Gelman et al. |
| 5,372,532 A | 12/1994 | Robertson, Jr. |
| 5,379,297 A | 1/1995 | Glover et al. |
| 5,421,031 A | 5/1995 | De Bey |
| 5,425,050 A | 6/1995 | Schreiber et al. |
| 5,432,787 A | 7/1995 | Chethik |
| 5,455,823 A | 10/1995 | Noreen et al. |
| 5,465,318 A | 11/1995 | Sejnoha |
| 5,517,508 A | 5/1996 | Scott |
| 5,524,025 A | 6/1996 | Lawrence et al. |
| 5,566,208 A | 10/1996 | Balakrishnan |
| 5,568,614 A | 10/1996 | Mendelson et al. |
| 5,583,784 A | 12/1996 | Kapust et al. |
| 5,608,738 A | 3/1997 | Matsushita |
| 5,617,541 A | 4/1997 | Albanese et al. |
| 5,642,365 A | 6/1997 | Murakami et al. |
| 5,659,614 A | 8/1997 | Bailey, III |
| 5,699,473 A | 12/1997 | Kim |
| 5,701,582 A | 12/1997 | DeBey |
| 5,751,336 A | 5/1998 | Aggarwal et al. |
| 5,754,563 A | 5/1998 | White |
| 5,757,415 A | 5/1998 | Asamizuya et al. |
| 5,802,394 A | 9/1998 | Baird et al. |
| 5,805,825 A | 9/1998 | Danneels et al. |
| 5,835,165 A | 11/1998 | Keate et al. |
| 5,844,636 A | 12/1998 | Joseph et al. |
| 5,870,412 A | 2/1999 | Schuster et al. |
| 5,903,775 A | 5/1999 | Murray |
| 5,917,852 A | 6/1999 | Butterfield et al. |
| 5,926,205 A | 7/1999 | Krause et al. |
| 5,933,056 A | 8/1999 | Rothenberg |
| 5,936,659 A | 8/1999 | Viswanathan et al. |
| 5,936,949 A | 8/1999 | Pasternak et al. |
| 5,953,537 A | 9/1999 | Balicki et al. |
| 5,970,098 A | 10/1999 | Herzberg |
| 5,983,383 A | 11/1999 | Wolf |
| 5,993,056 A | 11/1999 | Vaman et al. |
| 6,005,477 A | 12/1999 | Deck et al. |
| 6,011,590 A | 1/2000 | Saukkonen |
| 6,012,159 A | 1/2000 | Fischer et al. |
| 6,014,706 A | 1/2000 | Cannon et al. |
| 6,018,359 A | 1/2000 | Kermode et al. |
| 6,041,001 A | 3/2000 | Estakhri |
| 6,044,485 A | 3/2000 | Dent et al. |
| 6,061,820 A | 5/2000 | Nakakita et al. |
| 6,073,250 A | 6/2000 | Luby et al. |
| 6,079,041 A | 6/2000 | Kunisa et al. |
| 6,079,042 A | 6/2000 | Vaman et al. |
| 6,081,907 A | 6/2000 | Witty et al. |
| 6,081,909 A | 6/2000 | Luby et al. |
| 6,081,918 A | 6/2000 | Spielman |
| 6,088,330 A | 7/2000 | Bruck et al. |
| 6,097,320 A | 8/2000 | Kuki et al. |
| 6,134,596 A | 10/2000 | Bolosky et al. |
| 6,141,053 A | 10/2000 | Saukkonen |
| 6,141,787 A | 10/2000 | Kunisa et al. |
| 6,141,788 A | 10/2000 | Rosenberg et al. |
| 6,154,452 A | 11/2000 | Marko et al. |
| 6,163,870 A | 12/2000 | Luby et al. |
| 6,166,544 A | 12/2000 | Debbins et al. |
| 6,175,944 B1 | 1/2001 | Urbanke et al. |
| 6,178,536 B1 | 1/2001 | Sorkin |
| 6,185,265 B1 | 2/2001 | Campanella |
| 6,195,777 B1 | 2/2001 | Luby et al. |
| 6,223,324 B1 | 4/2001 | Sinha et al. |
| 6,226,259 B1 | 5/2001 | Piret |
| 6,226,301 B1 | 5/2001 | Cheng et al. |
| 6,229,824 B1 | 5/2001 | Marko |
| 6,243,846 B1 | 6/2001 | Schuster et al. |
| 6,272,658 B1 | 8/2001 | Steele et al. |
| 6,278,716 B1 | 8/2001 | Rubenstein et al. |
| 6,298,462 B1 | 10/2001 | Yi |
| 6,307,487 B1 | 10/2001 | Luby |
| 6,314,289 B1 | 11/2001 | Eberlein et al. |
| 6,320,520 B1 | 11/2001 | Luby |
| 6,332,163 B1 | 12/2001 | Bowman-Amuah |
| 6,333,926 B1 | 12/2001 | Van Heeswyk et al. |
| 6,373,406 B2 | 4/2002 | Luby |
| 6,393,065 B1 | 5/2002 | Piret et al. |
| 6,411,223 B1 | 6/2002 | Haken et al. |
| 6,415,326 B1 | 7/2002 | Gupta et al. |
| 6,420,982 B1 | 7/2002 | Brown |
| 6,421,387 B1 | 7/2002 | Rhee |
| 6,430,233 B1 | 8/2002 | Dillon et al. |
| 6,445,717 B1 | 9/2002 | Gibson et al. |
| 6,459,811 B1 | 10/2002 | Hurst, Jr. |
| 6,466,698 B1 | 10/2002 | Creusere |
| 6,473,010 B1 | 10/2002 | Vityaev et al. |
| 6,486,803 B1 | 11/2002 | Luby et al. |
| 6,487,692 B1 | 11/2002 | Morelos-Zaragoza |
| 6,496,980 B1 | 12/2002 | Tillman et al. |
| 6,497,479 B1 | 12/2002 | Stoffel et al. |
| 6,510,177 B1 | 1/2003 | De et al. |
| 6,523,147 B1 | 2/2003 | Kroeger et al. |
| 6,535,920 B1 | 3/2003 | Parry et al. |
| 6,577,599 B1 | 6/2003 | Gupta et al. |
| 6,584,543 B2 | 6/2003 | Williams et al. |
| 6,609,223 B1 | 8/2003 | Wolfgang |
| 6,614,366 B2 | 9/2003 | Luby |
| 6,618,451 B1 | 9/2003 | Gonikberg |
| 6,631,172 B1 | 10/2003 | Shokrollahi et al. |
| 6,633,856 B2 | 10/2003 | Richardson et al. |
| 6,641,366 B2 | 11/2003 | Nordhoff |
| 6,643,332 B1 | 11/2003 | Morelos-Zaragoza et al. |
| 6,677,864 B2 | 1/2004 | Khayrallah |
| 6,678,855 B1 | 1/2004 | Gemmell |
| 6,694,476 B1 | 2/2004 | Sridharan et al. |
| 6,704,370 B1 | 3/2004 | Chheda et al. |
| 6,732,325 B1 | 5/2004 | Tash et al. |
| 6,742,154 B1 | 5/2004 | Barnard |
| 6,748,441 B1 | 6/2004 | Gemmell |
| 6,751,772 B1 | 6/2004 | Kim et al. |
| 6,765,866 B1 | 7/2004 | Wyatt |
| 6,804,202 B1 | 10/2004 | Hwang |
| 6,810,499 B2 | 10/2004 | Sridharan et al. |
| 6,820,221 B2 | 11/2004 | Fleming |
| 6,831,172 B1 | 12/2004 | Barbucci et al. |
| 6,849,803 B1 | 2/2005 | Gretz |
| 6,850,736 B2 | 2/2005 | McCune, Jr. |
| 6,856,263 B2 | 2/2005 | Shokrollahi et al. |
| 6,868,083 B2 | 3/2005 | Apostolopoulos et al. |
| 6,876,623 B1 | 4/2005 | Lou et al. |
| 6,882,618 B1 | 4/2005 | Sakoda et al. |
| 6,895,547 B2 | 5/2005 | Eleftheriou et al. |
| 6,909,383 B2 | 6/2005 | Shokrollahi et al. |
| 6,928,603 B1 | 8/2005 | Castagna et al. |
| 6,937,618 B1 | 8/2005 | Noda et al. |
| 6,956,875 B2 | 10/2005 | Kapadia et al. |
| 6,965,636 B1 | 11/2005 | DesJardins et al. |
| 6,985,459 B2 | 1/2006 | Dickson |
| 6,995,692 B2 | 2/2006 | Yokota et al. |
| 7,010,052 B2 | 3/2006 | Dill et al. |
| 7,030,785 B2 | 4/2006 | Shokrollahi et al. |
| 7,031,257 B1 | 4/2006 | Lu et al. |
| 7,057,534 B2 | 6/2006 | Luby |
| 7,068,681 B2 | 6/2006 | Chang et al. |
| 7,068,729 B2 | 6/2006 | Shokrollahi et al. |
| 7,072,971 B2 | 7/2006 | Lassen et al. |
| 7,073,191 B2 | 7/2006 | Srikantan et al. |
| 7,100,188 B2 | 8/2006 | Hejna et al. |
| 7,110,412 B2 | 9/2006 | Costa et al. |
| 7,113,773 B2 | 9/2006 | Quick, Jr. et al. |
| 7,139,660 B2 | 11/2006 | Sarkar et al. |

(56) References Cited

U.S. PATENT DOCUMENTS

| | | |
|---|---|---|
| 7,139,960 B2 | 11/2006 | Shokrollahi et al. |
| 7,143,433 B1 | 11/2006 | Duan et al. |
| 7,151,754 B1 | 12/2006 | Boyce et al. |
| 7,154,951 B2 | 12/2006 | Wang |
| 7,164,370 B1 | 1/2007 | Mishra |
| 7,164,882 B2 | 1/2007 | Poltorak |
| 7,168,030 B2 | 1/2007 | Ariyoshi |
| 7,219,289 B2 | 5/2007 | Dickson |
| 7,231,404 B2 | 6/2007 | Paila et al. |
| 7,233,264 B2 | 6/2007 | Luby |
| 7,240,236 B2 | 7/2007 | Cutts et al. |
| 7,240,358 B2 | 7/2007 | Horn et al. |
| 7,243,285 B2 | 7/2007 | Foisy et al. |
| 7,249,291 B2 | 7/2007 | Rasmussen et al. |
| 7,254,754 B2 | 8/2007 | Hetzler et al. |
| 7,257,764 B2 | 8/2007 | Suzuki et al. |
| 7,265,688 B2 | 9/2007 | Shokrollahi et al. |
| 7,293,222 B2 | 11/2007 | Shokrollahi et al. |
| 7,295,573 B2 | 11/2007 | Yi et al. |
| 7,304,990 B2 | 12/2007 | Rajwan |
| 7,318,180 B2 | 1/2008 | Starr |
| 7,320,099 B2 | 1/2008 | Miura et al. |
| 7,363,048 B2 | 4/2008 | Cheng et al. |
| 7,391,717 B2 | 6/2008 | Klemets et al. |
| 7,394,407 B2 | 7/2008 | Shokrollahi et al. |
| 7,398,454 B2 | 7/2008 | Cai et al. |
| 7,409,626 B1 | 8/2008 | Schelstraete |
| 7,412,641 B2 | 8/2008 | Shokrollahi |
| 7,418,651 B2 | 8/2008 | Luby et al. |
| 7,451,377 B2 | 11/2008 | Shokrollahi et al. |
| 7,483,447 B2 | 1/2009 | Chang et al. |
| 7,483,489 B2 | 1/2009 | Gentric et al. |
| 7,512,697 B2 | 3/2009 | Lassen et al. |
| 7,525,994 B2 | 4/2009 | Scholte |
| 7,529,806 B1 | 5/2009 | Shteyn |
| 7,532,132 B2 | 5/2009 | Shokrollahi et al. |
| 7,555,006 B2 | 6/2009 | Wolfe et al. |
| 7,559,004 B1 | 7/2009 | Chang et al. |
| 7,570,665 B2 | 8/2009 | Ertel et al. |
| 7,574,706 B2 | 8/2009 | Meulemans et al. |
| 7,590,118 B2 | 9/2009 | Giesberts et al. |
| 7,597,423 B2 | 10/2009 | Silverbrook |
| 7,613,183 B1 | 11/2009 | Brewer et al. |
| 7,633,413 B2 | 12/2009 | Shokrollahi et al. |
| 7,633,970 B2 | 12/2009 | Van Kampen et al. |
| 7,644,335 B2 | 1/2010 | Luby et al. |
| 7,650,036 B2 | 1/2010 | Lei et al. |
| 7,668,198 B2 | 2/2010 | Yi et al. |
| 7,676,735 B2 | 3/2010 | Luby et al. |
| 7,711,068 B2 | 5/2010 | Shokrollahi et al. |
| 7,720,096 B2 | 5/2010 | Klemets |
| 7,720,174 B2 | 5/2010 | Shokrollahi et al. |
| 7,721,184 B2 | 5/2010 | Luby et al. |
| 7,812,743 B2 | 10/2010 | Luby |
| 7,831,896 B2 | 11/2010 | Amram et al. |
| 7,924,913 B2 | 4/2011 | Sullivan et al. |
| 7,956,772 B2 | 6/2011 | Shokrollahi et al. |
| 7,961,700 B2 | 6/2011 | Malladi et al. |
| 7,971,129 B2 | 6/2011 | Watson et al. |
| 7,979,769 B2 | 7/2011 | Lee et al. |
| 8,027,328 B2 | 9/2011 | Yang et al. |
| 8,028,322 B2 | 9/2011 | Riedl et al. |
| 8,081,716 B2 | 12/2011 | Kang et al. |
| 8,135,073 B2 | 3/2012 | Shen |
| 8,185,794 B2 | 5/2012 | Lohmar et al. |
| 8,185,809 B2 | 5/2012 | Luby et al. |
| RE43,741 E | 10/2012 | Shokrollahi et al. |
| 8,301,725 B2 | 10/2012 | Biderman et al. |
| 8,327,403 B1 | 12/2012 | Chilvers et al. |
| 8,331,445 B2 | 12/2012 | Garudadri et al. |
| 8,340,133 B2 | 12/2012 | Kim et al. |
| 8,422,474 B2 | 4/2013 | Park et al. |
| 8,462,643 B2 | 6/2013 | Walton et al. |
| 8,544,043 B2 | 9/2013 | Parekh et al. |
| 8,572,646 B2 | 10/2013 | Haberman et al. |
| 8,615,023 B2 | 12/2013 | Oh et al. |
| 8,638,796 B2 | 1/2014 | Dan et al. |
| 8,713,624 B1 | 4/2014 | Harvey et al. |
| 8,737,421 B2 | 5/2014 | Zhang et al. |
| 8,812,735 B2 | 8/2014 | Igarashi |
| 8,887,020 B2 | 11/2014 | Shokrollahi |
| 2001/0015944 A1 | 8/2001 | Takahashi et al. |
| 2001/0033586 A1 | 10/2001 | Takashimizu et al. |
| 2002/0009137 A1 | 1/2002 | Nelson et al. |
| 2002/0053062 A1 | 5/2002 | Szymanski |
| 2002/0083345 A1 | 6/2002 | Halliday et al. |
| 2002/0085013 A1 | 7/2002 | Lippincott |
| 2002/0133247 A1 | 9/2002 | Smith et al. |
| 2002/0141433 A1 | 10/2002 | Kwon et al. |
| 2002/0143953 A1 | 10/2002 | Aiken |
| 2002/0191116 A1 | 12/2002 | Kessler et al. |
| 2003/0005386 A1 | 1/2003 | Bhatt et al. |
| 2003/0037299 A1 | 2/2003 | Smith |
| 2003/0086515 A1 | 5/2003 | Trans et al. |
| 2003/0101408 A1 | 5/2003 | Martinian et al. |
| 2003/0106014 A1 | 6/2003 | Dohmen et al. |
| 2003/0138043 A1 | 7/2003 | Hannuksela |
| 2003/0194211 A1 | 10/2003 | Abecassis |
| 2003/0207696 A1 | 11/2003 | Willenegger et al. |
| 2003/0224773 A1 | 12/2003 | Deeds |
| 2004/0015768 A1 | 1/2004 | Bordes et al. |
| 2004/0031054 A1 | 2/2004 | Dankworth et al. |
| 2004/0049793 A1 | 3/2004 | Chou |
| 2004/0081106 A1 | 4/2004 | Bruhn |
| 2004/0096110 A1 | 5/2004 | Yogeshwar et al. |
| 2004/0117716 A1 | 6/2004 | Shen |
| 2004/0151109 A1 | 8/2004 | Batra et al. |
| 2004/0162071 A1 | 8/2004 | Grilli et al. |
| 2004/0207548 A1 | 10/2004 | Kilbank |
| 2004/0240382 A1 | 12/2004 | Ido et al. |
| 2004/0255328 A1 | 12/2004 | Baldwin et al. |
| 2005/0018635 A1 | 1/2005 | Proctor, Jr. |
| 2005/0028067 A1 | 2/2005 | Weirauch |
| 2005/0071491 A1 | 3/2005 | Seo |
| 2005/0084006 A1 | 4/2005 | Lei et al. |
| 2005/0091697 A1 | 4/2005 | Tanaka et al. |
| 2005/0097213 A1 | 5/2005 | Barrett et al. |
| 2005/0105371 A1 | 5/2005 | Johnson et al. |
| 2005/0123058 A1 | 6/2005 | Greenbaum et al. |
| 2005/0138286 A1 | 6/2005 | Franklin et al. |
| 2005/0160272 A1 | 7/2005 | Teppler |
| 2005/0163468 A1 | 7/2005 | Takahashi et al. |
| 2005/0180415 A1 | 8/2005 | Cheung et al. |
| 2005/0193309 A1 | 9/2005 | Grilli et al. |
| 2005/0195752 A1 | 9/2005 | Amin et al. |
| 2005/0207392 A1 | 9/2005 | Sivalingham et al. |
| 2005/0216472 A1 | 9/2005 | Leon et al. |
| 2005/0216951 A1 | 9/2005 | MacInnis |
| 2005/0254575 A1 | 11/2005 | Hannuksela et al. |
| 2006/0015568 A1 | 1/2006 | Walsh et al. |
| 2006/0020796 A1 | 1/2006 | Aura et al. |
| 2006/0031738 A1 | 2/2006 | Fay et al. |
| 2006/0037057 A1 | 2/2006 | Xu |
| 2006/0093634 A1 | 5/2006 | Lutz et al. |
| 2006/0107174 A1 | 5/2006 | Heise |
| 2006/0109805 A1 | 5/2006 | Malamal Vadakital et al. |
| 2006/0120464 A1 | 6/2006 | Hannuksela |
| 2006/0212444 A1 | 9/2006 | Handman et al. |
| 2006/0212782 A1 | 9/2006 | Li |
| 2006/0229075 A1 | 10/2006 | Kim et al. |
| 2006/0244824 A1 | 11/2006 | Debey |
| 2006/0244865 A1 | 11/2006 | Simon |
| 2006/0248195 A1 | 11/2006 | Toumura et al. |
| 2006/0256851 A1 | 11/2006 | Wang et al. |
| 2007/0002953 A1 | 1/2007 | Kusunoki |
| 2007/0006274 A1 | 1/2007 | Paila et al. |
| 2007/0016594 A1 | 1/2007 | Visharam et al. |
| 2007/0022215 A1 | 1/2007 | Singer et al. |
| 2007/0028099 A1 | 2/2007 | Entin et al. |
| 2007/0078876 A1 | 4/2007 | Hayashi et al. |
| 2007/0081562 A1 | 4/2007 | Ma |
| 2007/0110074 A1 | 5/2007 | Bradley et al. |
| 2007/0140369 A1 | 6/2007 | Limberg et al. |
| 2007/0162568 A1 | 7/2007 | Gupta et al. |

(56) References Cited

U.S. PATENT DOCUMENTS

| | | |
|---|---|---|
| 2007/0162611 A1 | 7/2007 | Yu et al. |
| 2007/0176800 A1 | 8/2007 | Rijavec |
| 2007/0177811 A1 | 8/2007 | Yang et al. |
| 2007/0185973 A1 | 8/2007 | Wayda et al. |
| 2007/0195894 A1 | 8/2007 | Shokrollahi et al. |
| 2007/0200949 A1 | 8/2007 | Walker et al. |
| 2007/0201549 A1 | 8/2007 | Hannuksela et al. |
| 2007/0204196 A1 | 8/2007 | Watson et al. |
| 2007/0230568 A1 | 10/2007 | Eleftheriadis et al. |
| 2007/0233784 A1 | 10/2007 | ORourke et al. |
| 2007/0255844 A1 | 11/2007 | Shen et al. |
| 2007/0277209 A1 | 11/2007 | Yousef |
| 2008/0010153 A1 | 1/2008 | Pugh-O'Connor et al. |
| 2008/0034273 A1 | 2/2008 | Luby |
| 2008/0052753 A1 | 2/2008 | Huang et al. |
| 2008/0058958 A1 | 3/2008 | Cheng |
| 2008/0059532 A1 | 3/2008 | Kazmi et al. |
| 2008/0066136 A1 | 3/2008 | Dorai et al. |
| 2008/0075172 A1 | 3/2008 | Koto |
| 2008/0086751 A1 | 4/2008 | Horn et al. |
| 2008/0101478 A1 | 5/2008 | Kusunoki |
| 2008/0134005 A1 | 6/2008 | Izzat et al. |
| 2008/0170564 A1 | 7/2008 | Shi et al. |
| 2008/0170806 A1 | 7/2008 | Kim |
| 2008/0172430 A1 | 7/2008 | Thorstensen |
| 2008/0172712 A1 | 7/2008 | Munetsugu |
| 2008/0181296 A1 | 7/2008 | Tian et al. |
| 2008/0189419 A1 | 8/2008 | Girle et al. |
| 2008/0192818 A1 | 8/2008 | DiPietro et al. |
| 2008/0215317 A1 | 9/2008 | Fejzo |
| 2008/0232357 A1 | 9/2008 | Chen |
| 2008/0243918 A1 | 10/2008 | Holtman |
| 2008/0256418 A1 | 10/2008 | Luby et al. |
| 2008/0281943 A1 | 11/2008 | Shapiro |
| 2008/0285556 A1 | 11/2008 | Park et al. |
| 2008/0303893 A1 | 12/2008 | Kim et al. |
| 2008/0313191 A1 | 12/2008 | Bouazizi |
| 2009/0003439 A1 | 1/2009 | Wang et al. |
| 2009/0019229 A1 | 1/2009 | Morrow et al. |
| 2009/0031199 A1 | 1/2009 | Luby et al. |
| 2009/0043906 A1 | 2/2009 | Hurst et al. |
| 2009/0055705 A1 | 2/2009 | Gao |
| 2009/0067551 A1 | 3/2009 | Chen et al. |
| 2009/0083806 A1 | 3/2009 | Barrett et al. |
| 2009/0089445 A1 | 4/2009 | Deshpande |
| 2009/0092138 A1 | 4/2009 | Joo et al. |
| 2009/0100496 A1 | 4/2009 | Bechtolsheim et al. |
| 2009/0103523 A1 | 4/2009 | Katis et al. |
| 2009/0106356 A1 | 4/2009 | Brase et al. |
| 2009/0125636 A1 | 5/2009 | Li et al. |
| 2009/0150557 A1 | 6/2009 | Wormley et al. |
| 2009/0158114 A1 | 6/2009 | Shokrollahi |
| 2009/0164653 A1 | 6/2009 | Mandyam et al. |
| 2009/0189792 A1 | 7/2009 | Shokrollahi et al. |
| 2009/0201990 A1 | 8/2009 | Leprovost et al. |
| 2009/0204877 A1 | 8/2009 | Betts |
| 2009/0210547 A1 | 8/2009 | Lassen et al. |
| 2009/0222873 A1 | 9/2009 | Einarsson |
| 2009/0248697 A1 | 10/2009 | Richardson et al. |
| 2009/0257508 A1 | 10/2009 | Aggarwal et al. |
| 2009/0287841 A1 | 11/2009 | Chapweske et al. |
| 2009/0297123 A1 | 12/2009 | Virdi et al. |
| 2009/0300203 A1 | 12/2009 | Virdi et al. |
| 2009/0300204 A1 | 12/2009 | Zhang et al. |
| 2009/0307565 A1 | 12/2009 | Luby et al. |
| 2009/0319563 A1 | 12/2009 | Schnell |
| 2009/0328228 A1 | 12/2009 | Schnell |
| 2010/0011061 A1 | 1/2010 | Hudson et al. |
| 2010/0011117 A1 | 1/2010 | Hristodorescu et al. |
| 2010/0011274 A1 | 1/2010 | Stockhammer et al. |
| 2010/0020871 A1 | 1/2010 | Hannuksela et al. |
| 2010/0023525 A1 | 1/2010 | Westerlund et al. |
| 2010/0049865 A1 | 2/2010 | Hannuksela et al. |
| 2010/0061444 A1 | 3/2010 | Wilkins et al. |
| 2010/0067495 A1 | 3/2010 | Lee et al. |
| 2010/0131671 A1 | 5/2010 | Kohli et al. |
| 2010/0153578 A1 | 6/2010 | Van et al. |
| 2010/0174823 A1 | 7/2010 | Huang |
| 2010/0189131 A1 | 7/2010 | Branam et al. |
| 2010/0198982 A1 | 8/2010 | Fernandez |
| 2010/0211690 A1 | 8/2010 | Pakzad et al. |
| 2010/0223533 A1 | 9/2010 | Stockhammer et al. |
| 2010/0235472 A1 | 9/2010 | Sood et al. |
| 2010/0235528 A1 | 9/2010 | Bocharov et al. |
| 2010/0257051 A1 | 10/2010 | Fernandez |
| 2010/0318632 A1 | 12/2010 | Yoo et al. |
| 2011/0019769 A1 | 1/2011 | Shokrollahi et al. |
| 2011/0055881 A1 | 3/2011 | Yu et al. |
| 2011/0083144 A1 | 4/2011 | Bocharov et al. |
| 2011/0096828 A1 | 4/2011 | Chen et al. |
| 2011/0103519 A1 | 5/2011 | Shokrollahi et al. |
| 2011/0119394 A1 | 5/2011 | Wang et al. |
| 2011/0119396 A1 | 5/2011 | Kwon et al. |
| 2011/0216541 A1 | 9/2011 | Inoue et al. |
| 2011/0231519 A1 | 9/2011 | Luby et al. |
| 2011/0231569 A1 | 9/2011 | Luby et al. |
| 2011/0238789 A1 | 9/2011 | Luby et al. |
| 2011/0239078 A1 | 9/2011 | Luby et al. |
| 2011/0258510 A1 | 10/2011 | Watson et al. |
| 2011/0268178 A1 | 11/2011 | Park et al. |
| 2011/0280311 A1 | 11/2011 | Chen et al. |
| 2011/0280316 A1 | 11/2011 | Chen et al. |
| 2011/0299629 A1 | 12/2011 | Luby et al. |
| 2011/0307545 A1 | 12/2011 | Bouazizi |
| 2011/0307581 A1* | 12/2011 | Furbeck et al. ............... 709/219 |
| 2012/0013746 A1 | 1/2012 | Chen et al. |
| 2012/0016965 A1 | 1/2012 | Chen et al. |
| 2012/0020413 A1 | 1/2012 | Chen et al. |
| 2012/0023249 A1 | 1/2012 | Chen et al. |
| 2012/0023254 A1 | 1/2012 | Park et al. |
| 2012/0033730 A1 | 2/2012 | Lee |
| 2012/0042050 A1 | 2/2012 | Chen et al. |
| 2012/0042089 A1 | 2/2012 | Chen et al. |
| 2012/0042090 A1 | 2/2012 | Chen et al. |
| 2012/0047280 A1 | 2/2012 | Park et al. |
| 2012/0099593 A1 | 4/2012 | Luby |
| 2012/0151302 A1 | 6/2012 | Luby et al. |
| 2012/0185530 A1 | 7/2012 | Reza |
| 2012/0202535 A1 | 8/2012 | Chaddha et al. |
| 2012/0207068 A1 | 8/2012 | Watson et al. |
| 2012/0208580 A1 | 8/2012 | Luby et al. |
| 2012/0210190 A1 | 8/2012 | Luby et al. |
| 2012/0317305 A1 | 12/2012 | Einarsson et al. |
| 2013/0002483 A1 | 1/2013 | Rowitch et al. |
| 2013/0007223 A1 | 1/2013 | Luby et al. |
| 2013/0067295 A1 | 3/2013 | Luby et al. |
| 2013/0091251 A1 | 4/2013 | Walker et al. |
| 2013/0246643 A1 | 9/2013 | Luby et al. |
| 2013/0287023 A1 | 10/2013 | Bims |
| 2014/0009578 A1 | 1/2014 | Chen et al. |
| 2014/0380113 A1 | 12/2014 | Luby |

FOREIGN PATENT DOCUMENTS

| | | |
|---|---|---|
| CN | 1481643 A | 3/2004 |
| CN | 1708934 A | 12/2005 |
| CN | 1714577 A | 12/2005 |
| CN | 1806392 A | 7/2006 |
| CN | 1819661 A | 8/2006 |
| CN | 1868157 A | 11/2006 |
| CN | 101390399 A | 3/2009 |
| CN | 101729857 A | 6/2010 |
| EP | 0669587 A2 | 8/1995 |
| EP | 0701371 A1 | 3/1996 |
| EP | 0784401 A2 | 7/1997 |
| EP | 0853433 A1 | 7/1998 |
| EP | 0854650 A2 | 7/1998 |
| EP | 0903955 A1 | 3/1999 |
| EP | 0986908 A1 | 3/2000 |
| EP | 1051027 A1 | 11/2000 |
| EP | 1124344 A1 | 8/2001 |
| EP | 1241795 A2 | 9/2002 |
| EP | 1298931 A2 | 4/2003 |
| EP | 1406452 A2 | 4/2004 |

(56) References Cited

FOREIGN PATENT DOCUMENTS

| | | |
|---|---|---|
| EP | 1455504 A2 | 9/2004 |
| EP | 1670256 A2 | 6/2006 |
| EP | 1755248 A1 | 2/2007 |
| EP | 2071827 A2 | 6/2009 |
| EP | 1700410 B1 | 4/2010 |
| EP | 1665539 | 4/2013 |
| JP | H07183873 | 7/1995 |
| JP | 08186570 | 7/1996 |
| JP | 8289255 A | 11/1996 |
| JP | 9252253 A | 9/1997 |
| JP | 11041211 A | 2/1999 |
| JP | 11112479 | 4/1999 |
| JP | 11164270 A | 6/1999 |
| JP | 2000151426 A | 5/2000 |
| JP | 2000216835 A | 8/2000 |
| JP | 2000513164 A | 10/2000 |
| JP | 2000307435 A | 11/2000 |
| JP | 2000353969 A | 12/2000 |
| JP | 2001036417 | 2/2001 |
| JP | 2001094625 | 4/2001 |
| JP | 2001223655 A | 8/2001 |
| JP | 2001251287 A | 9/2001 |
| JP | 2001274776 A | 10/2001 |
| JP | 2001274855 A | 10/2001 |
| JP | 2002073625 A | 3/2002 |
| JP | 2002204219 A | 7/2002 |
| JP | 2002543705 A | 12/2002 |
| JP | 2003507985 | 2/2003 |
| JP | 2003092564 A | 3/2003 |
| JP | 2003510734 A | 3/2003 |
| JP | 2003174489 | 6/2003 |
| JP | 2003256321 A | 9/2003 |
| JP | 2003318975 A | 11/2003 |
| JP | 2003319012 | 11/2003 |
| JP | 2003333577 A | 11/2003 |
| JP | 2004048704 A | 2/2004 |
| JP | 2004070712 A | 3/2004 |
| JP | 2004135013 A | 4/2004 |
| JP | 2004165922 A | 6/2004 |
| JP | 2004516717 A | 6/2004 |
| JP | 2004192140 A | 7/2004 |
| JP | 2004193992 A | 7/2004 |
| JP | 2004529533 A | 9/2004 |
| JP | 2004289621 A | 10/2004 |
| JP | 2004343701 A | 12/2004 |
| JP | 2004348824 A | 12/2004 |
| JP | 2004362099 A | 12/2004 |
| JP | 2005094140 A | 4/2005 |
| JP | 2005136546 A | 5/2005 |
| JP | 2005514828 T | 5/2005 |
| JP | 2005204170 A | 7/2005 |
| JP | 2005223433 A | 8/2005 |
| JP | 2005277950 A | 10/2005 |
| JP | 2006503463 A | 1/2006 |
| JP | 2006505177 A | 2/2006 |
| JP | 2006506926 A | 2/2006 |
| JP | 2006074335 A | 3/2006 |
| JP | 2006074421 A | 3/2006 |
| JP | 2006115104 A | 4/2006 |
| JP | 3809957 | 6/2006 |
| JP | 2006174032 A | 6/2006 |
| JP | 2006174045 A | 6/2006 |
| JP | 2006186419 A | 7/2006 |
| JP | 2006519517 A | 8/2006 |
| JP | 2006287422 A | 10/2006 |
| JP | 2006319743 A | 11/2006 |
| JP | 2007013675 A | 1/2007 |
| JP | 2007089137 A | 4/2007 |
| JP | 2007158592 A | 6/2007 |
| JP | 2007174170 A | 7/2007 |
| JP | 2007520961 A | 7/2007 |
| JP | 2007228205 A | 9/2007 |
| JP | 2008011404 A | 1/2008 |
| JP | 2008016907 A | 1/2008 |
| JP | 2008508761 A | 3/2008 |
| JP | 2008508762 A | 3/2008 |
| JP | 2008283232 A | 11/2008 |
| JP | 2008283571 A | 11/2008 |
| JP | 2008543142 A | 11/2008 |
| JP | 2009027598 A | 2/2009 |
| JP | 2009522921 A | 6/2009 |
| JP | 2009522922 A | 6/2009 |
| JP | 2009171558 A | 7/2009 |
| JP | 2009527949 A | 7/2009 |
| JP | 2009277182 A | 11/2009 |
| JP | 2009544991 A | 12/2009 |
| JP | 2010539832 A | 12/2010 |
| JP | 2011087103 A | 4/2011 |
| JP | 4971144 B2 | 7/2012 |
| KR | 1020030071815 | 9/2003 |
| KR | 1020030074386 A | 9/2003 |
| KR | 20040107152 A | 12/2004 |
| KR | 20040107401 A | 12/2004 |
| KR | 20050009376 A | 1/2005 |
| KR | 100809086 B1 | 3/2008 |
| KR | 20080083299 A | 9/2008 |
| KR | 20090098919 A | 9/2009 |
| RU | 99117925 A | 7/2001 |
| RU | 2189629 C2 | 9/2002 |
| RU | 2265960 C2 | 12/2005 |
| RU | 2290768 C1 | 12/2006 |
| RU | 2297663 C2 | 4/2007 |
| RU | 2312390 C2 | 12/2007 |
| RU | 2357279 C2 | 5/2009 |
| TW | I246841 B | 1/2006 |
| TW | I354908 | 12/2011 |
| TW | I355168 | 12/2011 |
| WO | 9634463 A1 | 10/1996 |
| WO | 9750183 A1 | 12/1997 |
| WO | 9804973 A1 | 2/1998 |
| WO | 9832256 A1 | 7/1998 |
| WO | 0014921 A1 | 3/2000 |
| WO | 0052600 A1 | 9/2000 |
| WO | 0157667 A1 | 8/2001 |
| WO | 0158130 A2 | 8/2001 |
| WO | 0158131 A2 | 8/2001 |
| WO | 0227988 A2 | 4/2002 |
| WO | 02063461 A1 | 8/2002 |
| WO | 03046742 A1 | 6/2003 |
| WO | 03105484 A1 | 12/2003 |
| WO | 2004015948 A1 | 2/2004 |
| WO | 2004019521 A1 | 3/2004 |
| WO | 2004030273 A1 | 4/2004 |
| WO | 2004036824 A1 | 4/2004 |
| WO | 2004040831 A1 | 5/2004 |
| WO | 2004047019 A2 | 6/2004 |
| WO | 2004047455 A1 | 6/2004 |
| WO | 2004088988 A1 | 10/2004 |
| WO | 2004109538 A1 | 12/2004 |
| WO | 2005041421 A1 | 5/2005 |
| WO | 2005078982 A1 | 8/2005 |
| WO | 2005107123 | 11/2005 |
| WO | 2006013459 A1 | 2/2006 |
| WO | WO-2006036276 | 4/2006 |
| WO | 2006057938 A2 | 6/2006 |
| WO | 2006060036 A1 | 6/2006 |
| WO | 2006084503 A1 | 8/2006 |
| WO | WO-2006116102 A2 | 11/2006 |
| WO | 2006135878 A2 | 12/2006 |
| WO | 2007078253 A2 | 7/2007 |
| WO | 2007090834 A2 | 8/2007 |
| WO | 2007098397 A2 | 8/2007 |
| WO | 2007098480 A1 | 8/2007 |
| WO | 2008011549 A2 | 1/2008 |
| WO | 2008023328 A3 | 4/2008 |
| WO | 2008054100 A1 | 5/2008 |
| WO | 2008085013 A1 | 7/2008 |
| WO | 2008086313 A1 | 7/2008 |
| WO | 2008131023 A1 | 10/2008 |
| WO | 2008144004 A1 | 11/2008 |
| WO | 2009065526 A1 | 5/2009 |
| WO | 2009137705 A2 | 11/2009 |
| WO | 2009143741 A1 | 12/2009 |
| WO | 2010085361 A2 | 7/2010 |

(56) References Cited

FOREIGN PATENT DOCUMENTS

| WO | 2011038013 | 3/2011 |
|---|---|---|
| WO | 2011038034 A1 | 3/2011 |
| WO | 2011059286 A2 | 5/2011 |
| WO | 2011070552 A1 | 6/2011 |
| WO | 2011102792 A1 | 8/2011 |
| WO | 2012021540 | 2/2012 |
| WO | WO-2012109614 A1 | 8/2012 |

OTHER PUBLICATIONS

Ramsey B, "HTTP Status: 206 Partial Content and Range Requests," May 5, 2008 obtained at http://benramsey.com/blog/2008/05/206-partial-content-and-range-requests/.

3GPP TSG-SA4 #57 S4-100015, IMS based PSS and MBMS User Service extensions, Jan. 19, 2010, URL : http://www.3gpp.org/ftp/tsg_sa/WG4_CODEC/TSGS4_57/docs/S4-100015.zip.

3rd Generation Partnership Project; Technical Specification Group Services and System Aspects; Transparent end-to-end Packet-switched Streaming Service (PSS);Protocols and codecs(Release 9) 3GPP TS 26.234 V9.3.0, Jun. 23, 2010 P.85-102, URL,http://www.3gpp.org/ftp/TSG_SA/WG4_CODEC/TSGS4_59/Docs/S4-100511.zip, 26234-930.zip.

Lee, J.Y., "Description of Evaluation Experiments on ISO/IEC 23001-6, Dynamic Adaptive Streaming over HTTP", ISO/IEC JTC1/SC29/WG11MPEG2010/N11450, Jul. 31, 2010, 16 pp.

Luby M., "Simple Forward Error Correction (FEC) Schemes," draft-luby-rmt-bb-fec-supp-simple-00.txt, pp. 1-14, Jun. 2004.

Luby M., "LT Codes", Foundations of Computer Science, 2002, Proceedings, The 43rd Annual IEEE Symposium on, 2002.

Makoto N., et al., "On Tuning of Blocking LU decomposition for VP2000 series" The 42th Information Processing Society of Japan Conference (1st term in 1991), Feb. 25, 1991, pp. 71-72, 4B-8.

Morioka S., "A Verification Methodology for Error Correction Circuits over Galois Fields", Tokyo Research Laboratory, IBM Japan Ltd, pp. 275-280, Apr. 22-23, 2002.

Qualcomm Incorporated: "Adaptive HTTP Streaming: Complete Proposal", 3GPP TSG-SA4 AHI Meeting S4-AHI170, Mar. 2, 2010, URL, http://www.3gpp.org/FTP/tsg_sa/WG4_CODEC/Ad-hoc_MBS/Docs_AHI/S4-AHI170.zip, S4-AH170_CR_AdaptiveHTTPStreaming-Full.doc.

Qualcomm Incorporated: "Corrections to 3GPP Adaptive HTTP Streaming", 3GPP TSG-SA4 #59 Change Request 26.234 CR0172 S4-100403, Jun. 16, 2010, URL, http://www.3gpp.org/FTP/tsg_sa/WG4_CODEC/TSGS4_59/Docs/S4-100403.zip, S4-100403_CR_26234-0172-AdaptiveHTTPStreaming-Rel-9.doc.

Samukawa, H. "Blocked Algorithm for LU Decomposition" Journal of the Information Processing Society of Japan, Mar. 15, 1993, vol. 34, No. 3, pp. 398-408.

3GPP: "3rd Generation Partnership Project; Technical Specification Group Services and system Aspects; Multimedia Broadcast/Multicast Service (MBMS); Protocols and codecs (Release 6)", Sophia Antipolis, France, Jun. 1, 2005, XP002695256, Retrieved from the Internet: URL:http://www.etsi.org/deliver/etsi_ts/126300_126399/126346/06.01.00_60/ts_126346v060100p.pdf.

3GPP TS 26.234 V9.1.0 ,"3rd Generation Partnership Project; Technical Specification Group Services and System Aspects; Transparent end-to-end Packet-switched Streaming Service (PSS); Protocols and codecs (Release 9)", Dec. 2009, 179 pages.

3GPP TS 26.244 V9.1.0, 3rd Generation Partnership Project; Technical Specification Group Services and System Aspects; Transparent end-to-end packet switched streaming service (PSS); 3GPP file format (3GP), (Release 9), Mar. 2010, 55 pp.

3GPP TS 26.247, v1.5.0, 3rd Generation Partnership Project; Technical Specification Group Services and System Aspects Transparent end-to-end Packet-switched Streaming Service (PSS); Progressive Download and Dynamic Adaptive Streaming over HTTP (3GP-DASH) (Release 10), 2010, 91 pages.

3rd Generation Partnership Project, Technical Specification Group Services and System Aspects Transparent end-to-end packet switched streaming service (PSS), 3GPP file format (3GP) (Release 9) , 3GPP Standard, 3GPP TS 26.244, 3rd Generation Partnership Project (3GPP), Mobile Competence Centre, 650 Route des Lucioles, F-06921 Sophia-Antipolis Cedex, France, No. V8.1.0, Jun. 1, 2009, pp. 1-52. XP050370199.

3rd Generation Partnership Project; Technical Specification Group Services and System Aspects; Transparent end-to-end packet switched streaming service (PSS); 3GPP file format (3GP) (Release 9), 3GPP Standard; 3GPP TS 26.244, 3rd Generation Partnership Project (3GPP), Mobile Competence Centre; 650, Route des Lucioles; F-06921 Sophia-Antipolis Cedex; France, No. V9.2.0, Jun. 9, 2010, pp. 1-55, XP050441544, [retrieved on Jun. 9, 2010].

3rd Generation Partnership Project; Technical Specification Group Services and System Aspects; Transparent end-to-end Packet-switched Streaming Service (PSS); Progressive Download and Dynamic Adaptive Streaming over HTTP(3GP-DASH) (Release 10), 3GPP Standard; 3GPP TS 26.247, 3rd Generation Partnership Project (3GPP), Mobile Competence Centre ; 650, Route des Lucioles ; F-06921 Sophia-Antipolis Cedex ; France, vol. SA WG4, No. V10.0.0, Jun. 17, 2011, pp. 1-94, XP050553206, [retrieved on Jun. 17, 2011].

Aggarwal, C. et al.: "A Permutation-Based Pyramid Broadcasting Scheme for Video-on-Demand Systems," Proc. IEEE Int'l Conf. on Multimedia Systems, Hiroshima, Japan (Jun. 1996).

Aggarwal, C. et al.: "On Optimal Batching Policies for Video-on-Demand Storage Servers," Multimedia Systems, vol. 4, No. 4, pp. 253-258 (1996).

Albanese, A., et al., "Priority Encoding Transmission", IEEE Transactions on Information Theory, vol. 42, No. 6, pp. 1-22, (Nov. 1996).

Alex Zambelli, "IIS Smooth Streaming Technical Overview", Microsoft Mar. 25, 2009, XP002620446, Retrieved from the Internet: URL:http://www.microsoft.com/downloads/en/ details. aspx"FamilyID=03d22583-3ed6-44da-8464-b1b4b5ca7520, [retrieved on Jan. 21, 2011].

Almeroth, et al., "The use of multicast delivery to provide a scalable and interactive video-on-demand service", IEEE Journal on Selected Areas in Communication, 14(6): 1110-1122, (1996).

Alon, et al.: "Linear Time Erasure Codes with Nearly Optimal Recovery," Proceedings of the Annual Symposium on Foundations of Computer Science, US, Los Alamitos, IEEE Comp. Soc. Press, vol. Symp. 36, pp. 512-516 (Oct. 23, 1995) XP000557871.

Amin Shokrollahi: "LDPC Codes: An Introduction" Internet Citation Apr. 2, 2003, XP002360065 Retrieved from the Internet: URL : http ://www . ipm. ac . ir/IPM/homepage/Amin 2. pdf [retrieved on Dec. 19, 2005].

Amon P. et al., "File Format for Scalable Video Coding", IEEE Transactions on Circuits and Systems for Video Technology, IEEE Service Center, Piscataway, NJ, US, vol. 17, No. 9, Sep. 1, 2007, pp. 1174-1185, XP011193013, ISSN: 1051-8215, DOI:10.1109/TCSVT.2007.905521.

Anonymous: [Gruneberg, K., Narasimhan, S. and Chen, Y., editors] "Text of ISO/IEC 13818-1:2007/PDAM 6 MVC operation point descriptor", 90 MPEG Meeting; Oct. 26, 2009-Oct. 30, 2009; Xian; (Motion Picture Expertgroup or ISO/IEC JTC1/SC29/WG11), No. N10942, Nov. 19, 2009 XP030017441.

Anonymous: "Technologies under Consideration", 100. MPEG Meeting;Apr. 30, 2012-May 4, 2012; Geneva; (Motion Picture Expert Group or ISO/IEC JTC1 /SC29/WG11),, No. N12682, Jun. 7, 2012, XP030019156.

Anonymous: "Text of ISO/IEC 14496-12 3rd Edition", 83 MPEG Meeting; Jan. 14, 2008-Jan. 18, 2008; Antalya; (Motion Pictureexpert Group or ISO/IEC JTC1/SC29/WG11), No. N9678, Apr. 22, 2008, XP030016172.

Anonymous: "Text of ISO/IEC 14496-15 2nd edition", 91 MPEG Meeting; Jan. 18, 2010-Jan. 22, 2010; Kyoto; (Motion Picture Expertgroup or ISO/IEC JTC1/SC29/WG11),, No. N11139, Jan. 22, 2010, XP030017636, ISSN: 0000-0030 the whole document.

Atis: "PTV Content on Demand Service", IIF-WT-063R44, Nov. 11, 2010, pp. 1-124, XP055045168, Retrieved from the Internet: URL:ftp://vqeg.its.bldrdoc.gov/Documents/VQEG_Atlanta_Nov10/MeetingFiles/Liaison/IIF-WT-063R44_Content_on_Demand.pdf [retrieved on Nov. 22, 2012].

(56) References Cited

OTHER PUBLICATIONS

Bar-Noy, et al., "Competitive on-line stream merging algorithms for media-on-demand", Draft (Jul. 2000), pp. 1-34.
Bar-Noy et al. "Efficient algorithms for optimal stream merging for media-on-demand," Draft (Aug. 2000), pp. 1-43.
Bigloo, A. et al.: "A Robust Rate-Adaptive Hybrid ARQ Scheme and Frequency Hopping for Multiple-Access Communication Systems," IEEE Journal on Selected Areas in Communications, US, IEEE Inc, New York (Jun. 1, 1994) pp. 889-893, XP000464977.
Bitner, J.R., et al.: "Efficient Generation of the Binary Reflected Gray code and Its Applications," Communications of the ACM, pp. 517-521, vol. 19 (9), 1976.
Blomer, et al., "An XOR-Based Erasure-Resilient Coding Scheme," ICSI Technical Report No. TR-95-048 (1995) [avail. At ftp://ftp.icsi.berkeley.edu/pub/techreports/1995/tr-95-048.pdf].
Bouazizi I., et al., "Proposals for ALC/Flute server file format (14496-12Amd.2)", 77. MPEG Meeting; Jul. 17, 2006-Jul. 21, 2006; Klagenfurt; (Motion Pictureexpert Group or ISO/IEC JTC1/SC29/WG11), No. M13675, Jul. 12, 2006, XP030042344, ISSN: 0000-0236.
Bross, et al., "High efficiency video coding (HEVC) text specification draft 6," Joint Collaborative Team on Video Coding (JCT-VC) of ITU-T SG16 WP3 and ISO/IEC JTC1/SC29/WG11 JCTVC-H1003, 7th Meeting: Geneva, CH, Nov. 21-30, 2011, pp. 259.
Bross, et al., "High efficiency video coding (HEVC) text specification draft 7," Joint Collaborative Team on Video Coding (JCT-VC) of ITU-T SG16 WP3 and ISO/IEC JTC1/SC29/WG11 9th Meeting: Geneva, CH, Apr. 27-May 7, 2012, JCTVS-11003_d2, 290 pp.
Bross, et al., "High efficiency video coding (HEVC) text specification draft 8," Joint Collaborative Team on Video Coding (JCT-VC) of ITU-T SG16 WP3 and ISO/IEC JTC1/SC29/WG11 10th Meeting: Stockholm, SE, Jul. 11-20, 2012, JCTVC-J1003_d7, pp. 261.
Bross, et al., "WD4: Working Draft 4 of High-Efficiency Video Coding," JCTVC-F803_d2, (JCT-VC) of ITU-T SG16 WP3 and ISO/IEC JTC1/SC29/WG11 Joint Collaborative Team on Video Coding, 6th Meeting, Torino, IT, Jul. 14-22, 2011, 226 pages.
Bross, et al., "WD5: Working Draft 5 of High-Efficiency Video Coding," JCTVC-G1103_d2, (JCT-VC) of ITU-T SG16 WP3 and ISO/IEC JTC1/SC29/WG11 Joint Collaborative Team on Video Coding, 7th Meeting, Geneva, Switzerland (Nov. 2011), 214 pages.
Byers, J.W. et al.: "A Digital Fountain Approach to Reliable Distribution of Bulk Data," Computer Communication Review, Association for Computing Machinery. New York, US, vol. 28, No. 4 (Oct. 1998) pp. 56-67 XP000914424 ISSN:0146-4833.
Byers, J.W. et al.: "Accessing multiple mirror sites in parallel: using Tornado codes to speed up downloads," 1999, Eighteenth Annual Joint Conference of the IEEE Comupter and Communications Socities, pp. 275-283, Mar. 21, 1999, XP000868811.
Cataldi et al., "Sliding-Window Raptor Codes for Efficient Scalable Wireless Video Broadcasting With Unequal Loss Protection", IEEE Transactions on Image Processing, Jun. 1, 2010, pp. 1491-1503, vol. 19, No. 6, IEEE Service Center, XP011328559, ISSN: 1057-7149, DOI: 10.1109/TIP.2010.2042985.
Charles Lee L.H, "Error-Control Block Codes for Communications Engineers", 2000, Artech House, XP002642221 pp. 39-45.
Chen et al., "Response to the CfP on HTTP Streaming: Adaptive Video Streaming based on AVC", 93. MPEG Meeting; Jul. 26, 2010-Jul. 30, 2010; Geneva; (Motion Picture Expert Group or ISO/IEC JTC1/SC29/WG11), No. M17909, Jul. 26, 2010, XP030046499.
Choi S: "Temporally enhanced erasure codes for reliable communication protocols" Computer Networks, Elsevier Science Publishers B.V., Amsterdam, NL, vol. 38, No. 6, Apr. 22, 2002, pp. 713-730, XP004345778, ISSN: 1389-1286, DOI:10.1016/S1389-1286(01)00280-8.
Clark G.C., et al., "Error Correction Coding for Digital Communications, System Applications," Error Correction Coding for Digital Communications, New York, Plenum Press, US, Jan. 1, 1981, pp. 331-341.
D. Gozalvez et,al. "AL-FEC for Improved Mobile Reception of MPEG-2 DVB-Transport Streams" Hindawi Publishing Corporation, International Journal of Digital Multimedia Broadcasting vol. 2009, Dec. 31, 2009, pp. 1-10, XP002582035 Retrieved from the Internet: URL:http://www.hindawi.com/journals/ijdmb/ 2009/614178.html> [retrieved on May 12, 2010].
Dan, A. et al.: "Scheduling Policies for an On-Demand Video Server with Batching," Proc. ACM Multimedia, pp. 15-23 (Oct. 1998).
Davey, M.C. et al.: "Low Density Parity Check Codes over GF(q)" IEEE Communications Letters, vol. 2, No. 6 pp. 165-167 (1998).
Digital Fountain: "Specification Text for Raptor Forward Error Correction," TDOC S4-050249 of 3GPP TSG SA WG 4 Meeting #34 [Online] (Feb. 25, 2005) pp. 1-23, XP002425167, Retrieved from the Internet: URL:http://www.3gpp.org/ftp/tsg_sa/WG4_CODEC/TSGS4_34/Docs.
Digital Fountain: "Raptor code specification for MBMS file download," 3GPP SA4 PSM AD-HOC #31 (May 21, 2004) XP002355055 pp. 1-6.
"Digital Video Broadcasting (DVB); Guidelines for the implementation of DVB-IP Phase 1 specifications; ETSI TS 102542" ETSI Standards, LIS, Sophia Antipoliscedex, France, vol. BC, No. V1.2.1, Apr. 1, 2008, XP014041619 ISSN: 0000-0001 p. 43 p. 66 pp. 70, 71.
DVB-IPI Standard: DVB BlueBook A086r4 (Mar. 2007) Transport of MPEG 2 Transport Streatm (TS) Based DVB Services over IP Based Networks, ETSI Technical Specification 102 034 v1.3.1.
Eager, et al. "Minimizing bandwidth requirements for on-demand data delivery," Proceedings of the International Workshop on Advances in Multimedia Information Systems,p. 80-87 (Indian Wells, CA Oct. 1999).
Eager, et al., "Optimal and efficient merging schedules for video-on-demand servers", Proc. ACM Multimedia, vol. 7, pp. 199-202 (1999).
Esaki, et al.: "Reliable IP Multicast Communication Over ATM Networks Using Forward Error Correction Policy," IEICE Transactions on Communications, JP, Institute of Electronics Information and Comm. ENG. Tokyo, vol. E78-V, No. 12, (Dec. 1995), pp. 1622-1637, XP000556183.
Feng, G., Error Correcting Codes over Z2m for Algorithm-Based Fault-Tolerance, IEEE Transactions on Computers, vol. 43, No. 3, Mar. 1994, pp. 370-374.
Fernando, et al., "httpstreaming of MPEG Media—Response to CfP", 93 MPEG Meeting; Jul. 26, 2010-Jul. 30, 2010; Geneva; (Motion Picture Expert Group or ISO/IEC JTC1/SCE29/WG11), No. M17756, Jul. 22, 2010, XP030046346.
Fielding et al., "RFC 2616: Hypertext Transfer Protocol HTTP/1.1", Internet Citation, Jun. 1999, pp. 165, XP002196143, Retrieved from the Internet: URL:http://www.rfc-editor-org/ [retrieved on Apr. 15, 2002].
Frojdh P., et al., "Study on 14496-12:2005/PDAM2 ALU/ Flute Server File Format", 78.MPEG Meeting; Oct. 23, 2006-Oct. 27, 2006; Hangzhou: (Motion Picturexpert Group or ISO/ IEC JTC1/SC29/WG11),, No. M13855, Oct. 13, 2006, XP030042523, ISSN: 0000-0233.
Gao, L. et al.: "Efficient Schemes for Broadcasting Popular Videos," Proc. Inter. Workshop on Network and Operating System Support for Digital Audio and Video, pp. 1-13 (1998).
Gasiba, Tiago et al., "System Design and Advanced Receiver Techniques for MBMS Broadcast Services" Proc. 2006 International Conference on Communications (ICC 2006), Jun. 1, 2006, pp. 5444-5450, XP031025781 ISBN: 978-1-4244-0354-7.
Gemmell, et al., "A Scalable Multicast Architecture for One-to-Many Telepresentations", Multimedia Computing and Systems, 1998/ Proceedings. IEEE International Conference on Austin, TX, USA Jun. 28-Jul. 1, 1998, Los Alamitos, CA USA, IEEE Comput. Soc, US, Jun. 28, 1998, pp. 128-139, XP010291559.
Gil A., et al., "Personalized Multimedia Touristic Services for Hybrid Broadcast/Broadband Mobile Receivers,"IEEE Transactions on Consumer Electronics, 2010, vol. 56 (1), pp. 211-219.
Goyal: "Multiple Description Coding: Compression Meets the Network," In Signal Processing Magazine, IEEE, vol. 18., Issue 5 (Sep. 2001) pp. 74-93 URL:http://www.rle.mit.edu/stir/documents/Goyal_SigProcMag2001_MD.pdf [Nov. 4, 2007].
Gozalvez D et, al: "Mobile reception of DVB-T services by means of AL-FEC protection" Proc. IEEE Intern. Symposium on Broadband

(56) References Cited

OTHER PUBLICATIONS

Multimedia Systems and Broadcasting (BMSB '09), IEEE, Piscataway, NJ, USA, May 13, 2009, pp. 1-5, XP031480155 ISBN: 978-1-4244-2590-7.
Gracie et al., "Turbo and Turbo-Like Codes: Principles and Applications in Telecommunications", Proceedings of the IEEE, Jun. 1, 2007, pp. 1228-1254, vol. 95, No. 6, IEEE, XP011189323, ISSN: 0018-9219, DOI: 10.1109/JPROC.2007.895197.
Hagenauer, J. : "Soft is better than hard" Communications, Coding and Cryptology, Kluwer Publication May 1994, XP002606615 Retrieved from the Internet : URL: http://www. Int . ei .turn. de/veroeffentlic hungen/1994/ccc94h. pdf [retrieved on Oct. 25, 2010].
Hannuksela M.M., et al., "DASH: Indication of Subsegments Starting with SAP", 97. MPEG Meeting; Jul. 18, 2011-Jul. 22, 2011; Torino; (Motion Picture Expert Group or ISO/IEC JTC1/SC29/WG11) No. m21096, Jul. 21, 2011, XP030049659.
Hannuksela M.M., et al., "ISOBMFF: SAP definitions and 'sidx' box", 97. MPEG Meeting; Jul. 18, 2011-Jul. 22, 2011; Torino; (Motion Picture Expert Group or ISO/IEC JTC1/SC29/WG11) No. m21435, Jul. 22, 2011, XP030049998.
Hershey, et al., "Random Parity Coding (RPC)", 1996 IEEE International Conference on Communications (ICC). Converging Technologies for Tomorrow's Applications. Dallas, Jun. 23-27, 1996, IEEE International Conference on Communications (ICC), New York, IEEE, US, vol. 1, Jun. 23, 1996, pp. 122-126, XP000625654.
Hua, et al., "Skyscraper broadcasting: A new broadcsting system for metropolitan video-on-demand systems", Proc. ACM SIGCOMM, pp. 89-100 (Cannes, France, 1997).
Huawei et al., "Implict mapping between CCE and PUCCH for ACK/NACK TDD", 3GPP Draft; R1-082359, 3rd Generation Partnership Project (3GPP), Mobile Competence Centre; 650, Route des Lucioles ; F-06921 Sophia-Antipolis Cedex ; France, vol. RAN WG1, no. Warsaw, Poland, Jun. 24, 2008, XP050110650, [retrieved on Jun. 24, 2008].
IETF RFC 2733: Rosenberg, J. et al. "An RTP Payload Format for Generic Forward Error Correction," Network Working Group, RFC 2733 (Dec. 1999).
International Search Report and Written Opinion—PCT/US2012/053394—ISA/EPO—Feb. 6, 2013.
International Search Report and Written Opinion—PCT/US2013/033852—ISA/EPO—Jun. 11, 2013.
International Standard ISO/IEC 14496-12, Information Technology—Coding of audio-visual objects—Part 12: ISO base media file format, Third Edition, Oct. 15, 2008, 120 pp.
ISO/IEC JTC 1/SC 29, ISO/IEC FCD 23001-6, Information technology—MPEG systems technologies—Part 6: Dynamic adaptive streaming over HTTP (DASH), Jan. 28, 2011.
ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.
Jiang J., "File Format for Scalable Video Coding", PowerPoint Presentation for CMPT 820, Summer 2008.
Jin Li, "The Efficient Implementation of Reed-Solomon High Rate Erasure Resilient Codes" Proc. 2005 IEEE International Conference on Acoustics, Speech, and Signal Processing, Philadelphia, PA, USA, IEEE, Piscataway, NJ, vol. 3, Mar. 18, 2005, pp. 1097-1100, XP010792442, DOI: 10.1109/ICASSP.2005.1415905 ISBN: 978-0-7803-8874-1.
Juhn, L. et al.: "Adaptive Fast Data Broadcasting Scheme for Video-on-Demand Service," IEEE Transactions on Broadcasting, vol. 44, No. 2, pp. 182-185 (Jun. 1998).
Juhn, L. et al.: "Harmonic Broadcasting for Video-on-Demand Service," IEEE Transactions on Broadcasting, vol. 43, No. 3, pp. 268-271 (Sep. 1997).
Kallel, "Complementary Punctured Convolutional (CPC) Codes and Their Applications", IEEE Transactions on Communications, IEEE Inc., New York, US, vol. 43, No. 6, Jun. 1, 1995, pp. 2005-2009.
Kimura et al., "A Highly Mobile SDM-0FDM System Using Reduced-Complexity-and-Latency Processing", IEEE International Symposium on Personal, Indoor, and Mobile Radio Communications (PIMRC), Sep. 1, 2007, pp. 1-5, IEEE, XP031168836, ISBN: 978-1-4244-1143-6, DOI: 10.1109/PIMRC.2007.4394758.
Kozamernik F: "Media streaming over the Internet", Internet Citation, Oct. 2002, XP002266291, Retrieved from the Internet: URL: http://www.ebu.ch/trev_292-kozamerni k. pdf [retrieved on Jan. 8, 2004] section "Video codecs for scalable streaming".
Lee L., et al., "VLSI implementation for low density parity check decodere", Proceedings of the 8th IEEE International Confernce on Electronics, Circuits and Systems, 2001. ICECS 2001, Sep. 2, 2001, vol. 3, pp. 1223-1226.
Li, M., et al., "Playout Buffer and Rate Optimization for Streaming over IEEE 802.11 Wireless Networks", Aug. 2009, Worcester Polytechnic Institute, USA.
Lin, S. et al.: "Error Control Coding-Fundamentals and Applications," 1983, Englewood Cliffs, pp. 288, XP002305226.
Luby Digital Fountain A Shokrollahi Epfl M Watson Digital Fountain T Stockhammer Nomor Research M: "Raptor Forward Error Correction Scheme for Object Delivery; rfc5053.txt", IETF Standard, Internet Engineering Task Force, IETF, CH, Oct. 1, 2007, XP015055125, ISSN: 0000-0003.
Luby, et al., "Analysis of Low Density Codes and Improved Designs Using Irregular Graphs", 1998, Proceedigns of the 30th Annual ACM Symposium on Theory of Computing, May 23, 1998, pp. 249-258, XP000970907.
Luby, et al.: "Analysis of Low Density Codes and Improved Designs Using Irregular Graphs," International Computer Science Institute Technical Report TR-97-045 (Nov. 1997) [available at ftp://ftp.icsi.berkeley.edu/pub/techreports/1997/tr-97-045.pdf].
Luby, et al., "Flute—File Delivery over Unidirectional Transport", IETF RFC 3926, Oct. 2004, pp. 1-35.
Luby et al., "Improved Low-Density Parity-Check Codes Using Irregular Graphs and Belief Propogation", Information Theory, 1998. Proceedings. 1998 IEEE International Symposium on Cambridge, MA, USA Aug. 16-21, 1998, pp. 1-9, New York, NY, USA, IEEE, US Aug. 16, 1999.
Luby et, al. "Layered Coding Transport (LCT) Building Block", IETF RFC 5651, pp. 1-42, (Oct. 2009).
Luby et al., RaptorQ Forward Error Correction Scheme for Object Delivery draft-ietf-rmt-bb-fec-raptorq-00, Qualcomm, Inc. Jan. 28, 2010.
Luby, M. et al.: "Efficient Erasure Correction Codes," 2001, IEEE Transactions on Information Theory, Vo. 47, No. 2, pp. 569-584, XP002305225.
Luby, M., et, al. "Forward Error Correction (FEC) Building Block", IETF RFC 5052, pp. 1-31, (Aug. 2007).
Luby M et al: "IPTV Systems, Standards and Architectures: Part II—Application Layer FEC in IPTV Services" IEEE Communications Magazine, IEEE Service Center, Piscataway, US LNKDDOI: 10.1109/MCOM.2008.4511656, vol. 46, No. 5, May 1, 2008, pp. 94-101, XP011226858 ISSN: 0163-6804.
Luby, M. et al.: "Pairwise Independence and Derandomization," Foundations and Trends in Theoretical Computer Science, vol. 1, Issue 4, 2005, Print ISSN 1551-305X, Online ISSN 1551-3068.
Luby, M. et al., "Practical Loss-Resilient Codes: Tornado Codes," 29th Annual ACM Symposium on Theory of Computing, vol. SYMP. 29, May 4, 1997, pp. 150-159, XP002271229.
Luby, M., et al., "Raptor Forward Error Correction Scheme for Object Delivery", IETF RFC5053, pp. 1-46 (Sep. 2007).
Luby M. et al., "RaptorQ Forward Error Correction Scheme for Object Delivery", IETF draft ietf-rmt-bb-fec-raptorq-04, Reliable Multicast Transport, Internet Engineering Task Force (IETF), Standard Workingdraft, Internet Society (ISOC), Aug. 24, 2010, pp. 1-68, XP015070705, [retrieved on Aug. 24, 2010].
Luby, M., et al., "Request for Comments: 3453: The Use of Forward Error Correction (FEC) in Reliable Multicast," Internet Article, [Online] Dec. 2002, pp. 1-19.
Luby, Michael G. "Analysis of Random Processes via and-or Tree Evaluation," Proceedings of the 9th Annual ACM-SIAM Symposium

(56) References Cited

OTHER PUBLICATIONS on Discrete Algorithms,TR-97-0, 1998, pp. 364-373, (search date: Jan. 25, 2010) URL: <http://portal. acm.prg.citation.cfm"id=314722>.

Luby Qualcomm Incorporated, "Universal Object Delivery using RaptorQ; draft-luby-uod-raptorq-OO.txt", Internet Engineering Task Force (IETF), Standardworkingdraft, Internet Society (ISOC), Mar. 7, 2011, pp. 1-10, XP015074424, [retrieved on Mar. 7, 2011].

Mackay, "Fountain codes Capacity approaching codes design and implementation", IEE Proceedings: Communications, Dec. 9, 2005, pp. 1062-1068, vol. 152, No. 6, Institution of Electrical Engineers, XP006025749, ISSN: 1350-2425, DOI: 10.1049/IP-COM:20050237.

Mandelbaum D.M., "An Adaptive-Feedback Coding Scheme Using Incremental Redundancy", IEEE Trans on Information Theory, vol. May 1974, pp. 388-389, XP002628271, the whole document.

Matsuoka H., et al., "Low-Density Parity-Check Code Extensions Applied for Broadcast-Communication Integrated Content Delivery", Research Laboratories, NTT DOCOMO, Inc., 3-6, Hikari-No-Oka, Yokosuka, Kanagawa, 239-8536, Japan, ITC-SS21, 2010 IEICE, pp. 59-63.

Michael G et al., "Improved low-density parity-check codes using irregular graphs", Information Theory, IEEE Transactions on,Feb. 2001,vol. 47,No. 2,pp. 585-598.

Mimnaugh, A et, al. "Enabling Mobile Coverage for DVB-T" Digital Fountain Whitepaper Jan. 29, 2008, pp. 1-9, XP002581808 Retrieved from the Internet: URL:http://www.digitalfountain.com/ufiles/library/DVB-T-whitepaper.pdf> [retrieved on May 10, 2010].

Min-Goo Kim: "On systematic punctured convolutional codes", IEEE Trans on Communications, vol. 45, No. 2, Feb. 1997, XP002628272, the whole document, pp. 133-139.

Motorola et al: "An Analysis of DCD Channel Mapping to BCAST File Delivery Sessions; OMA-CD-DCD-2007-0112-INP_DCD_Channel_Mapping_to_BCAST_File_Delivery", OMA-CD-DCD-2007-0112-INP_DCD_Channel_Mapping_to_BCAST_File_Delivery, Open Mobile Allicance (OMA), 4330 La Jolla Village Dr., Suite 110 San Diego, CA 92122; USA Oct. 2, 2007, pp. 1-13, XP064036903.

Muller, et al., "A test-bed for the dynamic adaptive streaming over HTTP featuring session mobility" MMSys '11 Proceedings of the second annual ACM conference on Multimedia systems, Feb. 23-25, 2011, San Jose, CA, pp. 271-276.

Naguib, Ayman, et al., "Applications of Space-Time Block Codes and Interference Suppression for High Capacity and High Data Rate Wireless Systems," IEEE, 1998, pp. 1803-1810.

Narayanan, et al., "Physical Layer Design for Packet Data Over IS-136", Vehicular Technology Conference, 1997, IEEE 47th Phoenix, AZ, USA May 4-7, 1997, New York, NY, USA, IEEE, US May 4, 1997, pp. 1029-1033.

Nokia: "Reed-Solomon Code Specification for. MBMS Download and Streaming Services", 3GPP Draft; S4-050265_RS_SPEC, 3rd Generation Partnership Project (3GPP), Mobile Competence Centre ; 650, Route des Lucioles ; F-06921 Sophia-Antipolis Cedex ; France, vol. SA WG4, No. San Diego, USA; Apr. 15, 2005, XP050287675, [retrieved on Apr. 15, 2005].

Nokia Corp., "Usage of 'mfra' box for Random Access and Seeking," S4-AHI127, 3GPP Ad-Hoc Meeting, Dec. 14-16, 2009, Paris, FR, 2 pp.

Nonnenmacher, et al., "Parity-Based Loss Recovery for Reliable Multicast Transmission", IEEE / ACM Transactions on Networking, IEEE Inc. New York, US, vol. 6, No. 4, Aug. 1, 1998, pp. 349-361.

Ohashi A et al., "Low-Density Parity-Check (LDPC) Decoding of Quantized Data," Technical Report of the Institute of Electronics, Information and Communication Engineers, Aug. 23, 2002, vol. 102, No. 282, pp. 47-52, RCS2002-154.

Ozden, B. et al.: "A Low-Cost Storage Service for Movie on Demand Databases," Proceedings of the 20th Very Large DataBases (VLDB) Conference, Santiago, Chile (1994).

PA. Chou, A. Mohr, A. Wang, S. Mehrotra, "FEC and Pseudo-ARQ for Receiver-Driven Layered Multicast of Audio and Video," pp. 440-449, IEEE Computer Society, Data Compression Conference (2000).

Pantos, "HTTP Live Streaming draft-pantos-http-live-streaming-02", Informational, Internet-Draft, Intended status: Informational, Expires: Apr. 8, 2010, http://tools.ietf.org/html/draft-pantos-http-live-streaming-02, pp. 1-20, Oct. 5, 2009.

Pantos R et al., "HTTP Live Streaming; draft-pantos-http-live-streaming-OT.txt", HTTP Live Streaming; Draft-Pantos-HTTP-Live-Streaming-01.Txt, Internet Engineering Task Force, IETF; Standardworkingdraft, Internet Society (ISOC) 4, Rue des Falaises CH- 1205 Geneva, Switzerland, No. 1, Jun. 8, 2009, XP015062692.

Paris, et al., "A low bandwidth broadcasting protocol for video on demand", Proc. International Conference on Computer Communications and Networks, vol. 7, pp. 690-697 (Oct. 1998).

Paris, et al., "Efficient broadcasting protocols for video on demand", International Symposium on Modeling, Analysis and Simulation of Computer and Telecommunication systems (MASCOTS), vol. 6, pp. 127-132 (Jul. 1998).

Perkins, et al.: "Survey of Packet Loss Recovery Techniques for Streaming Audio," IEEE Network; Sep./Oct. 1998, pp. 40-48.

Plank J. S., "A Tutorial on Reed-Solomon Coding for Fault-Tolerance I N Raid-Like Systems", Software Practice & Experience, Wiley & Sons, Bognor Regis, GB, vol. 27, No. 9, Sep. 1, 1997, pp. 995-1012, XP00069594.

Pless and WC Huffman EDS V S: Algebraic geometry codes, Handbook of Coding Theory, 1998, pp. 871-961, XP002300927.

Pursley, et al.: "Variable-Rate Coding for Meteor-Burst Communications," IEEE Transactions on Communications, US, IEEE Inc. New York (1989) vol. 37, No. 11, pp. 1105-1112 XP000074533.

Pursley, M. et al.: "A Correction and an Addendum for Variable-Rate Coding for Meteor-Burst Communications," IEEE Transactions on Communications, vol. 43, No. 12 pp. 2866-2867 (Dec. 1995).

Pyle, et al., "Microsoft http smooth Streaming: Microsoft response to the Call for Proposal on httpstreaming", 93 MPEG Meeting; Jul. 26, 2010-Jul. 30, 2010; Geneva; (Motion Picture Expert Group or ISO/IEC JTC1/SCE29/WG11), No. M17902, Jul. 22, 2010, XP030046492.

Qualcomm Europe S A R L: "Baseline Architecture and Definitions for HTTP Streaming", 3GPP Draft; S4-090603_HTTP_Streaming_Architecture, 3rd Generation Partnership Project (3GPP), Mobile Competence Centre; 650, Route des Lucioles; F-06921 Sophia-Antipolis Cedex; France, No. Kista; Aug. 12, 2009, XP050356889.

Qualcomm Incorporated: "Use cases and Examples for Adaptive httpstreaming", 3GPP Draft; S4-100408-Usecases-HSD, 3rd Generation Partnership Project (JGPP), Mobile Competence Centre; 650, Route des Lucioles; F-06921 Sophia-Antipolis Cedex; France, vol. SA WG4, no. Prague, Czech Republic; Jun. 21, 2010, Jun. 17, 2010, XP050438085, [retrieved on Jun. 17, 2010].

Rangan, et al., "Designing an On-Demand Multimedia Service," IEEE Communication Magazine, vol. 30, pp. 56-64, (Jul. 1992).

Realnetworks Inc et al., "Format for HTTP Streaming Media Presentation Description", 3GPP Draft; S4-100020, 3rd Generation Partnership Project (3GPP), Mobile Competence Centre; 650, Route des Lucioles; F-06921 Sophia-Anti Polis Cedex; France, vol. SA WG4, no. St. Julians, Malta; Jan. 25, 2010, Jan. 20, 2010, XP050437753, [retrieved on Jan. 20, 2010].

Research in Motion UK Limited: "An MPD delta file for httpstreaming", 3GPP Draft; S4-100453, 3rd Generation Partnership Project (SGPP), Mobile Competence Centre; 650, Route des Lucioles; F-06921 Sophia-Antipolis Cedex; France, vol. SA WG4, no. Prague, Czech Republic; Jun. 21, 2010, Jun. 16, 2010, XP050438066, [retrieved on Jun. 16, 2010].

Rhyu, et al., "Response to Call for Proposals on httpstreaming of MPEG Media", 93 MPEG Meeting; Jul. 26, 2010-Jul. 30, 2010; Geneva; (Motion Picture Expert Group or ISO/IEC JTC1/SCE29/WG11) No. M17779, Jul. 26, 2010, XP030046369.

Rizzo L. "Effective Erasure Codes for Reliable Computer Communications Protocols," Computer Communication Review, 27 (2) pp. 24-36 (Apr. 1, 1997), XP00069616.

(56) References Cited

OTHER PUBLICATIONS

Roca, V. et al.: "Design, Evaluation and Comparison of Four Large Block FEC Codecs, LDPC, LDGM, LDGM Staircase and LDGM Triangle, plus a Reed-Solomon Small Block FEC Codec," INRIA Research Report RR-5225 (2004).
Roca, V., et, al. "Low Density Parity Check (LDPC) Staircase and Triangle Forward Error Correction (FEC) Schemes", IETF RFC 5170 (Jun. 2008), pp. 1-34.
Rost, S. et al., "The Cyclone Server Architecture: streamlining delivery of popular content," 2002, Computer Communications, vol. 25, No. 4, pp. 1-10.
Roth, R., et al., "A Construction of Non-Reed-Solomon Type MDS Codes", IEEE Transactions of Information Theory, vol. 35, No. 3, May 1989, pp. 655-657.
Roth, R., "On MDS Codes via Cauchy Matrices", IEEE Transactions on Information Theory, vol. 35, No. 6, Nov. 1989, pp. 1314-1319.
Roumy A., et al., "Unequal Erasure Protection and Object Bundle Protection with the Generalized Object Encoding Approach", Inria-00612583, Version 1, Jul. 29, 2011, 25 pages.
Schulzrinne, et al., "Real Time Streaming Protocol (RTSP)" Network Working Group, Request for Comments: 2326, Apr. 1998, pp. 1-92.
Seshan, S. et al., "Handoffs in Cellular Wireless Networks: The Daedalus Implementation and Experience," Wireless Personal Communications, NL; Kluwer Academic Publishers, vol. 4, No. 2 (Mar. 1, 1997) pp. 141-162, XP000728589.
Shacham: "Packet Recovery and Error Correction in High-Speed Wide-Area Networks," Proceedings of the Military Communications Conference. (MILCOM), US, New York, IEEE, vol. 1, pp. 551-557 (1989) XP000131876.
Shierl T; Gruneberg K; Narasimhan S; Vetro A: "ISO/IEC 13818-1:2007/FPDAM 4—Information Technology Generic Coding of Moving Pictures and Audio Systems amendment 4: Transport of Multiview Video over ITU-T Rec H.222.0 ISO/IEC 13818-1" ITU-T Rec. H.222.0(May 2006)FPDAM 4, vol. MPEG2009, No. 10572, May 11, 2009, pp. 1-20, XP002605067 p. 11, last two paragraphs sections 2.6.78 and 2.6.79 table T-1.
Shokrollahi, A.: "Raptor Codes," Internet Citation [Online] (Jan. 13, 2004) XP002367883, Retrieved from the Internet: URL:http://www.cs.huji.ac.il/labs/danss/p2p/resources/raptor.pdf.
Shokrollahi, Amin. "Raptor Codes," IEEE Transactions on Information Theory, Jun. 2006, vol. 52, No. 6, pp. 2551-2567, (search date: Feb. 1, 2010) URL: <http://portal.acm.org/citation.cfm"id=1148681>.
Shokrollahi et al., "Design of Efficient Easure Codes with Differential Evolution", IEEE International Symposium on Information Theory, Jun. 25, 2000, pp. 5-5.
Sincoskie, W. D., "System Architecture for Large Scale Video on Demand Service," Computer Network and ISDN Systems, pp. 155-162, (1991).
Stockhammer T., et al., "DASH: Improvements on Representation Access Points and related flags", 97. MPEG Meeting; Jul. 18, 2011-Jul. 22, 2011; Torino; (Motion Picture Expert Group or ISO/IEC JTC1/SC29/WG11) No. m20339, Jul. 24, 2011, XP030048903.
Stockhammer, "WD 0.1 of 23001-6 Dynamic Adaptive Streaming over HTTP (DASH)", MPEG-4 Systems, International Organisation for Standardisation, ISO/IEC JTC1/SC29/WG11, Coding of Moving Pictures and Audio, MPEG 2010 Geneva/m11398, Jan. 6, 2011, 16 pp.
Sullivan et al., Document: JVT-AA007, "Editors' Draft Revision to ITU-T Rec. H.264|ISO/IEC 14496-10 Advanced Video Coding—In Preparation for ITU-T SG 16 AAP Consent (in integrated form)," Joint Video Team (JVT) of ISO/IEC MPEG & ITU-T VCEG (ISO/IEC JTC1/SC29/WG11 and ITU-T SG16 Q.6), 30th Meeting: Geneva, CH, Jan. 29-Feb. 3, 2009, pp. 1-683, http://wftp3.itu.int/av-arch/jvt-site/2009_01_Geneva/JVT-AD007.zip.
Sun, et al., "Seamless Switching of Scalable Video Bitstreams for Efficient Streaming," IEEE Transactions on Multimedia, vol. 6, No. 2, Apr. 2004, pp. 291-303.
Telefon AB LM Ericsson, et al., "Media Presentation Description in httpstreaming", 3GPP Draft; S4-100080-MPD, 3rd Generation Partnership Project (3GPP), Mobile Competence Centre; 650, Route des Lucioles; F-06921 Sophia-Antipolis Cedex; France, vol. SA WG4, no. St. Julians, Malta; Jan. 25, 2010 Jan. 20, 2010, XP050437773, [retrieved on Jan. 20, 2010].
Todd, "Error Correction Coding: Mathematical Methods and Algorithms", Mathematical Methods and Algorithms, Jan. 1, 2005, pp. 451-534, Wiley, XP002618913.
Tsunoda T., et al., "Reliable Streaming Contents Delivery by Using Multiple Paths," Technical Report of The Institute of Electronics, Information and Communication Engineers, Japan, Mar. 2004, vol. 103, No. 692, pp. 187-190, N52003-331, IN2003-286.
U.S. Appl. No. 12/840,146, by Ying Chen et al., filed Jul. 20, 2010.
U.S. Appl. No. 12/908,537, by Ying Chen et al., filed Oct. 20, 2010.
U.S. Appl. No. 12/908,593, by Ying Chen et al., filed Oct. 20, 2010.
Universal Mobile Telecommunications System (UMTS); LTE; Transparent end-to-end Packet-switched Streaming Service (PSS); Protocols and codecs (3GPP TS 26.234 version 9.3.0 Release 9), Technical Specification, European Telecommunications Standards Institute (ETSI), 650, Route des Lucioles; F-06921 Sophia-Antipolis; France, vol. 3GPP SA, No. V9.3.0, Jun. 1, 2010, XP014047290, paragraphs [5.5.4.2], [5.5.4.3], [5.5.4.4], [5.4.5], [5.5.4.6] paragraphs [10.2.3], [11.2.7], [12.2.3], [12.4.2], [12.6.2] paragraphs.
Viswanathan, et al., "Metropolitan area video-on-demand services using pyramid broadcasting", Multimedia Systems, 4(4): 197-208 (1996).
Viswanathan, et al., "Pyramid Broadcasting for Video-on-Demand Service", Proceedings of the SPIE Multimedia Computing and Networking Conference, vol. 2417, pp. 66-77 (San Jose, CA, Feb. 1995).
Viswanathan,Subramaniyam R., "Publishing in Wireless and Wireline Environments," Ph. D Thesis, Rutgers, The State University of New Jersey (Nov. 1994), 180pages.
Wadayama T, "Introduction to Low Density Parity Check Codes and Sum-Product Algorithm," Technical Report of the Institute of Electronics, Information and Communication Engineers, Dec. 6, 2001, vol. 101, No. 498, pp. 39-46, MR2001-83.
Watson, M., et, al. "Asynchronous Layered Coding (ALC) Protocol Instantiation", IETF RFC 5775, pp. 1-23, (Apr. 2010).
Wiegand, T., et al., "WD2: Working Draft 2 of High-Efficiency Video Coding", Jan. 28, 2011, No. JCTVC-D503, Jan. 28, 2011, XP002679642, Retrieved from the Internet: URL: http://wftp3.itu.int/av-arch/jctvc-site/2011_01_D_Daegu/ [retrieved on Jul. 11, 2012].
Wiegand, T., et al., "WD3: Working Draft 3 of High-Efficiency Video Coding," Document JCTVC-E603, 5th Meeting: Geneva, CH, Mar. 16-23, 2011,pp. 193.
Wiegand, T., et al.,"WD1: Working Draft 1 of High-Efficiency Video Coding", JCTVC-C403, Joint Collaborative Team on Video Coding (JCT-VC), of ITU-T SG16 WP3 and ISO/IEC JTC1/SC29/WG11, 3rd Meeting: Guangzhou, CN, Oct. 7-15, 2010.
Wong, J.W., "Broadcast delivery", Proceedings of the IEEE, 76(12): 1566-1577, (1988).
Yamanouchi N., et al., "Internet Multimedia Transmission with Packet Recovery by Using Forward Error Correction," Proceedings of DPS Workshop, The Information Processing Society of Japan, Dec. 6, 2000, vol. 2000, No. 15, pp. 145-150.
Yamauchi, Nagamasa. "Application of Lost Packet Recovery by Front Error Correction to Internet Multimedia Transfer" Proceedings of Workshop for Multimedia Communication and Distributed Processing, Japan, Information Processing Society of Japan (IPS), Dec. 6, 2002, vol. 2000, No. 15, pp. 145-150.
Yamazaki M., et al., "Multilevel Block Modulation Codes Construction of Generalized DFT," Technical Report of the Institute of Electronics, Information and Communication Engineers, Jan. 24, 1997, vol. 96, No. 494, pp. 19-24, IT96-50.
Yin et al., "Modified Belief-Propogation algorithm for Decoding of Irregular Low-Density Parity-Check Codes", Electronics Letters, IEE Stevenage, GB, vol. 38, No. 24, Nov. 21, 2002, pp. 1551-1553.
Zorzi, et al.: "On the Statistics of Block Errors in Bursty Channels," IEEE Transactions on Communications, vol. 45, No. 6, Jun. 1997, pp. 660-667.
Gerard F., et al., "HTTP Streaming MPEG media—Response to CFP", 93. MPEG Meeting, Geneva Jul. 26, 2010 to Jul. 30, 2010.

(56) References Cited

OTHER PUBLICATIONS

Anonymous: "Technologies under Consideration", 98. MPEG Meeting; Nov. 28, 2011-Dec. 2, 2011; Geneva; (Motion Picture Expert Group or ISO/IEC JTC1/SC29/WG11),, No. N12330, Dec. 3, 2011, XP030018825.

Anonymous: "Text of ISO/IEC IS 23009-1 Media Presentation Description and Segment Formats", 98. MPEG Meeting; Nov. 28, 2011-Dec. 2, 2012; Geneva; (Motion Picture Expert Group or ISO/IEC JTC1/SC29/WG11),, No. N12329, Jan. 6, 2012, XP030018824.

"Digital Video Broadcasting (DVB); Framing structure, channel coding and modulation for digital terrestrial television; ETSI EN 300 744" ETSI Standards, LIS, Sophia Antipolis Cedex, France, V1.6.1, pp. 9, Jan. 10, 2009.

Kim J., et al., "Enhanced Adaptive Modulation and Coding Schemes Based on Multiple Channel Reportings for Wireless Multicast Systems", 62nd IEEE Vehicular Technology Conference, VTC-2005-Fall, Sep. 25-28, 2005, vol. 2, pp. 725-729, XP010878578, DOI: 1 0.11 09/VETECF.2005.1558019, ISBN: 978-0-7803-9152-9.

Moriyama, S., "5. Present Situation of Terrestrial Digital Broadcasting in Europe and USA", Journal of the Institute of Image Information and Television Engineers, Nov. 20, 1999, vol. 53, No. 11, pp. 1476-1478.

Qualcomm Incorporated: "RaptorQ Technical Overview", pp. 1-12, Oct. 1, 2010.

International Preliminary Report on Patentability—PCT/US2013/033852, The International Bureau of WIPO—Geneva, Switzerland, Oct. 9, 2010.

Chikara S., et al., "Add-on Download Scheme for Multicast Content Distribution Using LT Codes", IEICE. B, Communications, Aug. 1, 2006, J89-B (8), pp. 1379-1389.

Hasan M A., et al., "Architecture for a Low Complexity Rate-Adaptive Reed-Solomon Encoder", IEEE Transactions on Computers, IEEE Service Center, Los Alamitos, CA, US, vol. 44, No. 7, Jul. 1995, pp. 938-942, XP000525729, ISSN: 0018-9340, DOI: 10.1109/12.392853.

Tetsuo M., et al., "Comparison of Loss Resilient Ability between Multi-Stage and Reed-Solomon Coding", Technical report of IEICE. CQ, Communication Quality, vol. 103 (178), Jul. 4, 2003, pp. 19-24.

Bross, et al., "High efficiency video coding (HEVC) text specification draft 6," JCTVC-H1003, Joint Collaborative Team on Video Coding (JCT-VC) of ITU-T SG16 WP3 and ISO/IEC JTC1/SC29/WG11, 8th Meeting: San José, CA, USA, Feb. 1-10, 2012, 259 pp.

Miller G., et al., "Bounds on the maximum likelihood decoding error probability of low density parity check codes", Information Theory, 2000. Proceedings. IEEE International Symposium on, 2000, p. 290.

Muramatsu J., et al., "Low density parity check matrices for coding of multiple access networks", Information Theory Workshop, 2003. Proceedings. 2003 IEEE , Apr. 4, 2003, pp. 304-307.

Watson M., et al., "Forward Error Correction (FEC) Framework draft-ietf-fecframe-framework-11," 2011, pp. 1-38, URL,http://tools.ietf.org/pdf/draft-ietf-fecframe-framework-11.pdf.

Watson M., et al., "Raptor FEC Schemes for FECFRAME draft-ietf-fecframe-raptor-04," 2010, pp. 1-21, URL, http://tools.ietf.org/pdf/draft-ietf-fecframe-raptor-04.pdf.

\* cited by examiner

```
 0                   1                   2                   3
 0 1 2 3 4 5 6 7 8 9 0 1 2 3 4 5 6 7 8 9 0 1 2 3 4 5 6 7 8 9 0 1
```
| Source Block Number (SBN) (16 bits) | Encoding Symbol ID (ESI) (16 bits) |
|---|---|

FIG. 2A (PRIOR ART)

```
 0                   1                   2                   3
 0 1 2 3 4 5 6 7 8 9 0 1 2 3 4 5 6 7 8 9 0 1 2 3 4 5 6 7 8 9 0 1
```
| Source Block Number (SBN) (8 bits) | Encoding Symbol ID (ESI) (24 bits) |
|---|---|

FIG. 2B (PRIOR ART)

```
0                   1                   2                   3
0 1 2 3 4 5 6 7 8 9 0 1 2 3 4 5 6 7 8 9 0 1 2 3 4 5 6 7 8 9 0 1
```
| Universal File Symbol Identifier (UFSI) |
| (32 bits) |

Fig. 9

Example object with FEC Payload ID (SBN, ESI)

| ESI 0 | ESI 1 | ESI 2 | ESI 3 | ESI 4 | ESI 5 | ESI 6 | ESI 7 | Src blk 0 |
| ESI 0 | ESI 1 | ESI 2 | ESI 3 | ESI 4 | ESI 5 | ESI 6 | ESI 7 | Src blk 1 |
| ESI 0 | ESI 1 | ESI 2 | ESI 3 | ESI 4 | ESI 5 | ESI 6 | ESI 7 | Src blk 2 |
| ESI 0 | ESI 1 | ESI 2 | ESI 3 | ESI 4 | ESI 5 | ESI 6 | ESI 7 | Src blk 3 |
| ESI 0 | ESI 1 | ESI 2 | ESI 3 | ESI 4 | ESI 5 | ESI 6 | ESI 7 | Src blk 4 |
| ESI 0 | ESI 1 | ESI 2 | ESI 3 | ESI 4 | ESI 5 | ESI 6 | ESI 7 | Src blk 5 |

Fig. 13

Example object with FEC Payload ID (UOSI)

| 0 | 6  | 12 | 18 | 24 | 30 | 36 | 42 | Src blk 0 |
| 1 | 7  | 13 | 19 | 25 | 31 | 37 | 43 | Src blk 1 |
| 2 | 8  | 14 | 20 | 26 | 32 | 38 | 44 | Src blk 2 |
| 3 | 9  | 15 | 21 | 27 | 33 | 39 | 45 | Src blk 3 |
| 4 | 10 | 16 | 22 | 28 | 34 | 40 | 46 | Src blk 4 |
| 5 | 11 | 17 | 23 | 29 | 35 | 41 | 47 | Src blk 5 |

Fig. 14

UNIVERSAL OBJECT DELIVERY AND TEMPLATE-BASED FILE DELIVERY

CROSS-REFERENCE TO RELATED APPLICATIONS

The present application claims the benefit of U.S. Provisional Application No. 61/615,796 entitled "Universal Object Delivery and Template-Based FLUTE Delivery," filed Mar. 26, 2012, the entire contents of which is herein incorporated by reference in its entirety for all purposes.

FIELD OF THE INVENTION

The present invention relates to encoding and decoding data in communications systems and more specifically to communication systems that encode and decode data to account for errors and gaps in communicated data in an efficient manner and that handle different file delivery methods, as well as using existing infrastructures for novel file delivery processes.

BACKGROUND OF THE INVENTION

Techniques for transmission of files between a sender and a recipient over a communications channel are the subject of much literature. Preferably, a recipient desires to receive an exact copy of data transmitted over a channel by a sender with some level of certainty. Where the channel does not have perfect fidelity (which covers most all physically realizable systems), one concern is how to deal with data lost or garbled in transmission. Lost data (erasures) are often easier to deal with than corrupted data (errors) because the recipient cannot always tell when corrupted data is data received in error. Many error-correcting codes have been developed to correct for erasures and/or for errors. Typically, the particular code used is chosen based on some information about the infidelities of the channel through which the data is being transmitted and the nature of the data being transmitted. For example, where the channel is known to have long periods of infidelity, a burst error code might be best suited for that application. Where only short, infrequent errors are expected a simple parity code might be best.

As used herein, "source data" refers to data that is available at one or more senders and that a receiver is used to obtain, by recovery from a transmitted sequence with or without errors and/or erasures, etc. As used herein, "encoded data" refers to data that is conveyed and can be used to recover or obtain the source data. In a simple case, the encoded data is a copy of the source data, but if the received encoded data differs (due to errors and/or erasures) from the transmitted encoded data, in this simple case the source data might not be entirely recoverable absent additional data about the source data. Transmission can be through space or time. In a more complex case, the encoded data is generated based on source data in a transformation and is transmitted from one or more senders to receivers. The encoding is said to be "systematic" if the source data is found to be part of the encoded data. In a simple example of systematic encoding, redundant information about the source data is appended to the end of the source data to form the encoded data.

Also as used herein, "input data" refers to data that is present at an input of an FEC (forward-error correcting) encoder apparatus or an FEC encoder module, component, step, etc., ("FEC encoder") and "output data" refers to data that is present at an output of an FEC encoder. Correspondingly, output data would be expected to be present at an input of an FEC decoder and the FEC decoder would be expected to output the input data, or a correspondence thereof, based on the output data it processed. In some cases, the input data is, or includes, the source data, and in some cases, the output data is, or includes, the encoded data. For example, the input data would be the source data if there is no processing before the input of an FEC encoder. However, in some cases, the source data is processed into a different form (e.g., a static encoder, an inverse encoder or another process) to generate intermediate data that is presented to the FEC encoder instead of the source data.

In some cases, a sender device or sender program code may comprise more than one FEC encoder, i.e., source data is transformed into encoded data in a series of a plurality of FEC encoders. Similarly at the receiver, there may be more than one FEC decoder applied to generate source data from received encoded data.

Data can be thought of as partitioned into symbols. An encoder is a computer system, device, electronic circuit, or the like, that generates encoded symbols or output symbols from a sequence of source symbols or input symbols and a decoder is the counterpart that recovers a sequence of source symbols or input symbols from received or recovered encoded symbols or output symbols. The encoder and decoder are separated in time and/or space by the channel and any received encoded symbols might not be exactly the same as corresponding transmitted encoded symbols and they might not be received in exactly the same sequence as they were transmitted. The "size" of a symbol can be measured in bits, whether or not the symbol is actually broken into a bit stream, where a symbol has a size of M bits when the symbol is selected from an alphabet of $2^M$ symbols. In many of the examples herein, symbols are measured in octets and codes might be over a field of 256 possibilities (there are 256 possible 8-bit patterns within each octet), but it should be understood that different units of data measurement can be used and it is well-known to measure data in various ways. In the general literature, the term "byte" is sometimes used interchangeably with the term "octet" to indicate an 8-bit value, although in some contexts "byte" indicates an X-bit value where X is not equal to 8, e.g., X=7, and thus, in general, the term "octet" is used herein. Unless otherwise indicated, the examples herein are not limited to a particular integer or non-integer number of bits per symbol.

FIG. 1 shows the general work flow associated with coding and decoding and the terminology used to describe the block structure of a source block, symbols, sub-blocks, etc. Symbols may be either source symbols (i.e., copies of the blocks constituting the original object) or repair symbols (i.e., data produced by the coding process that can be used to repair erasures in the source blocks). Parameters critical to the operation of the coding system might be contained within a structure called the Object Transmission Information ("OTI"). The OTI for a collection of related symbols may be communicated one or more times between sender(s) and receiver(s). When symbols are placed into messages for delivery via a channel (e.g., a network packet over a network), bookkeeping information is sometimes added to the symbols. This information is placed within the Payload Identifier (FEC Payload ID). In several particular examples, the Payload ID contains a source block number ("SBN") and a unique encoding symbol identifier ("ESI"). The Payload ID (and OTI) can contain different information for different types of codes and use cases.

Forward Error Correction ("FEC") Object Transmission Information ("OTI"), or "FEC OTI"

Based on the FEC OTI a receiver receives (or is able to infer), the receiver can determine the source block and sub-block structure of the file transfer. In [Raptor-RFC-5053] and [IETF-RFC-6330], the FEC Payload ID contains the pair (SBN, ESI), where in [Raptor-RFC-5053] SBN is 16 bits and the ESI is 16 bits, whereas in [IETF-RFC-6330] the SBN is 8 bits and the ESI is 24 bits, as illustrated in FIG. 2 herein. One disadvantage of this format is that one has to pre-determine the number of bits to allocate to the SBN and to the ESI, and it is sometimes difficult to determine a proper mix that will be adequate for all file delivery parameters.

For example, when using [Raptor-RFC-5053] with 16-bit ESIs, having only $2^{16}$=65,536 ESI values available might be limiting in some situations. For example, with a source block containing 8,192 source symbols, the number of encoded symbols can only be a factor of 8 larger (i.e., because 8192*8=65536), limiting the possible code rate that could be used to below ⅛ in this case. In this example, using 16 bits to hold the SBN (providing for up to $2^{16}$=65,536 source blocks) could be more than would ever be used. More concretely, with 8,192 source symbols of 1,024 octets each, the size of the file that could be supported is 524 GB, which in many applications is orders of magnitude larger than is needed.

As another example, when using [IETF-RFC-6330], having only $2^{8}$=256 SBNs available might be limiting in some situations. For a 4 GB file, if each source block is limited to 8 MB (which might be the case if the maximum sub-block size is 256 KB, the minimum sub-symbol size is 32 octets, and the symbol size is 1,024 octets) then limiting the number of source blocks to 256 limits the file size to 2 GB. In this example, it may be that having $2^{24}$=16,777,216 possible encoded symbols (ESIs) are more than would ever be used, e.g., with 8,192 source symbols the number of possible encoded symbols is 2,048 times larger, which may never be needed in some applications.

Erasure code processing as described above can be used in conjunction with a variety of content delivery systems and protocols. In some cases, specialized servers are required, which can be more expensive to implement, support and maintain that using more common, conventional Internet servers to support content delivery. Therefore, it is desirable to have methods for delivering content and repair symbols that are less complex to implement.

In some cases, it is preferable to use more efficient signaling methods. One such method, designed for use with unidirectional communication channels and multicast communication is known as FLUTE [FLUTE]. FLUTE augments the basic capabilities of the erasure coding techniques with methods to deliver file and directory information (e.g., file names to be associated with streams of symbols). A receiver that implements both FLUTE and the appropriate set of erasure codes is able to identify the names and contents of file objects. FLUTE can, in turn, be carried within (or on "top" of) a variety of transfer mechanisms such as UDP/IP (e.g., in the Internet). In the context of MBMS and eMBMS, where the 3GPP standards defining organization sets standards, FLUTE has been selected for delivery of streaming content. In particular, the stream is delivered as a sequence of DASH formatted files. However, the signaling within FLUTE is not specifically designed for delivering sequence of related files. Thus, improved methods for signaling and delivering sequences of files within the FLUTE architecture is needed.

REFERENCES

Each of the references below is herein incorporated by reference in their entirety for all purposes:

[3GP-DASH] "Transparent end-to-end Packet-switched Streaming Service (PSS); Progressive Download and Dynamic Adaptive Streaming over HTTP (3GP-DASH)", 3GPP specification TS 26.247, Rel. 10, Jun. 8, 2011.

[FEC BB] Watson, M., Luby, M., and L. Vicisano, "Forward Error Correction (FEC) Building Block", IETF RFC 5052 (August 2007);

[FLUTE] Paila, T., Walsh, R., Luby, M., Roca, V., Lehtonen, R., "FLUTE—File Delivery over Unidirectional Transport", IETF RFC 6726 (November 2012);

[IANA-EEC] http://www.iana.org/assignments/rmt-fec-parameters

[IETF-RFC-6330] M. Luby, A. Shokrollahi, M. Watson, T. Stockhammer, L. Minder, "RaptorQ Forward Error Correction Scheme for Object Delivery", IETF RFC 6330 (August, 2011);

[LCT] Luby, M., Watson, M., Vicisano, L., "Layered Coding Transport (LCT) Building Block", IETF RFC 5651 (October 2009)

[Luby2010] U.S. patent application Ser. No. 12/887,492 naming Mark Watson, et al. and entitled "Enhanced Block-Request Streaming Using URL Templates and Construction Rules", filed Sep. 21, 2010.

[Luby2011] U.S. Patent Publication 2012/0099593 naming Michael Luby and entitled "Universal File Delivery Methods for Providing Unequal Error Protection and Bundled File Delivery Services", filed Mar. 4, 2011, published Apr. 26, 2012.

[Luby2012] U.S. patent application Ser. No. 13/545,697 naming Michael Luby and entitled "Switch Signaling Methods Providing Improved Switching between Representations for Adaptive HTTP Streaming", filed Jul. 10, 2012.

[MBMS] "Multimedia Broadcast/Multicast Service (MBMS); Protocols and codecs", 3GPP specification TS 26.346, Rel. 10, version 10.5.0, Sep. 21, 2012.

[MPEG-DASH] "Information technology—Dynamic adaptive streaming over HTTP (DASH)—Part 1: Media presentation description and segment formats", ISO/IEC 23009-1, First edition Apr. 1, 2012.

[Raptor-RFC-5053] M. Luby, A. Shokrollahi, M. Watson, T. Stockhammer, "Raptor Forward Error Correction Scheme for Object Delivery", IETF RFC 5053 (September 2007).

[RFC 4566] M. Handley, V. Jacobson, C. Perkins, "SDP: Session Description Protocol", IETF RFC 4566, July 2006.

SUMMARY OF THE INVENTION

In embodiments of a file delivery method and apparatus, sequences of related files using template based methods are signaled and delivered. Thus, improved methods of signaling and delivering DASH streams of files using the FLUTE protocol are provided.

The following detailed description together with the accompanying drawings will provide a better understanding of the nature and advantages of the present invention.

Various elements might be implemented using computer readable media for execution by a processor for controlling data downloading over a network path between a source and a receiver coupled by the network path. Other aspects of the invention should be apparent from this description.

BRIEF DESCRIPTION OF THE DRAWINGS

FIG. 2 is a diagram illustrating conventional FEC Payload IDs; FIG. 2A illustrates an FEC Payload ID for a payload as might be used with [Raptor-RFC-5053], while FIG. 2B illustrates an FEC Payload ID for a payload as might be used with [IETF-RFC-6330].

FIG. 9 is a diagram illustrating the FEC Payload ID for a basic universal file delivery ("UFD") method.

FIG. 13 illustrates an example object with FEC Payload ID (SBN, ESI).

FIG. 14 illustrates an example object with FEC Payload ID (UOSI).

Figure 1:
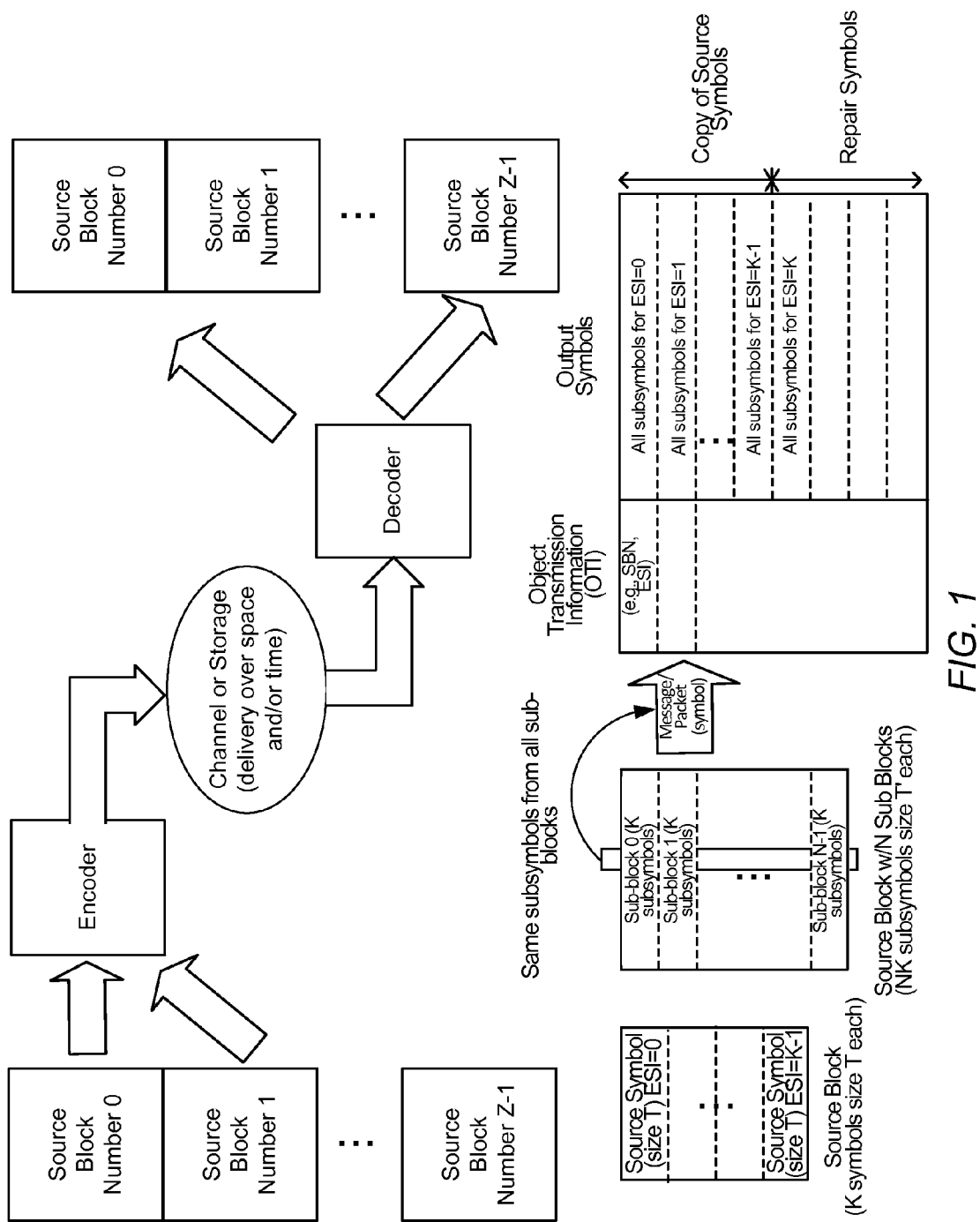
FIG. 1 is a diagram illustrating the general work flow associated with coding and decoding and the terminology used to describe the block structure of a source block, symbols, sub-blocks, etc.

In the figures, like items are referenced with like numbers and sub-indices are provided in parentheses to indicate multiple instances of like or identical items. Unless otherwise indicated, the final sub-index (e.g., "N" or "M") is not intended to be limiting to any particular value and the number of instances of one item can differ from the number of instances of another item even when the same number are illustrated and the sub-index is reused.

DETAILED DESCRIPTION OF THE INVENTION

In embodiments herein, file delivery is performed by an encoder/transmitter system that sends a file and a receiver/decoder system that receives a file. The format of the transmissions is coordinated so that the decoder understands what the encoder encoded. As shown in various examples below, file delivery is an example of general object delivery and unless otherwise indicated, it should be apparent from these examples that objects can be treated as files and possibly vice versa.

In a packet delivery system, the data is organized into packets and transmitted as packets. Each packet has elements that allow a receiver to determine what is in the packet and how it is laid out. Using the techniques described herein, flexibility is provided for transmitting packets where forward error correction ("FEC") is used.

Using these techniques, unequal FEC protection can be provided, as well as bundled delivery of files. "Unequal FEC protection" means that different portions of files, or different files, are FEC-protected to different degrees for the purpose of delivery of those files to devices over networks susceptible to packet loss. "Bundled delivery of files" means that FEC-protection is applied over multiple files or portions of files for the purpose of delivery of those files to one or more devices over networks susceptible to packet loss. It is well-known that when many files are delivered as separate files, the resiliency of the deliveries to packet loss can be much less than if all the files are concatenated together into a larger file and the larger file is protected in the delivery. However, a signaling of the structure of the larger file as a combination of smaller files is required, and the receiver generally needs to recover the entire large file to recover any of the smaller files within the large file, even if the receiver is only interested in recovering a subset of the smaller files.

Thus, a preferred file delivery system or method should allow any flexible combination of the number of source blocks and the number of encoding symbols per source block that is used as the file delivery structure for a file. It should also be the case that file delivery methods provide efficient protection against packet loss, and support delivery of the file with different parts of the file protected at different priorities (i.e., with different codes or code rates), wherein each part of the file may have a different source block structure and sub-block structure than other parts of the file. Again, files are in some cases considered specific examples of objects, but herein it should be understood that the examples used herein to describe transport and handling of files can also be used for data objects that are perhaps not referred to as files, such as large chunks of data from a database, a portion of a video sequence, etc.

The file/object delivery system or method should provide for the delivery of many smaller files/objects with the protection efficiency of a large file/object, simple signaling of the smaller file/object structures, and the capabilities for the receiver to independently recover only a subset of the smaller files/objects without recovering all of the smaller files/objects.

A file delivery system might comprise a broadcast portion and a unicast portion. For readability, "broadcast" might be read to mean "broadcast, multicast, and/or other mechanisms for serving common data to a plurality of users." "Unicast" refers to movement of data from one source to one destination, although one logical source might comprise multiple components and one logical destination might comprise multiple components. In a unicast configuration, typically there is a source server and a destination client, with the source server waiting for requests from clients and responding to a received request by sending the requested data (if otherwise permitted) to the requesting client specifically. As is well-known in the art, unicast delivery to a large number of destinations can create more scalability challenges than broadcast delivery to those same large number of destinations.

Examples of systems with these desirable qualities will now be described.

Apparatus for Sending and Receiving Media Data

One embodiment of the invention is described with reference to FIG. 3, which shows a simplified diagram of a block-request streaming system embodying the invention.

Figure 3:
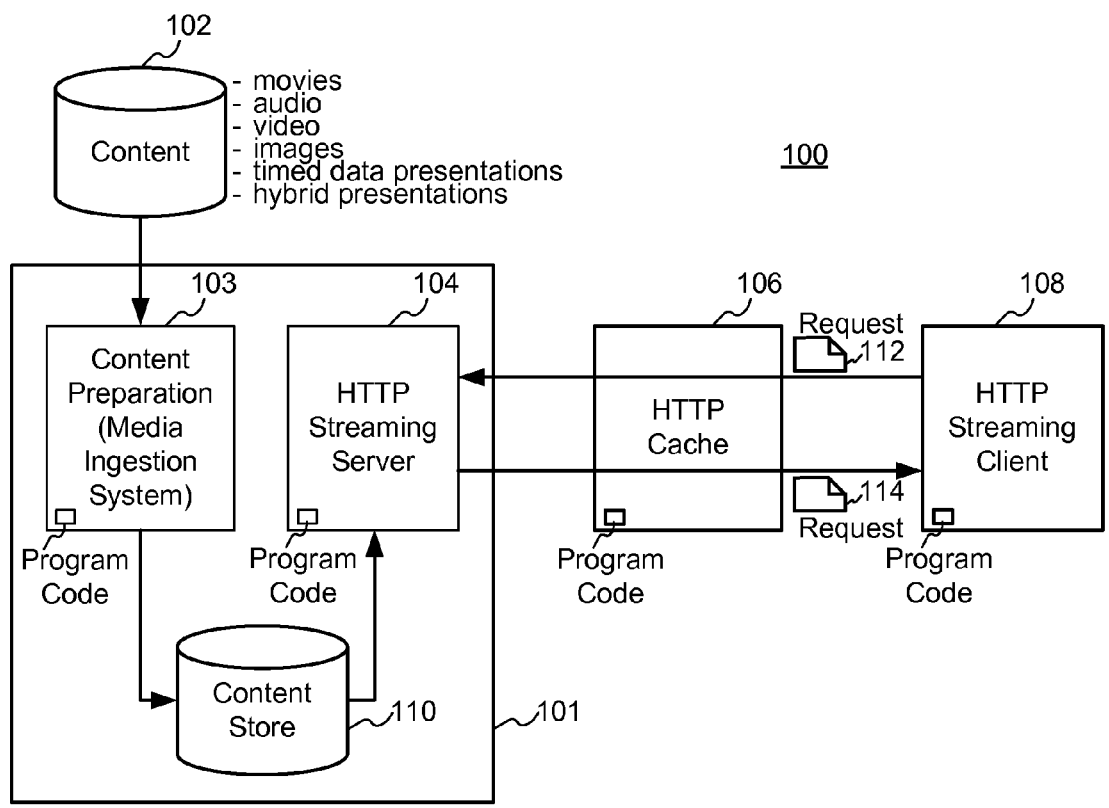
FIG. 3 depicts elements of a block request streaming system according to embodiments of the present invention.

In FIG. 3, a block-streaming system 100 is illustrated, comprising block serving infrastructure ("BSI") 101 in turn comprising an ingestion system 103 for ingesting content 102, preparing that content and packaging it for service by an HTTP streaming server 104 by storing it into a content store 110 that is accessible to both ingestion system 103 and HTTP streaming server 104. As shown, system 100 might also include an HTTP cache 106. In operation, a client 108, such as an HTTP streaming client, sends requests 112 to HTTP streaming server 104 and receives responses 114 from HTTP streaming server 104 or HTTP cache 106. In each case, elements shown in FIG. 3 might be implemented, at least in part, in software, therein comprising program code that is executed on a processor or other electronics.

The content might comprise movies, audio, 2D planar video, 3D video, other types of video, images, timed text, timed metadata or the like. Some content might involve data that is to be presented or consumed in a timed manner, such as data for presenting auxiliary information (station identification, advertising, stock quotes, Flash™ sequences, etc.) along with other media being played out. Other hybrid presentations might also be used that combine other media and/or go beyond merely audio and video.

Figure 4:
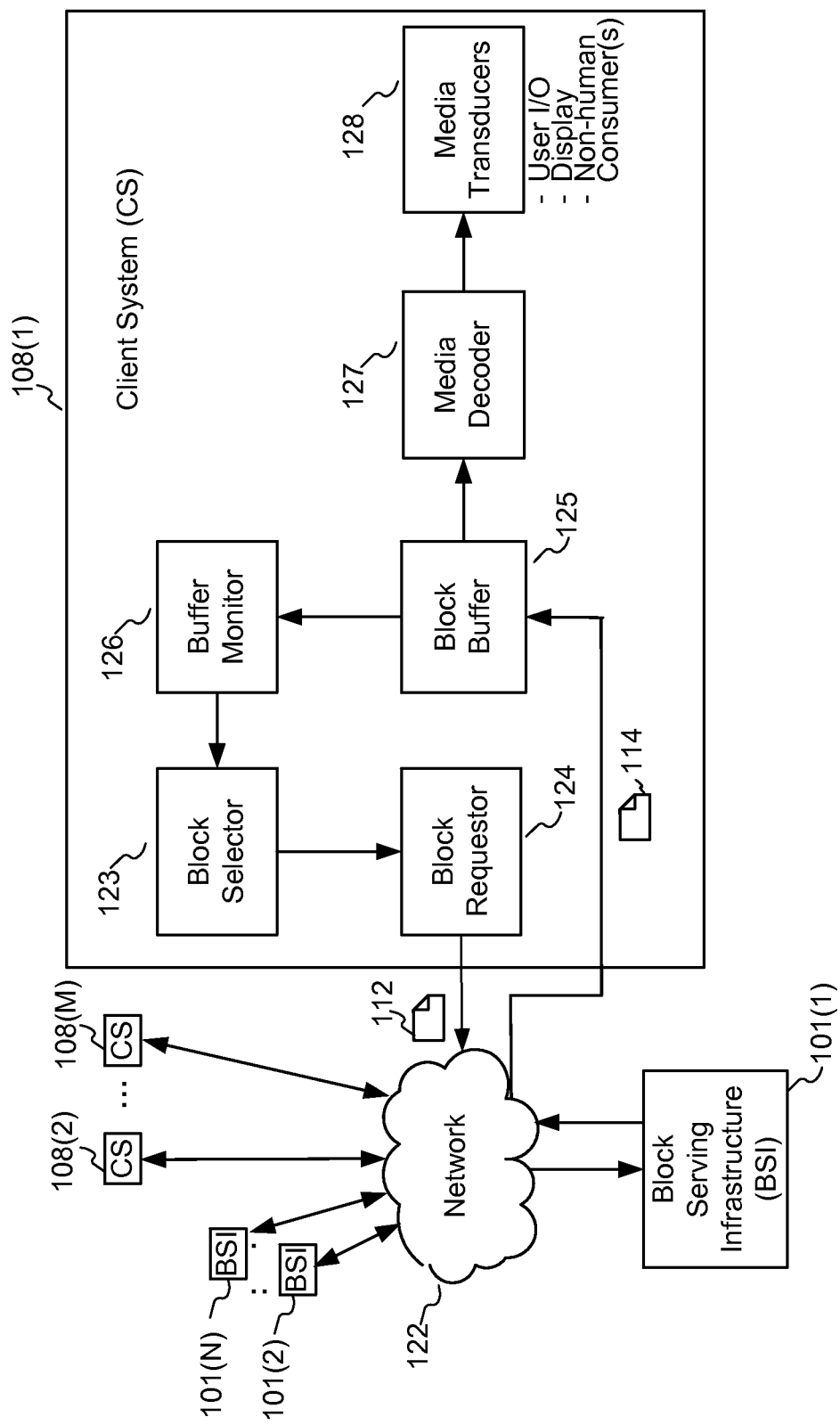
FIG. 4 illustrates the block request streaming system of FIG. 3, showing greater detail in the elements of a client system that is coupled to a block serving infrastructure ("BSI") to receive data that is processed by a content ingestion system.

As illustrated in FIG. 4, media blocks may be stored within a block serving infrastructure 101(1), which could be, for example, an HTTP server, a Content Delivery Network device, an HTTP proxy, FTP proxy or server, or some other media server or system. Block serving infrastructure 101(1) is connected to a network 122, which could be, for example, an Internet Protocol ("IP") network such as the Internet. A block-request streaming system client is shown having six functional components, namely a block selector 123, provided with the metadata described above and performing a function of selecting blocks or partial blocks to be requested from among the plurality of available blocks indicated by the metadata, a block requestor 124, that receives request instructions from block selector 123 and performs the operations necessary to send a request for the specified block, portions of a block, or multiple blocks, to block serving infrastructure 101(1) over network 122 and to receive the data comprising the block in return, as well as a block buffer 125, a buffer monitor 126, a media decoder 127 and one or more media transducers 128 that faciliate media consumption.

Block data received by block requestor 124 is passed for temporary storage to block buffer 125, which stores the media data. Alternatively, the received block data can be stored directly into block buffer 125 as illustrated in FIG. 3. Media decoder 127 is provided with media data by block buffer 125 and performs such transformations on this data as are necessary to provide suitable input to media transducers 128, which render the media in a form suitable for user or other consumption. Examples of media transducers include visual display devices such as those found in mobile phones, computer systems or televisions, and might also include audio rendering devices, such as speakers or headphones.

An example of a media decoder would be a function that transforms data in the format described in the H.264 video coding standard into analogue or digital representations of video frames, such as a YUV-format pixel map with associated presentation timestamps for each frame or sample.

Buffer monitor 126 receives information concerning the contents of block buffer 125 and, based on this information and possibly other information, provides input to block selector 123, which is used to determine the selection of blocks to request, as is described herein.

In the terminology used herein, each block has a "playout time" or "duration" that represents the amount of time it would take for the receiver to play the media included in that block at normal speed. In some cases, the playout of the media within a block may depend on having already received data from previous blocks. In rare cases, the playout of some of the media in a block may depend on a subsequent block, in which case the playout time for the block is defined with respect to the media that can be played out within the block without reference to the subsequent block, and the playout time for the subsequent block is increased by the playout time of the media within this block that can only playout after having received the subsequent block. Since including media in a block that depends on subsequent blocks is a rare case, in the remainder of this disclosure we assume that media in one block does not depend on subsequent blocks, but note that those skilled in the art will recognize that this variant can be easily added to the embodiments described below.

The receiver may have controls such as "pause", "fast forward", "reverse", etc. that may result in the block being consumed by playout at a different rate, but if the receiver can obtain and decode each consecutive sequence of blocks in an aggregate time equal to or less than their aggregate playout time excluding the last block in the sequence then the receiver can present the media to the user without stalling. In some descriptions herein, a particular position in the media stream is referred to as a particular "time" in the media, corresponding to the time that would have elapsed between the beginning of the media playout and the time when the particular position in the video stream is reached. The time or position in a media stream is a conventional concept. For example, where the video stream comprises 24 frames per second, the first frame could be said to have a position or time of t=0.0 seconds and the 241st frame could be said to have a position or time of t=10.0 seconds. Naturally, in a frame-based video stream, position or time need not be continuous, as each of the bits in the stream from the first bit of the 241st frame to just before the first bit of the 242nd frame might all have the same time value.

Adopting the above terminology, a block-request streaming system (BRSS) comprises one or more clients that make requests to one or more content servers (for example, HTTP servers, FTP Servers, etc.). An ingestion system comprises one or more ingestion processors, wherein an ingestion processor receives content (in real-time or not), processes the content for use by the BRSS and stores it into storage accessible to the content servers, possibly also along with metadata generated by the ingestion processor.

The BRSS also might contain content caches that coordinate with the content servers. The content servers and content caches might be conventional HTTP servers and HTTP caches that receive requests for files or segments in the form of HTTP requests that include a URL, and may also include a byte range, in order to request less than all of the file or segment indicated by the URL. The clients might include a conventional HTTP client that makes requests of HTTP servers and handles the responses to those requests, where the HTTP client is driven by a novel client system that formulates requests, passes them to the HTTP client, gets responses from the HTTP client and processes those (or storing, transforming, etc.) in order to provide them to a presentation player for playout by a client device. Typically, the client system does not know in advance what media is going to be needed (as the needs might depend on user input, changes in user input, etc.), so it is said to be a "streaming" system in that the media is "consumed" as soon as it is received, or shortly thereafter. As a result, response delays and bandwidth constraints can cause delays in a presentation, such as causing a pause in a presentation as the stream catches up to where the user is in consuming the presentation.

In order to provide for a presentation that is perceived to be of good quality, a number of details can be implemented in the BRSS, either at the client end, at the ingestion end, or both. In some cases, the details that are implemented are done in consideration of, and to deal with, the client-server interface at the network. In some embodiments, both the client system and the ingestion system are aware of the enhancement, whereas in other embodiments, only one side is aware of the enhancement. In such cases, the entire system benefits from the enhancement even though one side is not aware of it, while in others, the benefit only accrues if both sides are aware of it but when one side is not aware, it still operates without failing.

Figure 5:
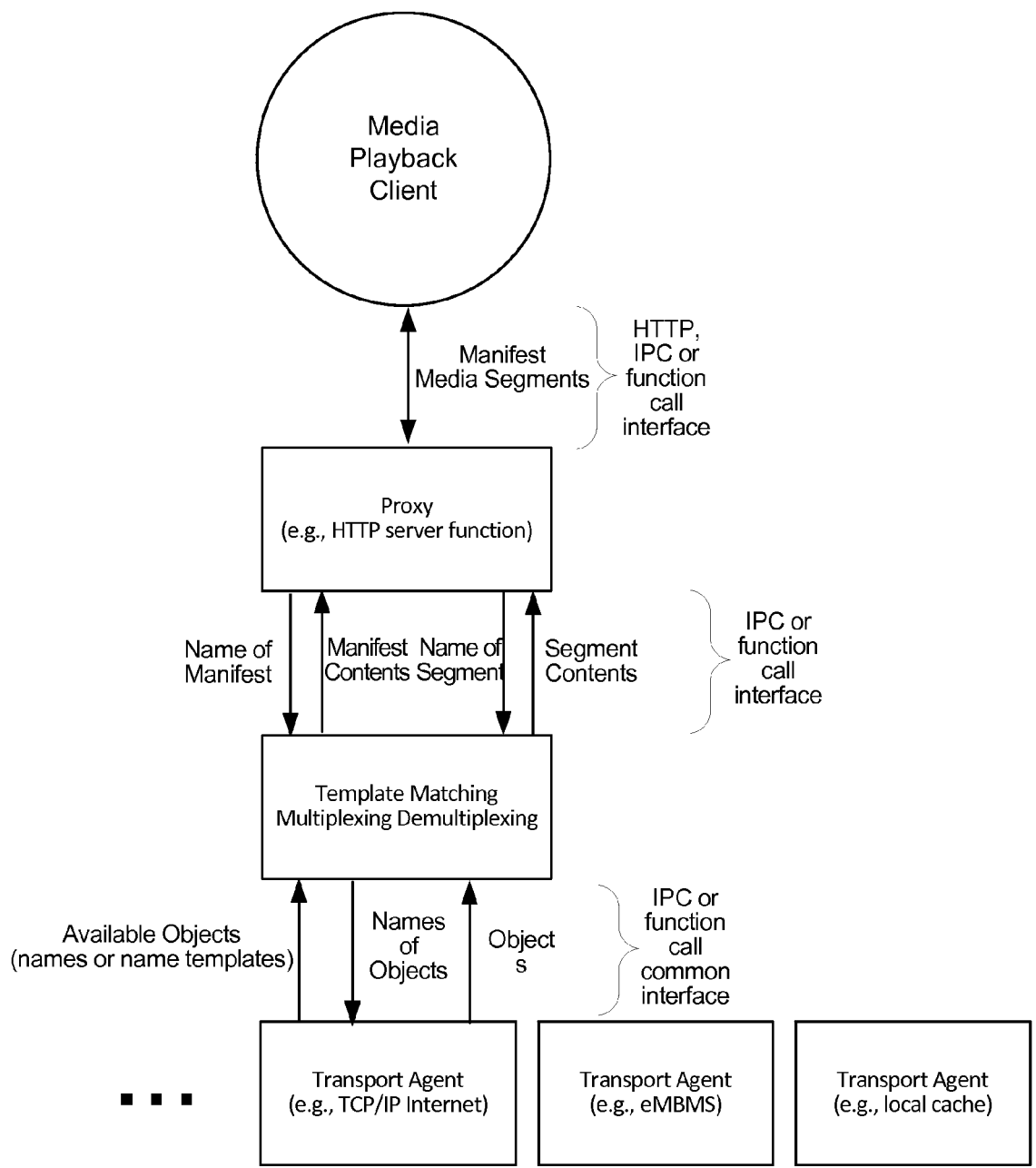
FIG. 5 is a diagram illustrating the possible arrangement of an application and a proxy system that is able to deliver data to an application. The particular example depicted is a media playback application using a manifest file that consumes multiple segments (i.e., files containing multimedia information or samples).

FIG. 5 is a diagram illustrating the possible arrangement of an application and a proxy system that is able to deliver data to an application. The particular example depicted is a media playback application using a manifest file that consumes multiple segments (i.e., files containing multimedia information or samples).

Figure 6:
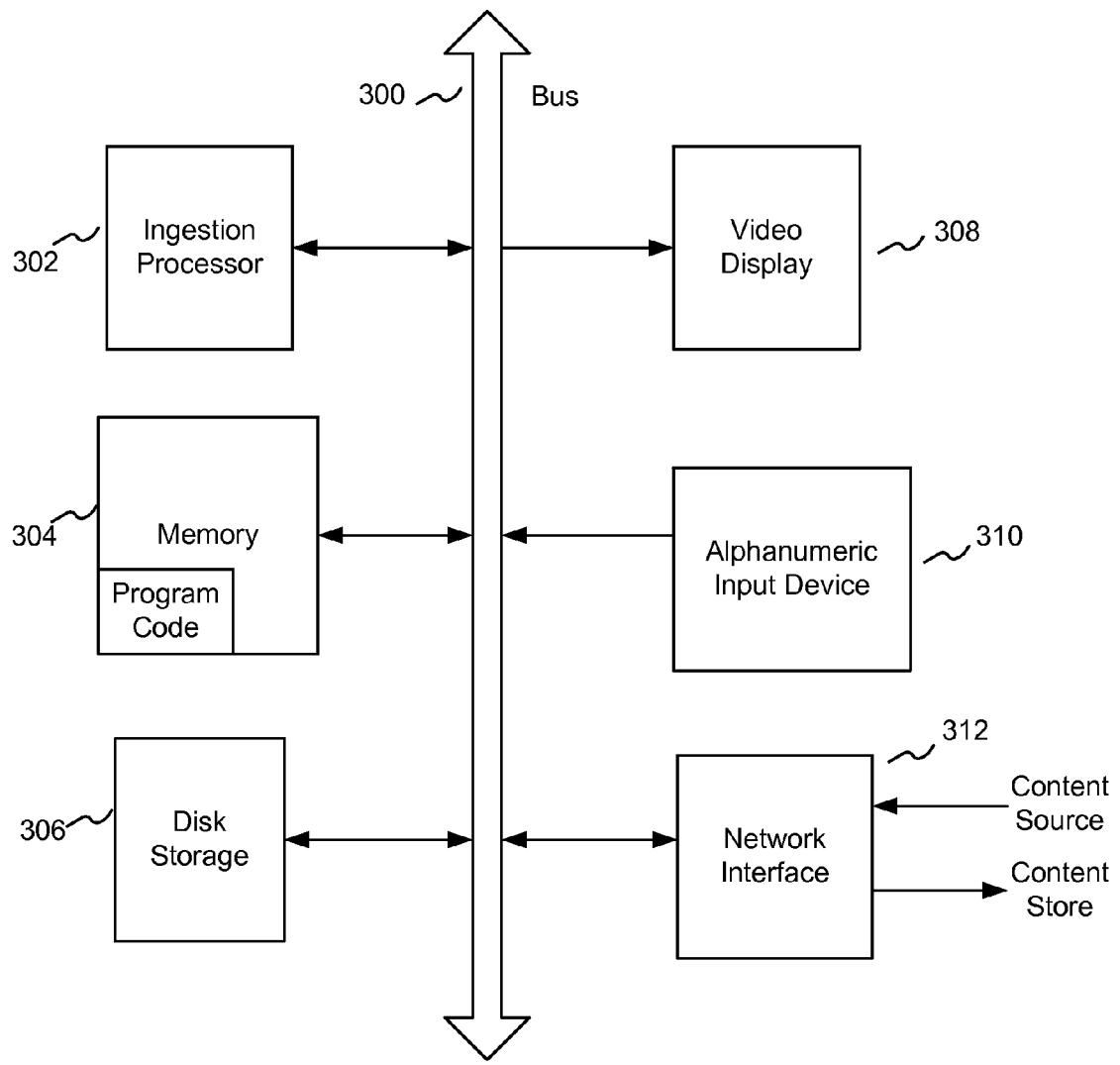
FIG. 6 illustrates a hardware/software implementation of an ingestion system.

As illustrated in FIG. 6, the ingestion system may be implemented as a combination of hardware and software components, according to various embodiments. The ingestion system may comprise a set of instructions that can be executed to cause the system to perform any one or more of the methodologies discussed herein. The system may be realized as a specific machine in the form of a computer. The system may be a server computer, a personal computer (PC), or any system capable of executing a set of instructions (sequential or otherwise) that specify actions to be taken by that system. Further, while only a single system is illustrated, the term "system" shall also be taken to include any collection of systems that individually or jointly execute a set (or multiple sets) of instructions to perform any one or more of the methodologies discussed herein.

The ingestion system may include the ingestion processor 302 (e.g., a central processing unit (CPU)), a memory 304 which may store program code during execution, and disk storage 306, all of which communicate with each other via a bus 300. The system may further include a video display unit 308 (e.g., a liquid crystal display (LCD) or cathode ray tube (CRT)). The system also may include an alphanumeric input device 310 (e.g., a keyboard), and a network interface device 312 for receiving content source and delivering content store.

The disk storage unit 306 may include a machine-readable medium on which may be stored one or more sets of instructions (e.g., software) embodying any one or more of the methodologies or functions described herein. The instructions may also reside, completely or at least partially, within the memory 304 and/or within the ingestion processor 302 during execution thereof by the system, with the memory 304 and the ingestion processor 302 also constituting machine-readable media.

Figure 7:
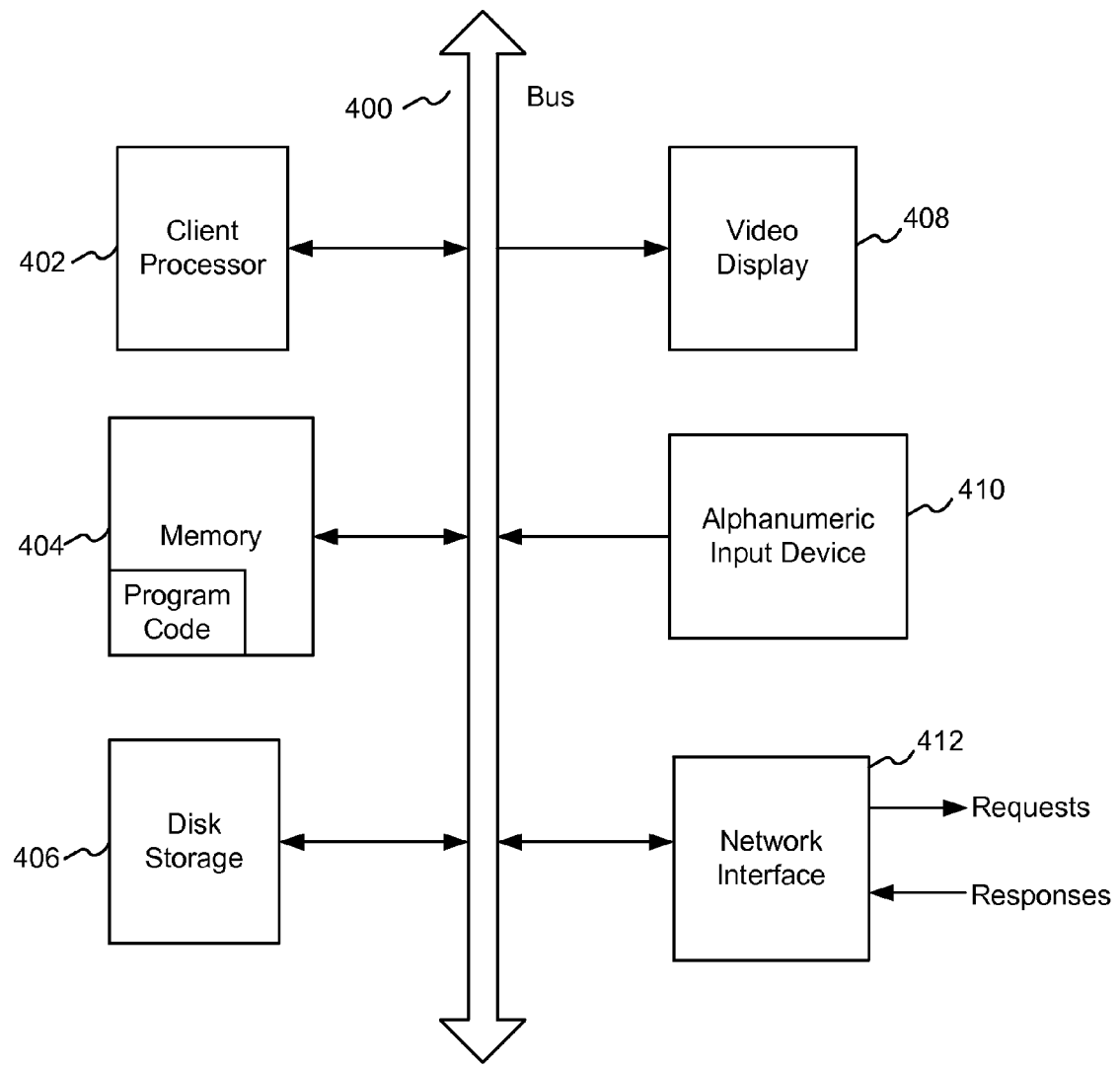
FIG. 7 illustrates a hardware/software implementation of a client system.

As illustrated in FIG. 7, the client system may be implemented as a combination of hardware and software components, according to various embodiments. The client system may comprise a set of instructions that can be executed to cause the system to perform any one or more of the methodologies discussed herein. The system may be realized as a specific machine in the form of a computer. The system may be a server computer, a personal computer (PC), or any system capable of executing a set of instructions (sequential or otherwise) that specify actions to be taken by that system. Further, while only a single system is illustrated, the term "system" shall also be taken to include any collection of systems that individually or jointly execute a set (or multiple sets) of instructions to perform any one or more of the methodologies discussed herein.

The client system may include the client processor 402 (e.g., a central processing unit (CPU)), a memory 404 which may store program code during execution, and disk storage 406, all of which communicate with each other via a bus 400. The system may further include a video display unit 408 (e.g., a liquid crystal display (LCD) or cathode ray tube (CRT)). The system also may include an alphanumeric input device 410 (e.g., a keyboard), and a network interface device 412 for sending requests and receiving responses.

The disk storage unit 406 may include a machine-readable medium on which may be stored one or more sets of instructions (e.g., software) embodying any one or more of the methodologies or functions described herein. The instructions may also reside, completely or at least partially, within the memory 404 and/or within the client processor 402 during execution thereof by the system, with the memory 404 and the client processor 402 also constituting machine-readable media.

Media Presentation Data Model

Figure 8:
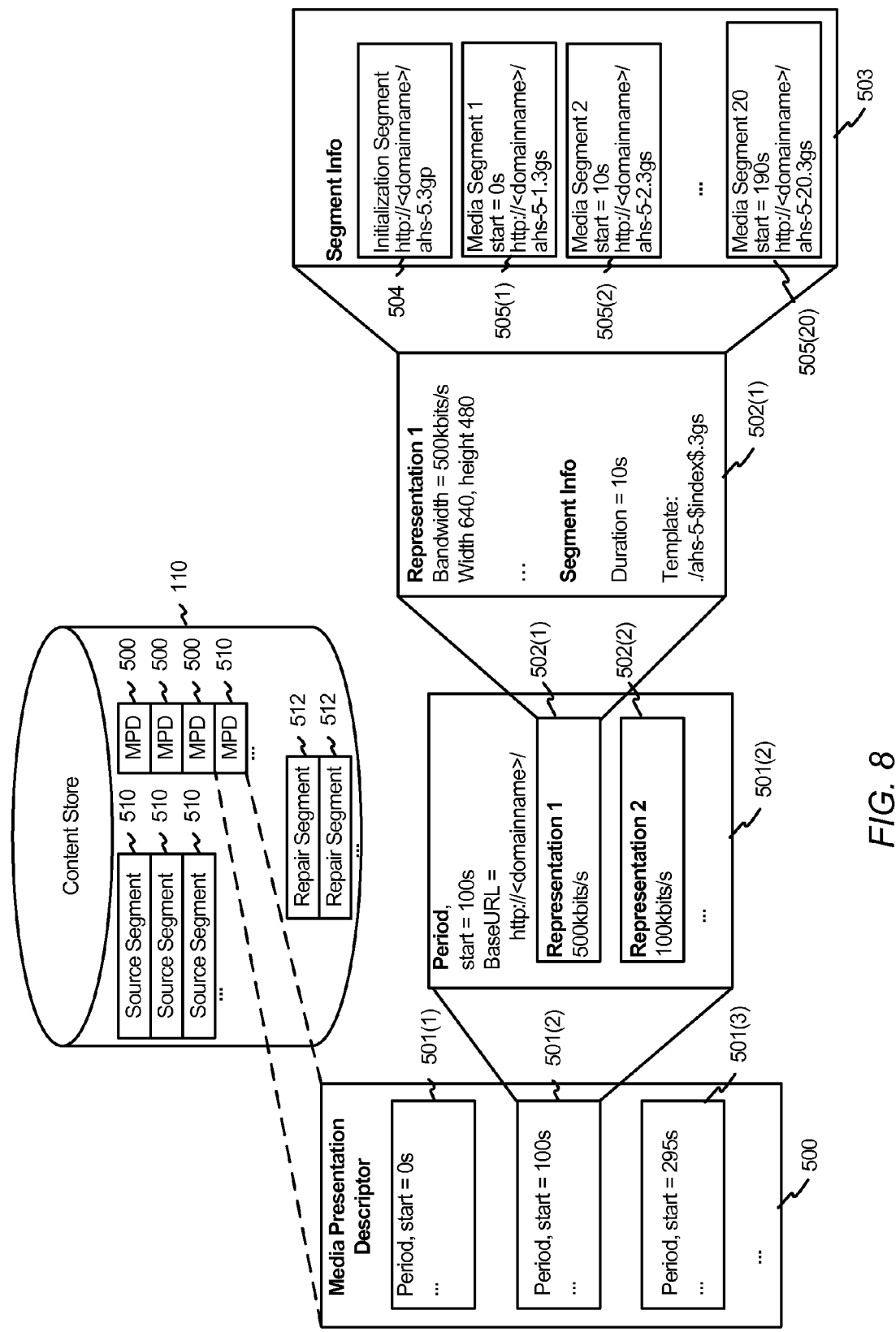
FIG. 8 illustrates possible structures of the content store shown in FIG. 3, including segments and media presentation descriptor ("MPD") files, and a breakdown of segments, timing, and other structure within an MPD file.

FIG. 8 illustrates possible structures of the content store shown in FIG. 3, including segments and media presentation description ("MPD") files, and a breakdown of segments, timing, and other structure within an MPD file. Details of possible implementations of MPD structures or files will now be described. In many examples, the MPD is described as a file, but non-file structures can be used as well.

As illustrated there, content store 110 holds a plurality of source segments 510, MPDs 500 and repair segments 512. An MPD might comprise period records 501, which in turn might comprise representation records 502, that contain segment information 503 such as references to initialization segments 504 and media segments 505.

A Basic Universal File Delivery ("UFD") Method and System

A basic universal file delivery ("UFD") method and corresponding system(s) will now be described, wherein the UFD includes significant advantages over existing file delivery methods. The Forward Error Correction ("FEC") Payload ID for the basic UFD method comprises a universal file symbol identifier ("UFSI") field, which for example can be a 32-bit field, as illustrated in FIG. 9. The sender and receiver methods for the basic UFD method will now be described in turn. Again, where files are referred to as objects, "UFSI" might be referred to instead as "UOSI" (a universal object symbol identifier).

The sender basic UFD method is described with reference to FIG. 10. The sender can use existing methods to generate the FEC Object Transmission Information ("OTI"), for example as described in the [Raptor-RFC-5053] or [IETF-RFC-6330] (see, for example, Section 4.3 of [IETF-RFC-6330]), and use the FEC OTI to determine the source block and sub-block structure to be used to transmit the file, and to determine the relationship between (SBN, ESI) pairs and the encoded symbols of the file (see, for example, Section 4.4 of [IETF-RFC-6330]).

For example, as described in [IETF-RFC-6330], the generated FEC OTI can be (F, Al, T, Z, Al), where F is the size of the file to be transmitted, Al is an alignment factor that is used to make sure that sub-symbols are aligned on memory boundaries that are multiples of Al, T is the size of the symbols to be generated and sent in the transmission, Z is the number of source blocks into which the file is to be partitioned for transmission, and N is the number of sub-blocks into which each source block is to partitioned for transmission. This is as shown in Step 800 of FIG. 10.

Figure 10:
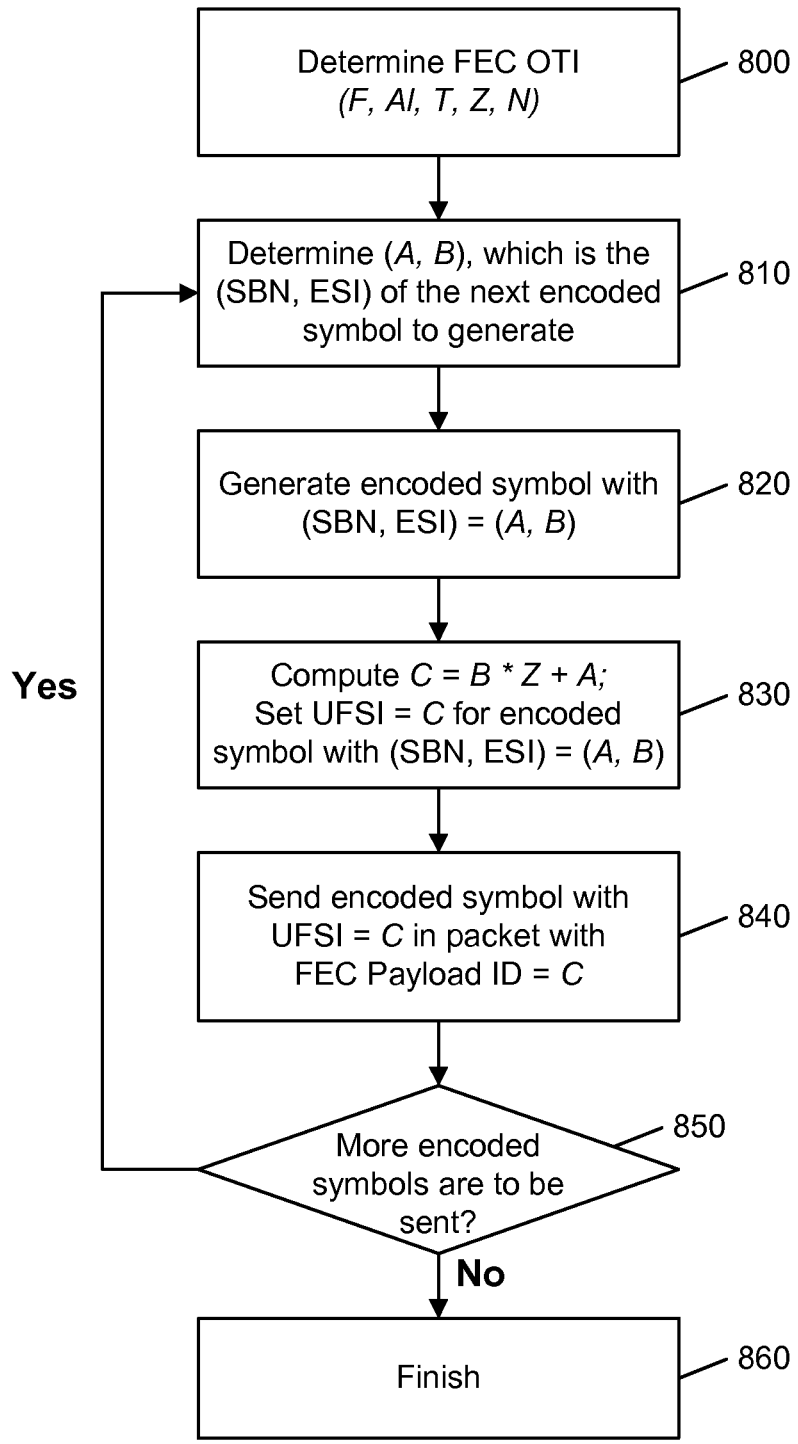
FIG. 10 is a flow chart that illustrates a sender basic UFD method.

The sender can form encoded symbols to be sent in packets and generate the SBNs and ESIs for these encoded symbols using existing methods based on the source block, and if sub-blocking is used, then also the sub-block structure, e.g., as described in [IETF-RFC-6330]. Each time an encoded symbol is to be sent, the sender can determine the SBN A and the ESI B for the encoded symbol to be generated, as shown in Step 810 of FIG. 10, and then the sender can generate the value of the encoded symbol based on (SBN, ESI)=(A, B)

using existing techniques for example those described in [IETF-RFC-6330], as shown in Step 820 of FIG. 10. Then, the UFSI C for that encoded symbol is computed as C=B*Z+ A, as shown in Step 830 of FIG. 10.

The sender can send the encoded symbol in a packet with the FEC Payload ID of the packet set to the UFSI C of the encoded symbol, as shown in Step 840 of FIG. 10. The sender can then determine if more encoded symbols are to be sent, as shown in Step 850 of FIG. 10, and if so then the sender can generate additional encoded symbols to send, as shown by the "Yes" branch to Step 810 of FIG. 10 and, and if not then the sender can finish, as shown by the "No" branch to Step 860 of FIG. 10.

There are many variations of the sender basic UFD method. For example, the sender can send more than one encoded symbol in at least some of the packets, in which case the FEC Payload ID can be set to the UFSI of the first encoded symbol contained in the packet and additional symbols contained in the packet can be chosen so that their corresponding UFSI values are consecutive. For example, if there are three encoded symbols carried in the packet and the first such symbol has UFSI=4,234, then the other two encoded symbols can be those with UFSIs 4,235 and 4,235, respectively. As examples of other alternatives, the sender may predetermine how many encoded symbols to generate and determine the (SBN, ESI) values for all the encoded symbols to be generated before generating any of the encoded symbols. As another example, the UFSI values may be generated directly without an intermediate step of generating the (SBN, ESI) values.

As another example of a variation, other forms of FEC OTI information may be generated. For example, a base UFSI BU may be included in the FEC OTI for the file, that can be used as follows: the UFSI to be used by the FEC sender and receiver for an encoded symbol contained in a packet is U+BU, where U is the UFSI carried in the packet carrying the encoded symbol. Thus, for example, if a packet carries U=1, 045, and the base UFSI in the FEC OTI is BU=2,000,000, then the encoded symbol UFSI is 2,001,045. Usage of the base UFSI has several advantages. For one, the protocol suite described in [FLUTE], [ALC], [LCT], and/or [FEC BB] associates a Transmission Object Identifier, also called a TOI, with the FEC OTI of a file or object to be transported. It is possible that encoded symbols for the same file may be sent at different times or in different sessions and can be associated with different TOIs. Also, it is advantageous to be able to send encoded packets starting with the UFSI=0 for the packets associated with each different TOI. By having the ability to specify a base UFSI as part of the FEC OTI, a different base UFSI can be associated with each TOI for which encoded symbols are to be sent for the file without sending duplicate encoded symbols for the different TOIs. For example, encoded symbols for the same file may be sent in packets associated with TOI=1 and associated with TOI=2, wherein the base UFSI associated with TOI=1 is set to 0, and wherein the base UFSI associated with TOI=2 is set to 1,000,000. Then, the encoded packets for both TOI=1 and TOI=2 can contain the sequence of UFSIs 0, 1, 2, etc., and there will be no duplicate encoded symbols sent amongst the encoded symbols sent associated with the two TOIs as long as less than 1,000,000 encoded symbols are sent for the file with TOI=1.

Figure 11:
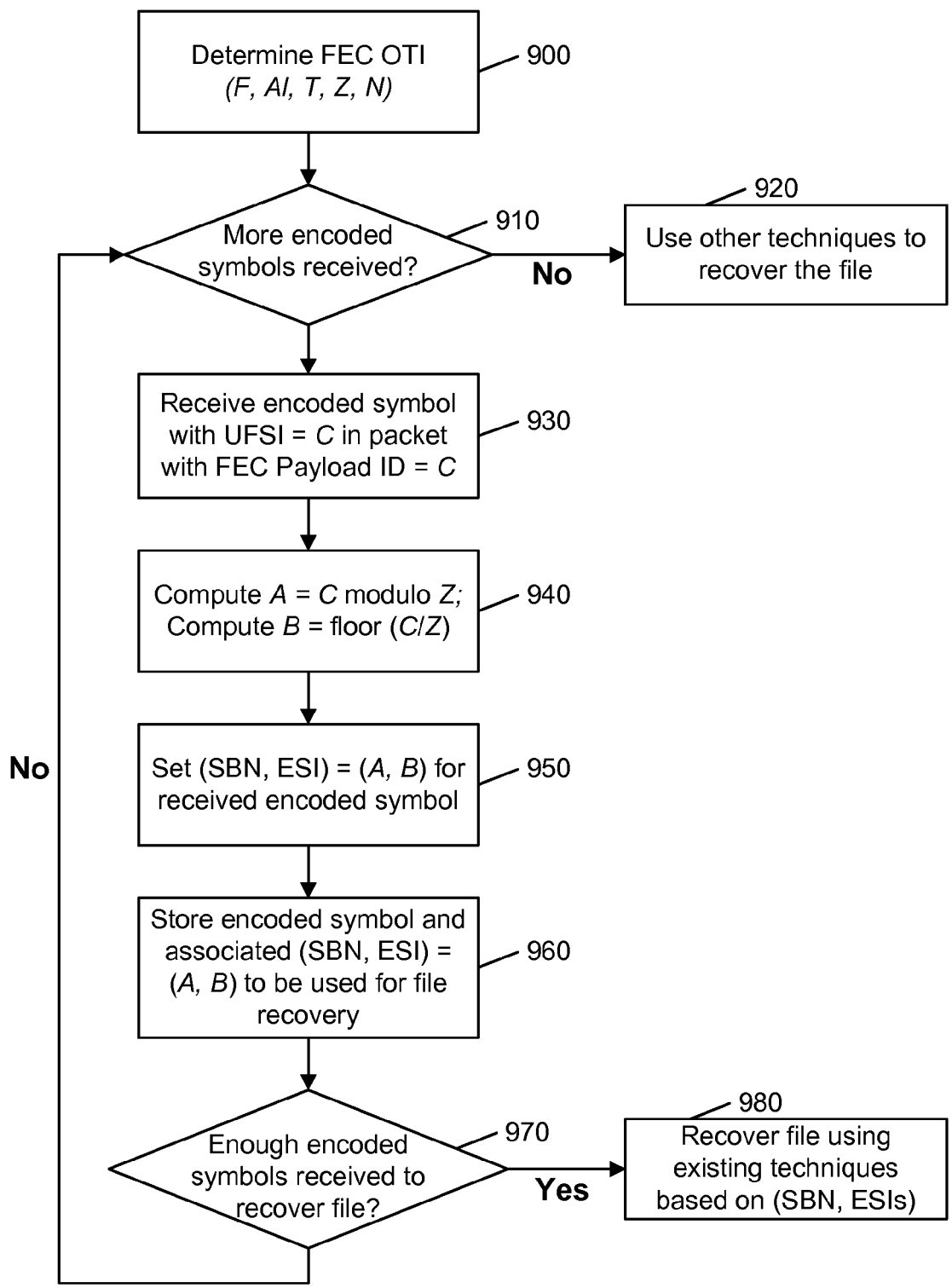
FIG. 11 is a flow chart that illustrates a receiver basic UFD method.

The receiver basic UFD method is described with reference to FIG. 11. The receiver can use existing techniques to determine the FEC OTI (F, Al, T, Z, N) in the same format as described above as for the sender, as shown in Step 900 of FIG. 11. For example, the FEC OTI may be embedded in a FLUTE session description, or the FEC OTI may be encoded into a URL, or the FEC OTI may be obtained via an SDP message (see [RFC 4566]). In Step 910, the receiver sees if more encoded symbols are received, and it may stay at this step until it either receives another encoded symbol, in which case the receiver proceeds to Step 930, or the receiver determines that more encoded symbols are not going to be received, in which case the receiver proceeds to Step 920 and either tries to recover the file using other means, for example using HTTP requests to a file repair server, or the receiver may wait for another session to receive more encoded symbols at a later time, or the receiver may decide that the file cannot be recovered.

When another encoded symbol is available, in Step 930 the receiver determines the UFSI C of the encoded symbol and receives the value of the encoded symbol. In Step 940, the receiver calculates A=C modulo Z, and B=floor(C/Z) based on the number Z of source blocks and the UFSI C, and in Step 950 the receiver sets the (SBN, ESI) for the encoded symbol to (A, B), and in Step 960 the receiver stores the value of the encoded symbol and (A, B) to be used for file recovery. In Step 970, the receiver determines if there are enough encoded symbols received to recover the file, and if so proceeds to recover the file in Step 980, and if not proceeds to receive more encoded symbols in Step 910.

There are many variations of the receiver basic UFD method. For example, the receiver can receive more than one encoded symbol in at least some of the packets, in which case the FEC Payload ID may be set to the UFSI of the first encoded symbol contained in the packet and additional symbols in the packet may have corresponding UFSI values that are consecutive. For example, if there are three encoded symbols carried in the packet and the first such symbol has UFSI=4,234, then the other two encoded symbols can be those with UFSIs 4,235 and 4,235, respectively, and the UFSI carried in the packet might the UFSI=4,234 of the first encoded symbol. As examples of other alternatives, the receiver may predetermine how many encoded symbols to receive before attempting recovery. As another example, the receiver may do some processing that is specific to the FEC code used to determine if enough encoded symbols have been received to recover the file. As another example, the UFSI values may be used directly without an intermediate step of generating the (SBN, ESI) values in the recovery process. As another example, recovery of the file may happen concurrently with reception of encoded symbols. As another example, other forms of FEC OTI information may be used.

Combining the basic UFD method with the techniques described in [IETF-RFC-6330] for determining the source block and sub-block structure provides many advantages. For example, what previous methods called "source symbols" that were identified by a combination of a SBN and ESI for purposes of transmitting the file can be viewed as file symbols that are identified by a UFSI when using the basic UFD method. Let F be the size of the file in octets to be transmitted, and let T be the symbol size to be used for FEC encoding/decoding purposes when transmitting the file, and thus KT=ceil(F/T) is the total number of symbols in the file, where ceil(x) is the smallest integer greater than or equal to x.

When the source block structure and sub-blocking structure is determined as for example described in [IETF-RFC-6330], and the basic UFD method described above is used to convert the identification of a symbol from (SBN, ESI) format to and from UFSI format, the range of UFSIs for the file symbols are 0, 1, 2, ..., KT, and any repair symbols generated from the file will have UFSIs in the range KT+1, KT+2, etc. This property allows the determination of whether a symbol is part of the original file or is a repair symbol generated from the file by simply comparing its UFSI to the value of KT. This can be useful for example to allow receivers that do not support FEC decoding to determine which symbols are part of the original file (and their position within the file) and which can be ignored as repair symbols, based on the UFSI value carried in packets, and on the value of KT for the file.

Multiplexed FLUTE

For delivery of data over a network, the data is typically packaged into messages or protocol data units ("PDUs"), sometimes informally referred to as packets. In some circumstances, it is desirable to multiplex data for multiple objects or object fragments together within PDUs so as to enable simultaneous receipt. This might be used, for example, when mixing media streams from distinct origins within a network. Another application may be multiplexing multiple distinct streams (e.g., audio and video) within the same PDUs for synchronized playback. Another application is to further enhance the reliability of delivery of multiple small objects when the network over which the delivery is made is not perfect, e.g., there may be losses of packets between the sender and receiver. While it might be possible to carry distinct objects in different FLUTE sessions without multiplexing, there is no current provision in FLUTE for multiplexing multiple objects or object fragments in the same packet.

The FLUTE protocol signaling methods do not fully enable the universal object delivery methods. For example, the FLUTE protocol is not able to signal that data for multiple objects are carried within the same packet. Below we describe additional signaling and delivery methods and apparatus for extending the FLUTE protocol to enable universal object delivery. We herein call these extensions "Multiplexed FLUTE". A basic universal file delivery ("UFD") method and corresponding system(s) will now be described, wherein the UFD uses universal object delivery ("UOD") and Template-based file delivery.

UOD can be used to supplement FLUTE with multiplexed object transport encoding. With multiplexed FLUTE, signaling can be used to indicate when UOD provides FEC encoded data of multiple objects within the same PDUs. Thus, multiplexed FLUTE enhances the current FLUTE protocols to enable encoding multiple objects or object fragments within the same PDUs.

Figure 12:
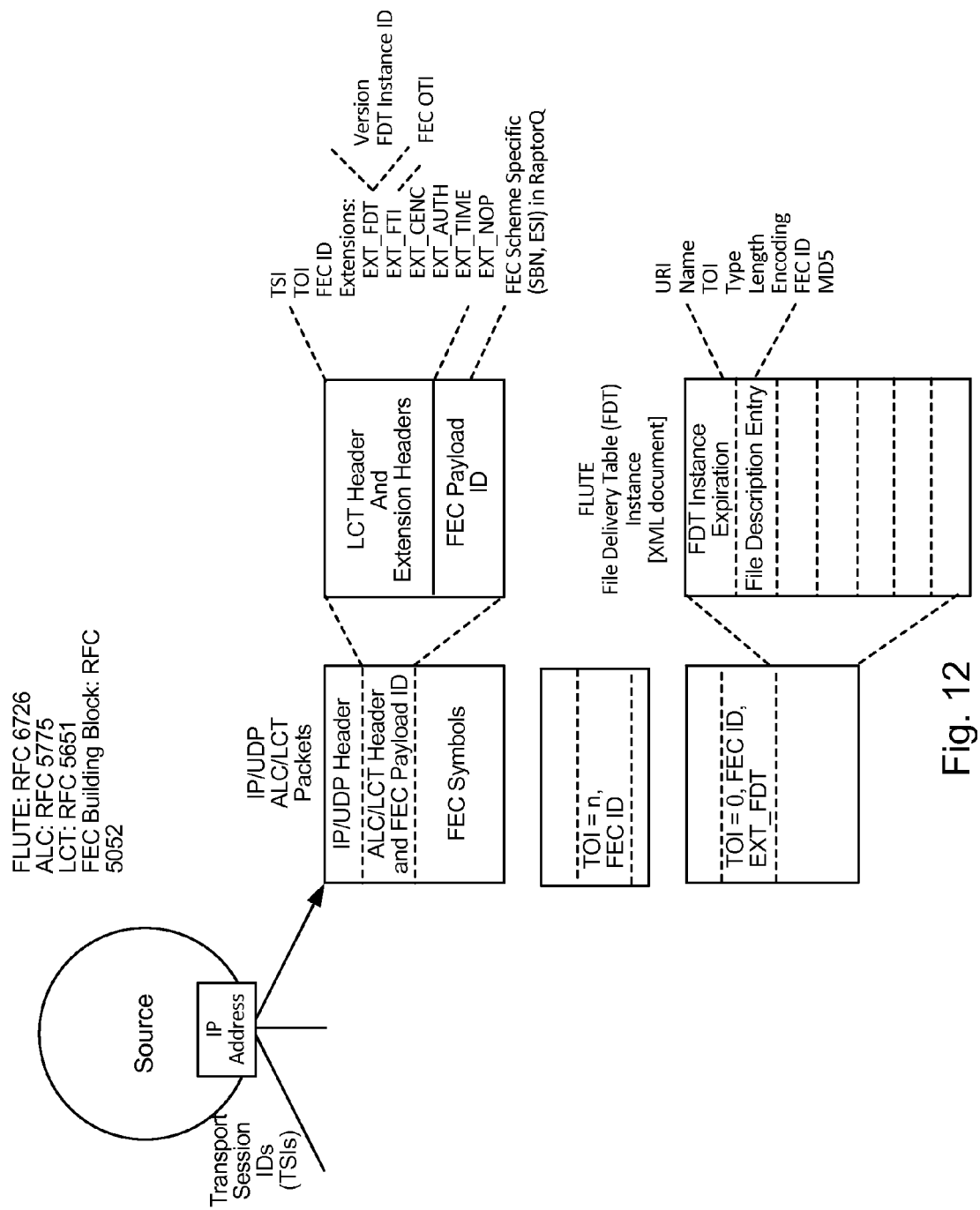
FIG. 12 is a diagram illustrating some aspects of the overall FLUTE/ALC/LCT/FEC building block protocols.

Each FLUTE protocol data unit ("PDU") carries a Transmission Object Identifier ("TOI") that indicates for which object the PDU carries data. The directory of objects, used to map TOIs to files and file attributes, is called a File Delivery Table ("FDT"). The structure is shown in FIG. 12.

In current FLUTE FDTs, each entry in a FDT is identified by a TOI and contains information pertaining to one file or object, and thus correspondingly each PDU carrying the same TOI carries data for the one object associated with the TOI in the FDT. The information may include a description of the type of FEC scheme used to encode the object and the FEC encoding structure of the object as identified by the FEC Object Transmission Information ("OTI"). The FEC scheme is identified by an FEC Encoding ID (see [IANA-FEC] for current standard values).

With multiplexed FLUTE, there is a new structure called a Packet Structure Table ("PST"). In this extension to the FLUTE protocol, each FLUTE PDU carries a Packet Format Identifier ("PFI") that indicates how each PDU is structured. In this extension, a PDU may contain data for one or more objects. Each entry in a PST is identified by a PFI and contains information about the PDU structure of the PDU carrying that PFI, i.e., the order, size and meaning of the fields in the PDU carrying FEC Payload IDs and associated symbols for objects.

For PDUs carrying a particular PFI, the information associated with the PFI in the PST provides the correspondence between symbols carried in such PDUs and the corresponding objects from which the symbols were generated, the correspondence between FEC Payload IDs carried in such PDUs and the corresponding symbols that the FEC Payload IDs identify, and the lengths of the FEC Payload IDs carried in such PDUs. The TOIs of the objects may be used to help indicate these correspondences in a PST entry.

An entry identified by a PFI in the PST may be relatively simple or more involved. For example, in a simple case, the entry may describe a PDU format that contains one FEC Payload ID of a given size, e.g., 2 bytes, and describe one symbol carried in the PDU for one object identified by a particular TOI. In a more involved example, the entry may specify a PDU format that contains multiple FEC Payload IDs of different sizes, e.g., some may be 1 byte, some 2 bytes, some 4 bytes in size, and the symbols carried in the PDU may be for multiple objects identified in the entry by multiple TOIs, and some FEC Payload IDs may be used for identifying symbols of more than one object whereas other FEC Payload IDs may be used for identifying symbols of a single object.

Furthermore, for some objects there may be more than one symbol carried in the PDU, whereas for other objects there may be only one symbol carried in the PDU. In other cases, the object identified by a TOI may be a portion of a content file, e.g., as identified by specifying a URL for the content file and a byte range in the TOI entry in the FDT.

Template-Based File Delivery

Template-based file delivery, introduced herein, comprises methods by which multiple related objects can be named, identified, parameterized, and delivered. Template-based file delivery is facilitated with signaling and delivery methods that use templates, somewhat akin to how [Luby2010] and [Luby2012] use templates for DASH delivery of streaming content. Template-based file delivery provides a compact way of delivering the metadata associated with a sequence or set of associated files or objects. The metadata and other properties of the sequence or set of files or objects (or portions of objects) are or can be constructed to be related in a predictable way so that templates can be used to describe these relationships in a succinct form. Thus, Template-based file delivery can provide an extremely compact and succinct means to signal the relationships between the locations, names, availability times, FEC information, and other metadata associated with the sequence, set, or collection of objects to be delivered, even for objects in the set of objects that have not yet been created, or are not yet available or known. Template-based file delivery allows the bulk of the metadata to be synthesized and delivered in a compact form to a device to which the sequence of files is to be at least partially delivered. Template-based file delivery allows the bulk of the metadata to be delivered to the device or client prior to when the device or client initiates reception of at least some of the sequence of files. Alternately, the metadata can be delivered to a client or device before, during, or after reception of at least some of the sequence of files.

Template-based file delivery removes the necessity of delivering the bulk of the metadata for files only after the file is created and available for delivery, i.e., with Template-based file delivery the metadata can be delivered even before a file is created or is known or available at the sender, wherein this metadata can comprise delivery timing information, handling details as desired, location information for the files after they are created on the receiving device, and other parameters. Template-based file delivery enables the delivery of the metadata for a sequence or collection of associated files to be compact and independent of the delivery of the files themselves, and also independent of the timing of the file delivery and the timing of the creation or availability of the files for delivery. Since the metadata associated with files is compact and monolithic when expressed using templates, generally the metadata can be delivered with very high reliability and using different means than is used to deliver files. For example, the metadata can be delivered as a small file using HTTP to a client or device, whereas the files themselves may be delivered over a broadcast or multicast network using FLUTE. The metadata may be delivered within the eMBMS User Service Description ("USD") information, or it may be delivered using the Session Description Protocol ("SDP"), or within a conventional file available off the web (e.g., using HTTP). The metadata may be expressed using XML or HTML or any of a variety of markup languages.

With the FLUTE protocol as it exists today, the bulk of the metadata is delivered using the same delivery method as is used to deliver the files. Furthermore, the metadata for a particular file is typically delivered at or near the same time as the file is delivered. Also, there is explicit and particular metadata delivered uniquely for each particular file, and the format of the metadata associated with a file does not allow the file metadata to be generated and delivered far in advance of the creation or availability of the file for delivery. If the metadata for a file is not available at the receiver, generally the recovery of the file at the receiver is not possible, even if the receiver has received enough data in the packets for the file that, together with the metadata for the file, would allow recovery of the file.

Streaming video or audio is often delivered as a sequence of named files or fragments. For example, the DASH standard ([3GP-DASH], [MPEG-DASH]) specifies such a solution. When delivering streaming multimedia data (video, audio, timed text, etc.) over multicast or broadcast enabled networks, such as an eMBMS network ([MBMS]), the FLUTE protocol ([FLUTE]) uses a sequence of files that can be delivered as a sequence of separate objects, sometimes also called segments.

As mentioned above, the FDT in FLUTE contains the names of files but also important metadata which may be required to successfully collect and decode the file contents. In addition, the FDT may contain the names of certain files that must be received as a prerequisite for subsequent successful reconstruction of some multimedia stream (e.g., DASH initialization segments are ordinarily necessary as a prerequisite to decoding and rendering subsequent media samples).

Generally with FLUTE, the name of any particular segment is not known at the time of transmission of the current segment. Instead, subsequent file names must be learned by receiving a newer or updated FDT. Thus, both the FDT for the object and the segment itself must be successfully received. If, for example, the receiving client receives a segment but not the associated FDT object containing the meta-data for the segment, the receiving client will not be able to interpret and deliver the segment successfully, and thus the segment is effectively lost.

As explained below, the methods described herein can be used to indicate that particular metadata is common to a sequence of related objects, e.g., a sequence of DASH segments corresponding to a multimedia stream. These methods ("template rules") provide a succinct description of metadata and the objects to which they apply. The receiving client thus needs only to obtain the template rules in order to obtain all (or most) of the metadata needed for the sequence of related objects, thus eliminating the requirement that the receiving client also receive a separate FDT for each object to be delivered.

In the more general case, a construction rule is provided that is either a template rule or some other rule that doesn't specify a template per se.

In the context of eMBMS streaming delivery, the loss of the FDT containing the metadata for a segment will generally prevent the receiving client from understanding the structure of the segment, and thus cause the receiving client to have to discard the entire segment of video and/or audio. The methods and processes described herein thus improve the quality of experience delivered to end users by reducing the likelihood a segment will be discarded due to loss of metadata. Another aspect is that by substantially reducing the amount of redundant metadata sent in FDTs with the current FLUTE solution for sequences of related objects, and the corresponding overheads in sending this metadata, the amount of overall bandwidth used (and latency required) for delivering streams of objects is somewhat reduced using the methods and processes described herein. One advantage is that the overall delivery of streams of objects is less complex than required otherwise.

Template FDTs

An FDT carries metadata that relates a file or object identifier for a FLUTE session, expressed as a Transmission Object Identifier ("TOI"), to metadata associated with the file, e.g., a URI for the file, and the Forward Error Correction Object Transmission Information ("FEC OTI") that conveys the associated FEC parameters for delivering the file over FLUTE. A new type of FDT described herein contains template information describing some or all of the FDT metadata needed for a sequence of related objects. This new type of FDT, hereafter called a template FDT ("TFDT"), contains metadata information related to a sequence of related objects, including the FEC OTI, but also including other metadata related to delivering a sequence of related objects.

As described, the TOI, the FEC OTI and the corresponding URI information may be expressed as templates. When used in conjunction with a PST, for example, the metadata in the PST may also be expressed as templates.

A template is constructed as a baseline constant with zero or more varying values. Varying values can customize the parameters or characters in the URI, FEC OTI, or PST information for specific objects (usually to encode some repeating pattern).

There may be special values with special meaning. For example, as used above, the delimiters of "%" may be used to indicate a template (e.g., within a substring) in which special values are defined. One such value, I, is used to indicate the index (i.e., position in a sequence) of an object in a sequence of related objects starting within value zero and incrementing by one for each subsequent object, and (as also described above) the value of I may be used in templates to, for example, describe the sequence of TOIs for the objects and the sequence of URIs for the objects, etc.

The sequence of related objects in the TFDT is specified using a template that specifies amongst the other possible metadata for the sequence of related objects the range of TOI values to which the TFDT parameter options apply. For example, the TFDT may use a variable I that indexes from 0 by 1 to the number of objects (which may be unbounded), and then the TOI sequence for the sequence of related objects is specified using a template that is described using the value of I, e.g., in the TFDT the TOI template may be expressed as a string like "TOI=%1000+I*3%" that specifies that the sequence of TOIs in the sequence of related objects is 1000, 1003, 1006, 1009, . . . .

The value of I can start at 0, increment by 1, and a maximum value for I can be specified in the TFDT, e.g., "Maximum I=499", indicating that there are 500 objects in the sequence of related objects. Alternatively, the maximum value of I can be left unspecified, in which case any TOI that fits into the pattern of TOIs specified by the template would be considered to be within the sequence of related objects. The TFDT also can include a substring (e.g., HTTP URI prefix) for each object, which is also specified as a template that is described using the value of I. For example, in the TFDT, the TOI template may include "URI=http://example.com/object%I+300%" that specifies that the sequence of URIs in the sequence of related objects is as follows:

http://example.com/object300,
http://example.com/object301,
http://example.com/object302,
http://example.com/object303, Although this example describes template rules and how they are applied in the context of FLUTE, this approach is applicable to other file delivery style protocols that contain file names that are later matched with file fragments identified with generic identifiers. Consequently this approach is applicable to other delivery systems and applied by using templates in the metadata description (for example, DASH uses a similar approach in its Media Presentation Description ("MPD") template structure as described in [Luby2010] and [Luby2012]). Note that example.com is not a real domain, per RFC 2606.

The FEC OTI for example for the FEC Encoding Scheme specified in [IETF-RFC-6330] comprises the FEC Encoding ID (6), the file transfer size in bytes (F), the symbol and sub-symbol alignment factor in bytes (Al), the symbol size in bytes (T), the number of source blocks (Z) and the number of sub-blocks per source block (N). Amongst these particular parameters, only the value of F typically varies from one object to the next amongst a sequence of related objects, and thus the values of all the FEC OTI parameters other than the value of F may be specified in the TFDT, e.g., as follows:

"FEC Encoding ID=6","Al=8","T=1320","Z=1",
"N=1"

In this example, the values in the TFDT for the sequence of related objects specify that they all use the rules and protocols of [IETF-RFC-6330] associated with FEC Encoding ID 6, use the alignment factor of 8 bytes, have a symbol size of 1320 bytes, have one source block per object, and have one sub-block per source block. In this case, the varying parameter, i.e., the file transfer size F, may be prepended to the object itself, and the number of source symbols in each object can be included as one of the parameters in the FEC Payload ID of each data packet or PDU.

For example, the FEC Payload ID format can comprise a two-byte SBN-value, a two-byte ESI-value, and a two-byte KT-value, where the SBN-value indicates from which source block the data carried in the PDU is generated, the ESI-value indicates an encoding symbol ID for the data carried in the PDU, and the KT-value indicates the total number of source symbols comprising the file. An alternate FEC Payload ID format can comprise a four-byte UOSI-value and a two-byte KT-value, where the UOSI-value indicates a universal object symbol identifier for the data carried in the PDU and the KT-value indicates the total number of source symbols comprising the file.

For these two types of FEC Payload IDs, the file or object itself might have prepended a four-byte F-value indicating the total number of bytes in the file, where this F-value is prepended before FEC encoding, and thus the source symbols that are to be FEC-encoded for the purpose of delivering the file comprise the F-value followed by the actual file. In this case, the total number of source symbols KT for the file is equal to ceil((4+F)/T), where T is the symbol size. Alternatively, the file may have prepended a two-byte P-value indicating the number of padding bytes in the last source symbol of the file, and in this case the file size in bytes is F=KT*T−P, where T is the symbol size. In this case, the total number of source symbols KT for the file is equal to ceil((2+F)/T). In either case, the receiver can process a file as follows. Each received PDU for the file contains a transport session identifier ("TSI"), a TOI and an FEC Payload ID. From the TSI, TOI carried in the PDU, and from the TFDT, the receiver can determine all of the FEC OTI except for the file or object size F. However, the receiver can determine the number KT of source symbols in the file from the FEC Payload ID carried in each PDU (and the receiver can identify which object the KT is associated with from the TSI and TOI carried in the PDU). From KT and the other FEC OTI parameters, the receiver can determine the number of source blocks and the number of source symbols in each such source block of the file (and the receiver can also determine the number of sub-blocks into which each source block is partitioned, and the size of the sub-symbol for each sub-block). Once at least enough symbols have been received for each source block, which is typically when KT or slightly more than KT symbols in total have been received for the file, the receiver can FEC-decode and recover the KT source symbols of the file. Once the KT source symbols for the file have been recovered, the receiver can determine from the value of F, or P, prepended to the source symbols, the F-bytes of the source symbols comprising the file.

As another alternative, the four-byte F-value may be appended to the file or object instead of prepended, where the F-value is appended before FEC encoding, and thus the source symbols that are to be FEC-encoded for the purpose of delivering the file comprise the actual file followed by possible padding followed by the F-value as the last four bytes of the last source symbol of the file, where the total number of source symbols KT for the file is ceil((4+F)/T). Once the receiver has recovered the KT source symbols of the file, the receiver determines the number of bytes F comprising the file from the last four bytes of the last recovered source symbol, and then the file itself comprise the first F-bytes of the recovered source symbols. Another alternative is where the P-value is appended to the file instead of the F-file, with similar procedures on how the source symbols are formed and how the receiver recovers the file.

As another alternative, the FEC Payload ID can comprise a two-byte SBN-value, a two-byte ESI-value, and a four-byte F-value. In this alternative, the source symbols can comprise the file itself with no values prepended or appended, as the receiver can recover the size of the file in bytes directly from the FEC Payload ID. As another alternative, the FEC Payload ID can comprise a four-byte UOSI-value, and the F-value can be carried in an extension header, for example the EXT_FTI extension header with extension header identifier 64 as specified in [LCT].

With the methods described herein using the TFDT, there is no need for a separate FDT for each object, as all of the common information for the sequence of related objects is carried in the TFDT, and the information that is specific to each object is (in this example) partially carried in the FEC Payload ID of the packets carrying data for the object (the number of source symbols in the object) and partially carried in the source symbols of the object, i.e., prepended or appended to the source symbols of the object before FEC encoding (the size of the file F in bytes, or equivalently the number P of bytes in the last source symbol of the object to be discarded).

For example, an FEC OTI for RaptorQ (see, e.g., [IETF-RFC-6330]; FEC Encoding ID 6) might have as structure such as is shown in Table 1.

TABLE 1

| Category | Details | Example Value |
| --- | --- | --- |
| Mandatory FEC OTI value | FEC Encoding ID | 8 bits (value 6) |
| Common FEC OTI value | F (transfer length [source]) | 40 bits (transfer length of object) with limit of 946270874880 |
| | T (symbol size) | 16 bits (size of a symbol in bytes) |
| Scheme specific OTI values | Z (# of source blocks) | 8 bits |
| | N (# of sub-blocks) | 16 bits |
| | Al (alignment) | 8 bits |

It is expected that for a session of multiple objects, these FEC OTI values would all remain constant except for the F value. If a PST were also used (e.g., to encode multiple objects together in a PDU), and the protocol allowed for variable-sized TOIs or FEC Payload IDs, it is typical that the size of each TOI and FEC Payload ID and the size of the symbols for each constituent object present in each PDU (expressed in bytes) remains unchanged for the sequence of related objects.

For example, a PST for the objects might specify two objects per PDU, with a 2-byte FEC Payload ID for each object (each object uses a separate FEC Payload ID in this example, in other cases the two objects might share the same FEC Payload ID). With this solution, the PFI is included in each PDU to indicate which packet format structure the PDUs follow.

With a TFDT as described herein, the PST and the FDT might be combined into a TFDT that might look as shown in Table 2.

TABLE 2

```
PFI = %I%
"Number of objects = 2",
"First object FEC Payload ID size = 2 bytes"
"Second object FEC Payload ID size = 2 bytes"
"First object = 1 symbol per PDU"
"Second object = 1 symbol per PDU"
"First object URI = http://example.com/video%I%"
"First object FEC OTI = (6, 8, 664, 1, 1)"
"Second object URI = http://example.com/audio%I%"
"Second object FEC OTI = (6, 8, 664, 1, 1)"
```

Thus, in this example, the PDUs will use the PFI sequence 0, 1, 2, 3, . . . for the sequence of related objects, and the PDUs containing PFI value 50 will contain one symbol of 664 bytes for each of two objects, wherein the URI for the first object is http://example.com/video50 and the URI for the second object is http://example.com/audio50, and the two objects both have one source block and one sub-block per source block, and both use FEC Encoding ID 6 and use alignment factor 8 bytes.

Below is an example of a TFDT where in this case there is one session with metadata provided for two sequences of related objects. In this example, the first sequence of files may for example correspond to a sequence of video segments from a DASH video representation, and the second sequence of objects corresponds to a sequence of DASH audio segments from a DASH audio representation. In this example, the standard FEC Payload ID specified in [IETF-RFC-6330] is used, i.e., each data packet contains one symbol for one object, and the FEC Payload ID comprises an 8-bit SBN and a 24-bit ESI. In this example, "%" serves as a delimiter for variables and equations.

```
// TFDT with metadata for two sequences of files specified
// All sequences of files in this TFDT have the same transport
session identifier
    TSI = 5
    // All sequences of files in this TFDT use the same time scale
    Timescale = 10
    MPD_URL = http://news.video_content/sept25.2012.mpd
    // First sequence of objects metadata
    <start_seq_template_specification>
        Counter %I = 0..99999%
        TOI = %2000000+I%
        URI = http://localhost.seq1/object%I%
        MPD_REP_ID = http://newsfeed.example.com/video500
        START_TRANSMISSION = %I*20%
        END_TRANSMISSION = %I*20 + 20%
        FEC_OTI = (6, 8, 1288, 1, 1)
    <end_seq_template_specification>
    // Second sequence of objects metadata
    <start_seq_template_specification>
        Counter %I = 0..49999%
        TOI = %3000000+I%
        URI = http://localhost.seq2/object%I%
        MPD_REP_ID = http://newsfeed.example.com/audio64
        START_TRANSMISSION = %I*40%
        END_TRANSMISSION = %I*40 + 80%
        FEC_OTI = (6, 4, 540, 1, 1)
    <end_seq_template_specification>
```

In this example TFDT above, these sequences of objects or files correspond to representations described in a DASH MPD, i.e., the MPD at the URL http://newsfeed.video_content/sept25.2012.mpd provided after MPD_URL. The MPD_REP_ID specified for a sequence of files in the above TFDT provides an identifier for the corresponding representation in the MPD. In the example above, the MPD_REP_ID is the base URI or URL provided within the MPD for that representation, which uniquely identifies the representation amongst all the representations described within the MPD. This signaling provides a method for linking the delivery information associated with a sequence of objects or files signaled in a TFDT with the DASH metadata information associated with representations signaled in a MPD.

In the first sequence of files, the FEC OTI specifies that the FEC code with FEC Encoding ID=6 is used, which is the RaptorQ code specified in [IETF-RFC-6330], and that an alignment factor of 8 is to be used, and that each symbol is 1288 bytes in size, and that each object or file is FEC encoded as one source block with one sub-block per source block. For the second sequence of files, the FEC OTI specifies that the FEC code with FEC Encoding ID=6 is used, which is the RaptorQ code specified in [IETF-RFC-6330], and that an alignment factor of 4 is to be used, and that each symbol is 540 bytes in size, and that each object or file is FEC encoded as one source block with one sub-block per source block.

The value of Timescale provides a reference for time measurements in units of ticks per second. All units of time are expressed in units of ticks per second using Timescale, e.g., in the example above Timescale=10, and thus a time duration of 55 indicates a 55 tick duration, which corresponds to a 5.5 second duration. The START_TRANSMISSION and END_TRANSMISSION provided for each sequence of files in the TFDT above can be used to indicate the start transmission time of each file and the end transmission time of each file using a template. Thus, data packets for the file corresponding to I within the first sequence of files is to be transmitted between times I*20 and I*20+20 relative to the beginning transmission time of the session. In this example, because Timescale=10, this means that data packets for each file are transmitted for 2 seconds, and the data packets for the file corresponding to I are transmitted starting at 2*I seconds after the beginning transmission time of the session, and thus there is no overlap in transmission time for packets of consecutive files from the first sequence of files. Similarly, data packets for the file corresponding to I within the second sequence of files is to be transmitted between times I*40 and I*40+80 relative to the beginning transmission time of the session. In this example, because Timescale=10, this means that data packets for each file are transmitted for 8 seconds, and the data packets for the file corresponding to I are transmitted starting at 4*I seconds after the beginning transmission time of the session, and thus there is a 4 second overlap in transmission time for packets of consecutive files from the second sequence of files. The receiver can use this information to determine the time interval for when data packets for a file from a sequence of files are expected to arrive. There are many variants of the signaling of the start and end transmission time of files using templates. For example, more than one start and end transmission time might be indicated using a template for a sequence of files, e.g., two start and end transmission times might be indicated in the TFDT using templates to indicate a time shift broadcast of the same DASH stream of video content.

Since the TOIs are scoped by the TSI in a FLUTE session, in order for a receiver to be able to determine which received packets should be associated with which file, the TOI should be distinct for all files or objects delivered with the same TSI value. Thus, if two sequences of files are to be transmitted within the same session, it is preferable that their corresponding ranges of TOI values have an empty intersection, i.e., there are no duplicate TOI values. There are many ways to achieve this. For example, one method is to use sequential TOI values for each file sequence, but ensure that the starting TOI value for a first file sequence and the starting TOI value for a second file sequence with the next larger starting TOI value are separated by at least the maximum number of TOI values to be used for the first file sequence. This is the method used in the TFDT example above: the first sequence of files has a start TOI value of 2,000,000 and uses at most 100,000 consecutive TOI values, i.e., TOIs in the range 2,000,000 through 2,099,999, whereas the second sequence of files has a start TOI value of 3,000,000. Thus, there are 1,000,000 TOI values between the start TOI values of the first and second file sequence, but only 100,000 of these TOI values are used by the first file sequence, so there are no duplicate TOI values used by the two file sequences.

Another method to achieve no duplicate TOI values used by different sequences of files is to place an upper bound on the number of sequences of files that can be delivered within a single session. For example, if there is a limit of at most 256 sequences of files within a session, then the J-th such sequence of files can have a TOI sequence specified as:

TOI=%J+256*I%

Then, each TOI for a file within the J-th sequence of files will have a TOI that is equal to J modulo 256, and thus the TOIs for each of these sequences of files will be distinct at long as each sequence of files uses a different J value modulo 256 to define its sequence of TOIs.

The above methods ensure that all TOIs used by any of the files in any of the sequences of files delivered within a session are distinct, but this requirement can be relaxed. For example, it is sufficient if the receiver can determine at the time that a packet is received which of the files it is to be associated. The start and end transmission times of each file within a sequence of files can also be used by the receiver to distinguish between different TOI sequences. Suppose in the example above that the TOI sequence for the second sequence of files was changed to

TOI=%1999990+I%

In this case, the TOIs for the first sequence of files and for the second sequence of files would be overlapping, i.e., the TOI range for the first sequence of files is 2000000-2099999 and the TOI range for the second sequence of files is 1999990-2049989. However, a receiver that tracks time relative to the beginning of a session transmission can determine to which file a received data packet should be associated. For example, if T seconds have elapsed since the beginning of the session, then the possible TOI for a data packet associated with a file from the first sequence of files is 2000000+floor(T/2) and the possible two TOIs for a data packet associated with a file from the second sequence of files are 1999990+floor(T/4) and 1999990+floor(T/4)−1. It can be verified in this example that these three TOIs are always distinct, and thus the receiver can determine for a received data packet which sequence of files and which file within that sequence to associate with that data packet based on the received TOI within the data packet and the elapsed time T.

In general, there may be some variations in the actual send time interval for data packets of a file, and also some variance in the delivery time of data packets from a sender to a receiver, and the time of a sender and a receiver might not be completely synchronized, and thus the above methods for distinguishing and determining which file is associated with a received data packet should take into account tolerances between signaled times and actual receive times of data packets. The methods described herein for determining which sequence of files and which file within the sequence to associate a received data packet based on the TOI, and possibly TSI, within the packet and on the elapsed time T, should take into account these tolerances. For example, it might be the case that from a system perspective a tolerance of ten seconds is reasonable, and thus the signaling within the TFDT should have the property that for any first file from a first sequence of files and any second file from a second sequence of files, if the signaled TOI for the first file and the second file are the same then the signaled start transmission time for the second file should be at least ten seconds after the signaled start transmission time of the first file, or the signaled end transmission time for the second file should be at least ten seconds prior to the signaled start transmission of the first file.

The TOIs for all objects with overlapping transmission times might be unique, with the TOI, the start transmission time, and the end transmission time of each object in the sequence of objects described within the template file delivery table by a construction rule.

A client running on an end user device, often called user equipment (or "UE, in the context of 3GPP), needs to differentiate uniquely which data packets are associated with which file it is trying to recover. The TOI provides this mapping. However, in some instances, it might be hard to have unique TOIs. For example, the TOI space of names is only so large, and streaming file delivery might exceed that space, especially if there are multiple streams scoped by the same TSI (transmission session ID, which scopes the TOI=transmission object ID).

In some embodiments, uniqueness is a requirement, but in other embodiments, there are various ways to ensure that the client/UE uniquely associates data packets with the correct file. For example, each file sent within a session can be sent with the same TSI and all unique TOIs. Another example is for the transmitter to ensure that all files sent within a session are sent with the same TSI over a moving period of time (with guard time intervals on either end in case the client/UE is not completely time synchronized with the transmission) all having unique TOIs, and that the client is at least somewhat synchronized with the transmission so that the client/UE can uniquely determine which data packets are associated with each file by using a combination of the TOI in the data packets and the time at which the data packets are received. In that case, the client would, based on the time a data packet is received, determine which files are actively being sent at that time, for example based on start and end transmission times for each file, with a guard time interval around these times to extend out the time on each side of these start and end transmission times in case the client clock is not completely synchronized with the actual times of transmission/reception of data packets for file. Thus, all of these files within this guard time interval will be associated with unique TOIs.

The set of such TOIs of all files transmitted at or within a certain time period of the arrival of a given data packet might be the set S, and the client can determine which file is associated with each TOI in S. Then, the client can match the TOI in the received data packet with one of the TOIs in S, and thereby determine from which file the data in the received data packet was generated.

One advantage of these methods is that they can greatly enhance reliability and simplicity when delivering multimedia streams e.g., as currently contemplated for delivering DASH formatted streams over eMBMS. Reliability is enhanced because instead of having to deliver a separate FDT for each file at or near the time the data packets for the file are sent, a single TFDT that compactly describes the FDTs for all the files can delivered reliably prior to the delivery of the individual files. Efficiency is enhanced because a smaller number of bytes are required to represent the same amount of information when this particular encoding is used.

There are many variants of the TFDT methods described above. For example, the format of the TFDT may be similar to that of an FDT and delivered in a similar manner, i.e., delivered within the transmission (e.g., FLUTE) session as a separate object with TOI=0. Alternatively, a TFDT may be delivered via as an XML object, associated with a URL, and a receiver may download the XML object referenced by the URL using HTTP. Other methods for formatting and delivering TFDT information to receivers include including the TFDT information in the User Service Description ("USD") that is used in MBMS to deliver FLUTE metadata to receivers. Other methods include delivering the TFDT information via a Session Announcement Protocol ("SAP") message, and to format the TFDT information using a Session Description Protocol ("SDP"). Other alternatives include formatting and delivering TFDT information in a Rich Site Summary or Really Simple Syndication ("RSS") feed. The TFDT information may be formatted and delivered using combinations of methods, e.g., partially delivered via the USD, partially delivered as part of a DASH MPD. In some cases at least some portions of the TFDT information may be formatted and delivered redundantly, i.e., some portions of the TFDT information may be formatted and delivered using one method and the same portions of the TFDT information may be formatted and delivered using a different method.

Traditional delivery of individual files and the delivery of sequences of related files or objects may all be delivered within the same file delivery session. The signaling for the sequences of related files may use the TFDT methods described herein, wherein the individual files delivered with the same session may be delivered using traditional FDTs. In any case, it is preferable if the metadata for the sequences of related files and for the individual files delivered within the same session make it possible for the receiver to operate correctly, e.g., the TOI for an individual file should not match the TOI of any file for any sequence of files for which data packets are transmitted at the same time as data packets for the individual file. Alternatively, the metadata for the individual files may also be included in the TFDT, and thus the TFDT information comprises the delivery metadata for the individual files as well as for the sequences of related files for a session. As another alternative, a TFDT may contain all or portions of the metadata for files delivered in multiple transport sessions. As another alternative, a TFDT or multiple TFDTs may contain metadata for files for which packets are transmitted into multiple delivery sessions.

Another UOD Example

Template-based file delivery and UOD address complementary important use cases for joint protection of multiple objects and can be used separately or together.

The FEC OTI for Basic UOD RaptorQ can be exactly the same as for RaptorQ in [IETF-RFC-6330], but the FEC Payload ID can be simplified. The FEC Payload ID for RaptorQ in [IETF-RFC-6330] is (SBN, ESI), while the FEC Payload ID for Basic UOD RaptorQ is UOSI. Transmitting symbols in UOSI sequence utilizes network resources in an efficient and flexible fashion.

An example of mapping an (SBN, ESI) pair to a UOSI can be as follows. To determine a (SBN, ESI) pair from a UOSI value, C, for an object known to have Z source blocks, set ESI=floor(C/Z) and then set SBN=C−(ESI)*Z. To determine a UOSI value, C, from a (SBN, ESI) pair for an object known to have Z source blocks, set C=SBN+(ESI)*Z. Table 3 shows an example mapping for Z=5.

TABLE 3

| UOSI (C) | SBN | ESI |
|---|---|---|
| 0 | 0 | 0 |
| 1 | 1 | 0 |
| 2 | 2 | 0 |
| 3 | 3 | 0 |
| 4 | 4 | 0 |
| 5 | 0 | 1 |
| 6 | 1 | 1 |

FIG. 13 illustrates an example object with FEC Payload ID (SBN, ESI).

FIG. 14 illustrates an example object with FEC Payload ID (UOSI).

In a PST, each entry is identified by a unique PFI. Each entry in the PST contains (1) The number and sizes of FEC Payload IDs in a packet, (2) a specification of which object is associated with each symbol in a packet (it can use TOIs to make this association), and (3) a specification of which FEC Payload ID to use for each symbol in a packet. The PFI is carried in each packet to identify the format and data that is carried in the packet.

For example, a first PST entry might specify a packet format comprising two FEC Payload IDs of two bytes each—

UOSI format, with one symbol for the first object with TOI that uses the first FEC Payload ID, and one symbol for the second object with TOI that uses the second FEC Payload ID.

In general, the PH could carry a list of sizes and formats of FEC Payload Ids, and the number of symbols of each of the objects carried in the packet, and the tie in to the FEC OTI. The PFI could also be carried in the FDT and associated with a TOI. As an example of a PFI, the PFI could indicate that the packets associated with a TOI carries 3 objects, with associated URLs and FEC OTI, and the format of the packets are: the first object has a UOSI of 1 byte and one symbol in the packet, the second object shares the UOSI with the first object and uses two symbols in the packet, the third object has a UOSI of 2 bytes and one symbol in the packet, and in this case the packet would contain a 1 byte UOSI for the first object, this UOSI would also be used for the second object, then a 2 byte UOSI for the third object, then one symbol for the first object, 2 symbols for the second object, and one symbol for the third object.

As has now been described, there are some specific examples. Further embodiments can be envisioned to one of ordinary skill in the art after reading this disclosure. In other embodiments, combinations or sub-combinations of the above-disclosed invention can be advantageously made.

Recovery at a decoder can be an exact recovery or at least approximately recovery of what was transmitted. Even if some data packets are lost, some can still be associated with their original data packet using transmission object identifiers. These transmission object identifiers might be constructed by a transmission object identifier constructor. For example, if two transmission object identifiers, they may be deemed to be associated with the same encoded symbols. Data can be arranged as one or more sequences of data objects. The sender and/or receiver can be an electronic device or system that communicates over a packet switched network. Packets can be generated from the sequences of data objects using a packet constructor to provide a packet output. Meta-data is an example of data in structured form, as might be useful for automated processing. The meta-data might be generated using templates and/or a template file delivery table.

The example arrangements of components are shown for purposes of illustration and it should be understood that combinations, additions, re-arrangements, and the like are contemplated in alternative embodiments of the present invention. Thus, while the invention has been described with respect to exemplary embodiments, one skilled in the art will recognize that numerous modifications are possible. For example, the processes described herein may be implemented using hardware components, software components, and/or any combination thereof. The specification and drawings are, accordingly, to be regarded in an illustrative rather than a restrictive sense. It will, however, be evident that various modifications and changes may be made thereunto without departing from the broader spirit and scope of the invention as set forth in the claims and that the invention is intended to cover all modifications and equivalents within the scope of the following claims.

What is claimed is:

1. A method of generating a template file delivery table for a sequence of data objects, wherein source data of one or more data objects in the sequence is represented by encoded symbols in packets such that the source data is recoverable, at least approximately, from the encoded symbols, the method comprising:

generating data in a structured form, including metadata;

generating a template file delivery table that comprises the metadata for the sequence of data objects, the sequence of data objects comprising a plurality of related data objects, wherein the template file delivery table includes a set of common object transmission information that is common for the plurality of related data objects so that a separate file delivery table is not to be sent for each of the plurality of related data; and transmitting the template file delivery table over a network to a client device.

2. A method of delivering a sequence of data objects from an electronic device or system over a network to a client device, wherein source data of the sequence of data objects is represented by encoded symbols in packets such that the source data is recoverable, at least approximately, from the encoded symbols, the method comprising:

obtaining a template file delivery table that comprises delivery metadata for the sequence of data objects, the sequence of data objects comprising a plurality of related data objects, wherein the template file delivery table includes a set of common object transmission information that is common for the plurality of related data objects so that a separate file delivery table is not to be sent for each of the plurality of related data objects;

constructing a first transmission object identifier for a data object from the sequence of data objects based on a transmission object identifier construction rule described in the template file delivery table for the sequence of data objects;

receiving one or more data packets;

extracting a second transmission object identifier from a received data packet;

associating encoded symbols comprising the received data packet with the data object if the first transmission object identifier and the second transmission object identifier identify the same data object; and recovering, at least approximately, the source data for the data object based on the encoded symbols associated with the data object.

3. The method of claim 2, wherein a start transmission time and end transmission time for the data object are constructed for the sequence of data objects described in the template file delivery table, and wherein the client device receives data packets for the data object at times that are between the start transmission time and end transmission time.

4. The method of claim 2, wherein more than one data object is recovered from the sequence of data objects.

5. The method of claim 2, wherein more than one sequence of data objects is described within a same session in the template file delivery table.

6. The method of claim 2, wherein the template file delivery table also comprises information that relates how the sequence of data objects are associated with segments of a representation described in a DASH media presentation description (MPD).

7. The method of claim 2, wherein the set of common object transmission information includes FEC object transmission information parameters that are common to all related data objects in the sequence of data objects.

8. The method of claim 2, wherein the template file delivery table comprises metadata delivery information for objects within the sequence of data objects that do not exist at the time that the template file delivery table is obtained by the client device.

9. The method of claim 2, wherein the template file delivery table includes transmission object identifiers for one or more objects, wherein the transmission object identifiers described within the template file delivery table for all objects are unique.

10. The method of claim 9, wherein there are at least two sequences of objects described within a same delivery session within the template file delivery table and the transmission object identifiers for all objects are unique.

11. The method of claim 9, wherein the transmission object identifiers for all objects with overlapping transmission times are unique, and wherein a transmission object identifier, a start transmission time, and an end transmission time of each object in the sequence of data objects is described within the template file delivery table.

12. The method of claim 11, wherein there are at least two sequences of objects described within a same delivery session within the template file delivery table and the transmission object identifiers for all objects with overlapping transmission times are unique.

13. A method of delivering a sequence of data objects from an electronic device or system over a network to a client device, wherein source data of the sequence of data objects is represented by encoded symbols in packets such that the source data is recoverable, at least approximately, from the encoded symbols, the method comprising:

obtaining a template file delivery table that comprises delivery metadata for the sequence of data objects, the sequence of data objects comprising a plurality of related data objects, wherein the template file delivery table includes a set of common object transmission information that is common for the plurality of related data objects so that a separate file delivery table is not to be sent for each of the plurality of related data objects;

receiving one or more data packets;

extracting a transmission object identifier from a received data packet;

associating encoded symbols comprising the received data packet with a data object from the sequence of data objects that corresponds to the transmission object identifier; and recovering, at least approximately, source data for the data object based on the encoded symbols associated with the data object.

14. The method of claim 13, wherein a start transmission time and end transmission time for the data object are constructed for the sequence of data objects described in the template file delivery table, and wherein the client device receives data packets for the data object at times that are between the start transmission time and end transmission time.

15. The method of claim 13, wherein more than one data object is recovered from the sequence of data objects.

16. The method of claim 13, wherein more than one sequence of data objects is described within a same session in the template file delivery table.

17. The method of claim 13, wherein the template file delivery table also comprises information that relates how the sequence of data objects are associated with segments of a representation described in a DASH media presentation description (MPD).

18. The method of claim 13, wherein the set of common object transmission information includes FEC object transmission information parameters that are common to all related data objects in the sequence of data objects.

19. The method of claim 13, wherein the template file delivery table comprises metadata delivery information for objects within the sequence of data objects that do not exist at the time that the template file delivery table is obtained by the client device.

20. The method of claim 13, wherein the template file delivery table includes transmission object identifiers for one or more objects, wherein the transmission object identifiers described within the template file delivery table for all objects are unique.

21. The method of claim 20, wherein there are at least two sequences of objects described within a same delivery session within the template file delivery table and the transmission object identifiers for all objects are unique.

22. The method of claim 20, wherein the transmission object identifiers for all objects with overlapping transmission times are unique, and wherein a transmission object identifier, a start transmission time, and an end transmission time of each object in the sequence of data objects is described within the template file delivery table.

23. The method of claim 22, wherein there are at least two sequences of objects described within a same delivery session within the template file delivery table and the transmission object identifiers for all objects with overlapping transmission times are unique.

24. An object delivery server for delivering a sequence of data objects over a network to one or more client devices, wherein source data of the sequence of data objects is represented by encoded symbols in packets such that the source data is recoverable, at least approximately, from the encoded symbols, the object delivery server comprising:

storage for a template file delivery table comprising delivery metadata for the sequence of data objects, the sequence of data objects comprising a plurality of related data objects, wherein the template file delivery table includes a set of common object transmission information that is common for the plurality of related data objects so that a separate file delivery table is not to be sent for each of the plurality of related data objects;

a packet constructor that constructs a first transmission object identifier for a data object from the sequence of data objects based on a transmission object identifier construction rule described in the template file delivery table for the sequence of data objects, and constructs a second transmission object identifier for a different data object from the sequence of data objects based on a transmission object identifier construction rule described in the template file delivery table for the sequence of data objects; and a packet output that outputs one or more data packets as constructed by the packet constructor for the data object and the different data object, wherein data objects are encoded with transmission object identifiers.

25. The object delivery server of claim 24, the data objects further comprising a start transmission time and end transmission time for the data object constructed for the sequence of data objects described in the template file delivery table, such that the one or more client device receives data packets for the data object at times that are between the start transmission time and end transmission time.

26. The object delivery server of claim 24, wherein more than one sequence of data objects is described within a same session in the template file delivery table.

27. The object delivery server of claim 24, wherein the template file delivery table also comprises information that relates how the sequence of data objects are associated with segments of a representation described in a DASH media presentation description (MPD).

28. The object delivery server of claim 24, wherein the set of common object transmission information includes FEC object transmission information parameters that are common to all related data objects in the sequence of data objects.

29. The object delivery server of claim 24, wherein the template file delivery table includes transmission object identifiers for one or more objects, wherein the transmission object identifiers described within the template file delivery table for all objects are unique.

30. The object delivery server of claim 29, wherein there are at least two sequences of objects described within a same delivery session within the template file delivery table and the transmission object identifiers for all objects are unique.

31. The object delivery server of claim 29, wherein the transmission object identifiers for all objects with overlapping transmission times are unique, and wherein a transmission object identifiers and the start transmission time, and an end transmission time of each object in the sequence of data objects is described within the template file delivery table.

32. The object delivery server of claim 31, wherein there are at least two sequences of objects described within a same delivery session within the template file delivery table and the transmission object identifiers for all objects with overlapping transmission times are unique.

* * * * *